United States Patent
Ohmori et al.

(10) Patent No.: US 7,295,387 B1
(45) Date of Patent: Nov. 13, 2007

(54) LENS OPTICAL SYSTEM

(75) Inventors: Shigeto Ohmori, Kawachinagano (JP); Yuichiro Ori, Moriyama (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 09/451,080

(22) Filed: Nov. 30, 1999

Related U.S. Application Data

(63) Continuation-in-part of application No. 09/294,385, filed on Apr. 20, 1999, now abandoned.

(30) Foreign Application Priority Data

| Apr. 21, 1998 | (JP) | ............... H10-110612 |
| Feb. 3, 1999 | (JP) | ............... H11-025686 |
| Feb. 3, 1999 | (JP) | ............... H11-025692 |
| Feb. 3, 1999 | (JP) | ............... H11-025694 |
| Feb. 8, 1999 | (JP) | ............... H11-030097 |

(51) Int. Cl.
*G02B 9/00* (2006.01)
*G02B 5/18* (2006.01)

(52) U.S. Cl. ..................... 359/796; 359/570

(58) Field of Classification Search ............. 359/566, 359/569, 570, 576, 680, 689, 690, 691, 692, 359/742, 743, 733, 676, 56, 796
See application file for complete search history.

(56) References Cited

U.S. PATENT DOCUMENTS

| 5,117,306 A | 5/1992 | Cohen |
| 5,148,314 A | 9/1992 | Chen |
| 5,152,788 A | 10/1992 | Isaacson et al. |
| 5,572,277 A | 11/1996 | Uzawa et al. |
| 5,717,525 A | 2/1998 | Estelle et al. |
| 5,760,871 A | 6/1998 | Kosoburd et al. |
| 5,837,894 A * | 11/1998 | Fritz et al. ................. 73/178 R |
| 5,847,877 A | 12/1998 | Imamura et al. ............ 359/566 |
| 5,872,658 A | 2/1999 | Ori |
| 5,886,825 A | 3/1999 | Bietry |
| 5,930,043 A * | 7/1999 | Ogawa ....................... 359/566 |
| 6,069,743 A | 5/2000 | Nagata et al. |
| 6,081,389 A * | 6/2000 | Takayama et al. .......... 359/680 |
| 6,142,988 A | 11/2000 | Strähle et al. |
| 6,157,488 A * | 12/2000 | Ishii ............................ 359/569 |
| 6,157,781 A * | 12/2000 | Konno et al. ................. 396/71 |

FOREIGN PATENT DOCUMENTS

| JP | 10-148757 | 6/1998 |

OTHER PUBLICATIONS

Ebstein, Steven M., "Nearly index-matched optics for ashperical, diffractive, and achromatic phase diffrsctive elemtents." Optic Letters, vol. 21, No. 18, Sep. 15, 1996, pp. 1454-1456.

* cited by examiner

*Primary Examiner*—David N. Spector
(74) *Attorney, Agent, or Firm*—Buchanan Ingersoll & Rooney PC

(57) ABSTRACT

A lens optical system is provided with a cemented lens element formed by cementing two constituent lens elements made of different optical materials together, with a diffractive optical surface formed at the cementing interface between the two constituent lens elements. The two constituent lens elements have at their respective interfaces with air a radius of curvature different from the radius of curvature that they have at the cementing interface.

20 Claims, 39 Drawing Sheets

LENS OPTICAL SYSTEM

This application is a continuation-in-part of U.S. patent application Ser. No. 09/294,385, entitled "A Lens Optical System", filed on April 20, 1999, now abandoned, the disclosure of which is expressly incorporated herein by reference.

BACKGROUND OF THE INVENTION

1. Field of the Invention

The present invention relates to a lens optical system, and more particularly to a lens optical system that employs a cemented lens element having a diffraction grating.

2. Description of the Prior Art

A lens element that has a light-condensing ability offered by a diffraction grating formed thereon (hereafter such a lens element will be referred to as a diffractive lens element) has useful optical properties that are not found in a well-known refractive lens element. For example, a diffractive lens element offers the following advantages. First, by providing a diffractive lens element on a lens surface of an ordinary refractive lens element, it is possible to give a single lens element both light-diffracting and light-refracting abilities. Second, a diffractive lens element makes effective correction of chromatic aberration possible because, in it, the quantity that corresponds to the dispersive power of a refractive lens element has the opposite sign.

Accordingly, by providing a diffractive lens element on a lens surface of a refractive lens element, it is possible to correct chromatic aberration, which is conventionally corrected by the use of a combination of two, a positive and a negative, refractive lens elements, by the use of a single lens element. Although a diffractive lens element has useful properties as described above, it also suffers from problems resulting from the fact that the diffraction efficiency of the diffraction grating is wavelength-dependent. For example, except at the design wavelength, the diffracted light of orders other than the intended order is too intense. This causes ghosts, and thereby degrades imaging performance. In particular, an optical system designed for white light, i.e. one that needs to cope with a wide range of wavelengths, suffers greatly from this problem.

To solve this problem, U.S. Pat. No. 5,847,877 and a report written by Steven M. Ebstein (the Sep. 15, 1996 issue of Optical Society of America) each propose a diffractive optical element of the type that has a relief pattern constituting a diffraction grating formed at the cementing interface between two different optical materials. Here, by exploiting the fact that the difference in refractive index between two optical materials depends on the wavelength, the wavelength-dependent variation in phase difference is successfully prevented, and thereby higher diffraction efficiency is achieved over a wide wavelength range.

However, to realize such a diffraction grating, a couple of requirements as noted below need to be satisfied.

First, to obtain sufficiently high diffraction efficiency, the diffraction grating needs to be composed of an optical material that has a relatively high refractive index and a relatively low dispersion and an optical material that has a relatively low refractive index and a relatively high dispersion.

Second, it is necessary to make the blaze vertex angle as great as possible. When the blaze shape of a diffraction grating is manufactured by molding, the larger the blaze vertex angle, which is determined in terms of the grating height and the grating pitch of the diffraction grating, the more easily the material can be filled up to the very tip of the blaze vertex. Thus, the larger the blaze vertex angle, the more accurately the blaze shape can be transferred (i.e. molded). Test manufacturing revealed that, by setting the blaze vertex angle to be around 70°, it is possible to achieve satisfactorily accurate transfer (i.e. molding).

Hereafter, the second requirement noted above will be described in more detail with reference to FIG. 11 illustrating a blaze shape. In FIG. 11, Θ represents the blaze vertex angle; h0 represents the grating height (i.e. the trough-to-ridge height) of the diffraction grating; and d represents the grating pitch. If it is assumed that the refractive index of the medium that exists on the incident side at the design wavelength λ0 is n0, and that the refractive index of the medium that exists on the exiting side at the design wavelength λ0 is n'0, then the grating height (h0) of the diffraction grating is defined by the formula: h0=λ0/(n0−n'0).

The grating pitch (d) represents the intensity of the light-diffracting action. The smaller the grating pitch (d), the stronger the light-diffracting action. That is, in a diffractive lens element, the smaller the grating pitch (d) it has, the stronger the diffractive power it exerts. Accordingly, if a diffractive lens element is used to correct the chromatic aberration caused by a lens element made of high-dispersion glass, or by a lens element having a strong optical power, the diffractive lens element needs to be given a comparatively strong diffractive optical power. Moreover, since a diffractive lens element needs to be so shaped that its light-diffracting action becomes stronger gradually from the center to the edge, the larger the effective diameter of the lens element, the smaller the grating pitch (d) needs to be at the edge of the lens element.

Furthermore, the larger the blaze vertex angle (Θ), the more easily the material can be filled up to the very tip of the blaze vertex. This makes accurate transfer (i.e. molding) of the blaze shape possible. The lower the grating height (h0) of the diffraction grating, and the greater the grating pitch (d), the greater the blaze vertex angle (Θ) can be made. However, to satisfy the first requirement noted above, the diffraction grating needs to have a grating height (h0) as high as about 6 to 17 μm. Accordingly, if chromatic aberration is corrected solely by a diffractive lens element, in order to obtain a sufficiently strong diffractive optical power as required, the diffractive lens element needs to have an unduly small grating pitch (d) and thus an unduly small blaze vertex angle (Θ). This degrades the transfer accuracy of the blaze shape.

Next, how chromatic aberration is corrected by means of a diffractive lens element will be described. In general, chromatic aberration is corrected in such a way that the imaging position of light having the wavelength of the F line coincides with the imaging position of light having the wavelength of the C line. In this case, however, the imaging position of light having the wavelength of the F line deviates from the imaging position of light having the wavelength of the d line, and simultaneously the imaging position of light having the wavelength of the d line deviates from the imaging position of light having the wavelength of the C line. This is called the secondary spectrum. The secondary spectrum tends to be larger where chromatic aberration is corrected by the use of a diffractive lens element than where chromatic aberration is corrected by the use of a combination of two, a positive and a negative, refractive lens elements. To minimize also the secondary spectrum, it is preferable that chromatic aberration be corrected by the use of both a diffractive lens element and a combination of two, a positive and a negative, refractive lens elements.

SUMMARY OF THE INVENTION

An object of the present invention is to provide a lens optical system in which chromatic aberration is corrected properly by effective use of a diffractive lens element that offers high diffraction efficiency over a wide wavelength range.

To achieve the above object, according to one aspect of the present invention, an optical system is provided with a cemented lens element formed by cementing at least two constituent lens elements made of different optical materials together. The cemented lens element has at its cementing interface a diffractive optical surface. The two constituent lens elements have at their respective interfaces with air a radius of curvature different from the radius of curvature that they have at the cementing interface.

According to another aspect of the present invention, an optical system designed for use in a taking optical system for projecting an image on a solid-state image sensor is provided with a cemented lens element and an optical low-pass filter. The cemented lens element is formed by cementing at least two constituent lens elements made of different optical materials together, with a diffractive optical surface formed at the cementing interface between the two constituent lens elements. The two constituent lens elements have at their respective interfaces with air a radius of curvature different from the radius of curvature that they have at the cementing interface. The optical low-pass filter is disposed between the optical system and the image-sensing surface of the solid-state image sensor.

According to still another aspect of the present invention, a method for correcting aberration comprises a step of disposing a cemented lens element in the optical system, and a step of optimizing correction of all the aberrations occurring over the entire optical system. The cemented lens element is formed by cementing at least two constituent lens elements made of different optical materials together, with a diffractive optical surface formed at the cementing interface between the two constituent lens elements. The two constituent lens elements have at their respective interfaces with air a radius of curvature that is different from the radius of curvature that they have at the cementing interface.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
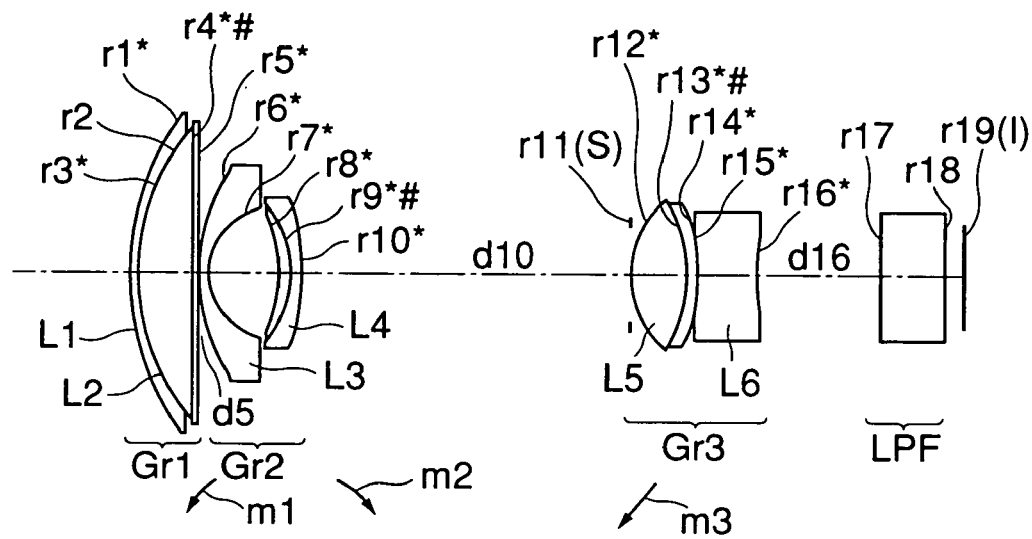
FIGS. 1A to 1C are lens arrangement diagrams of the lens optical system of a first embodiment (Example 1) of the present invention.
Figure 1B:
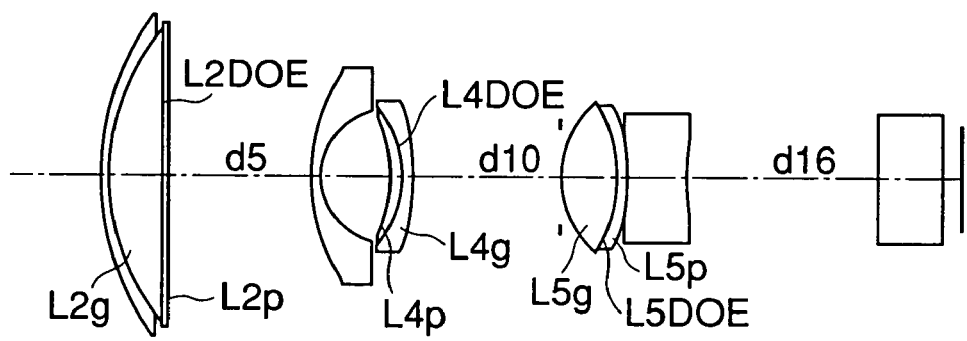
Figure 1C:
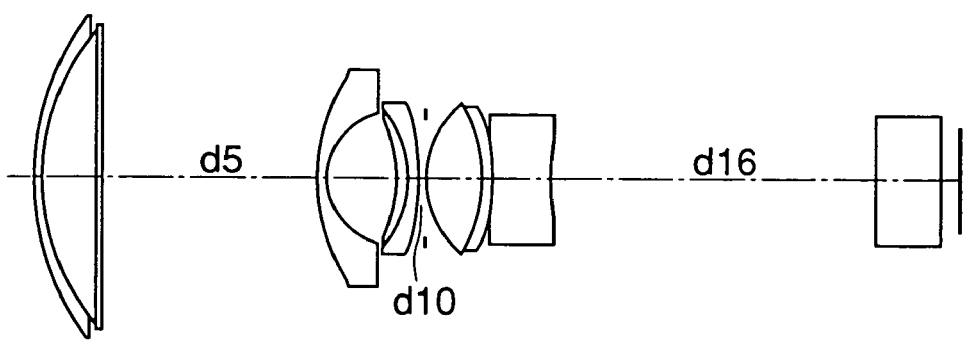
Figure 2A:
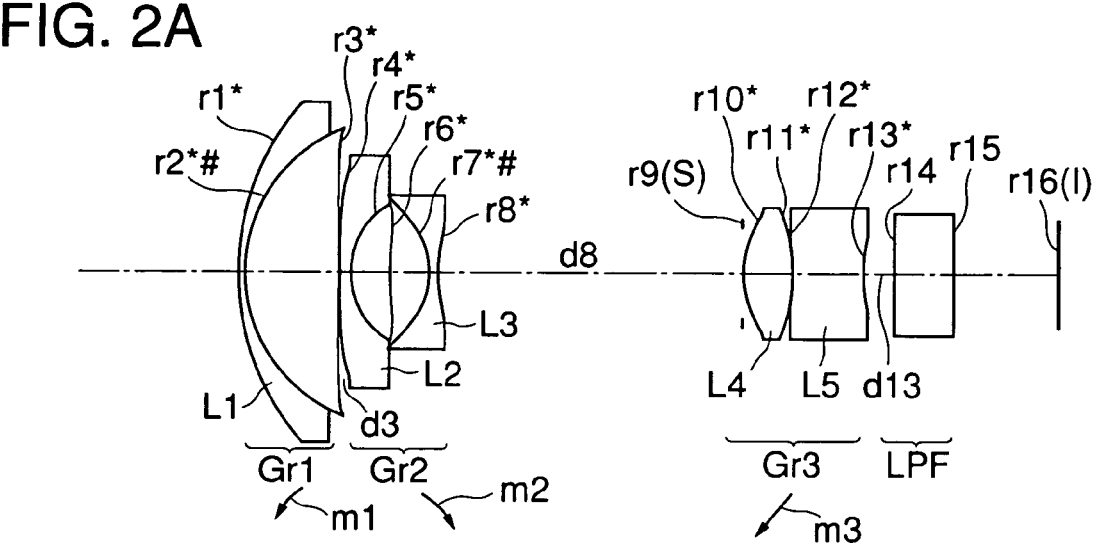
FIGS. 2A to 2C are lens arrangement diagrams of the lens optical system of a second embodiment (Example 2) of the present invention.
Figure 2B:
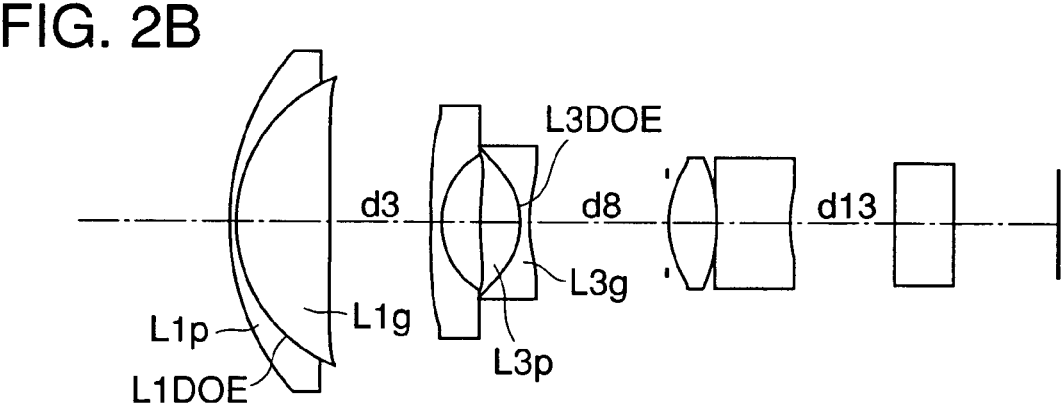
Figure 2C:
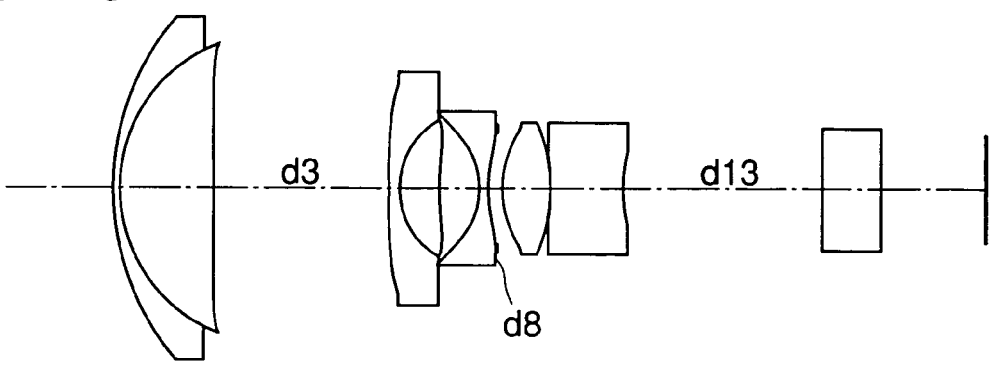
Figure 3A:
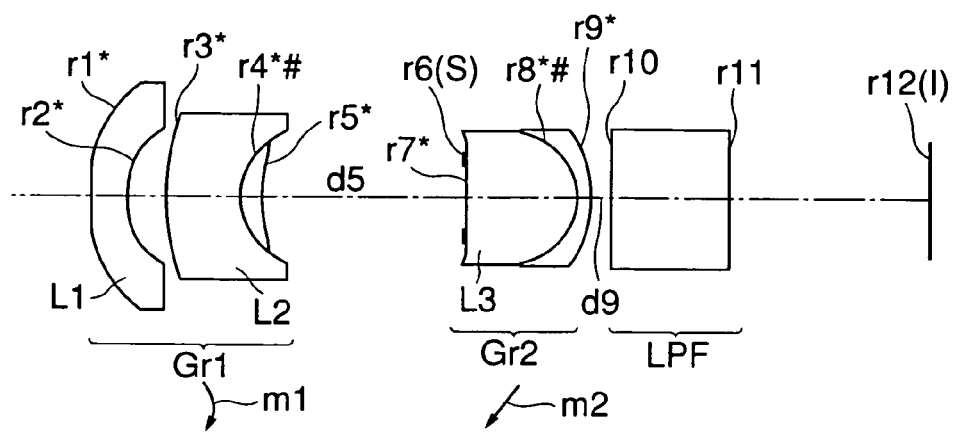
FIGS. 3A to 3C are lens arrangement diagrams of the lens optical system of a third embodiment (Example 3) of the present invention.
Figure 3B:
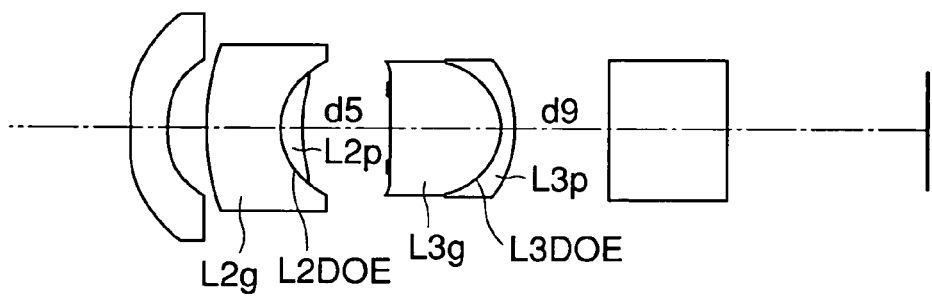
Figure 3C:
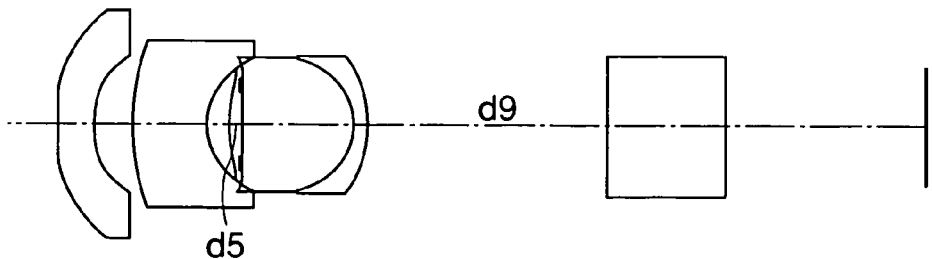
Figure 4:
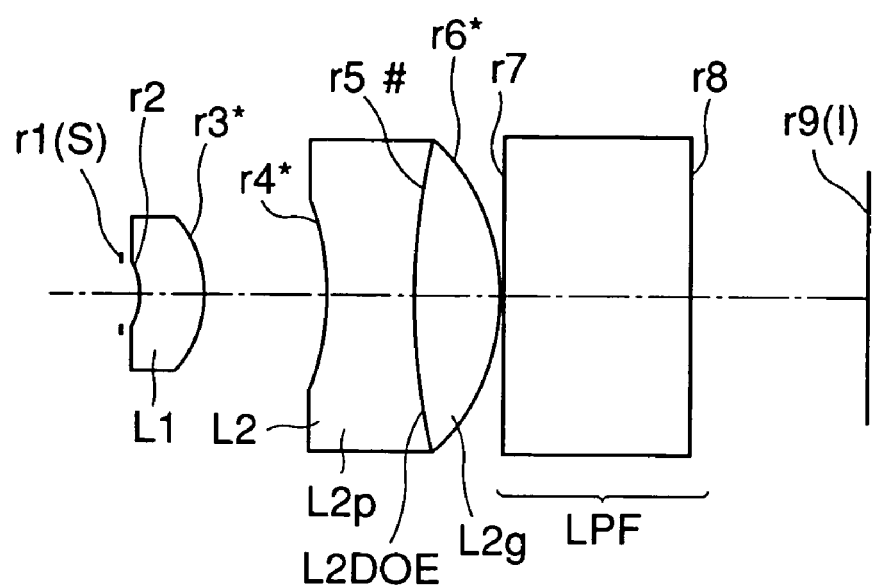
FIG. 4 is a lens arrangement diagram of the lens optical system of a fourth embodiment (Example 4) of the present invention.

Hereinafter, lens optical systems embodying the present invention will be described with reference to the drawings. FIGS. 1A to 1C, 2A to 2C, 3A to 3C, and 4 are lens arrangement diagrams of the lens optical systems of a first, a second, a third, and a fourth embodiment, respectively, of the present invention. The lens optical systems of the first to third embodiments are each built as a zoom lens system, and the lens optical system of the fourth embodiment is built as a fixed-focal-length lens system. Of these diagrams, FIGS. 1A, 2A, and 3A illustrate the lens arrangements of the respective lens optical systems in the wide-angle-end condition [W], FIGS. 1B, 2B, and 3B illustrate the lens arrangements of the respective lens optical systems in the middle-focal-length condition [M], and FIGS. 1C, 2C, and 3C illustrate the lens arrangements of the respective lens optical systems in the telephoto-end condition [T].

In these diagrams, arrow mj (j=1, 2, and 3) schematically indicates the movement of the jth lens unit (Grj) during zooming, and di (i=1, 2, 3, . . . ) represents the ith axial distance counted from the object side, though only those axial distances that vary with zooming (i.e. variable axial distances) are indicated. In each lens arrangement diagram, ri (i=1, 2, 3, . . . ) represents the ith surface counted from the object side (note that the last surface is the image plane (I)), a surface ri marked with an asterisk (*) is an aspherical surface, and a surface ri marked with # is a diffractive optical surface (i.e. a surface having a relief pattern constituting a diffraction grating formed thereon). Note that a cemented lens element having a diffraction grating is composed of a diffractive lens element marked [DOE] and a refractive lens element marked either p or g depending on whether its power bears the opposite sign to or the same sign as the power of the diffractive lens element, respectively.

Figure 12A:
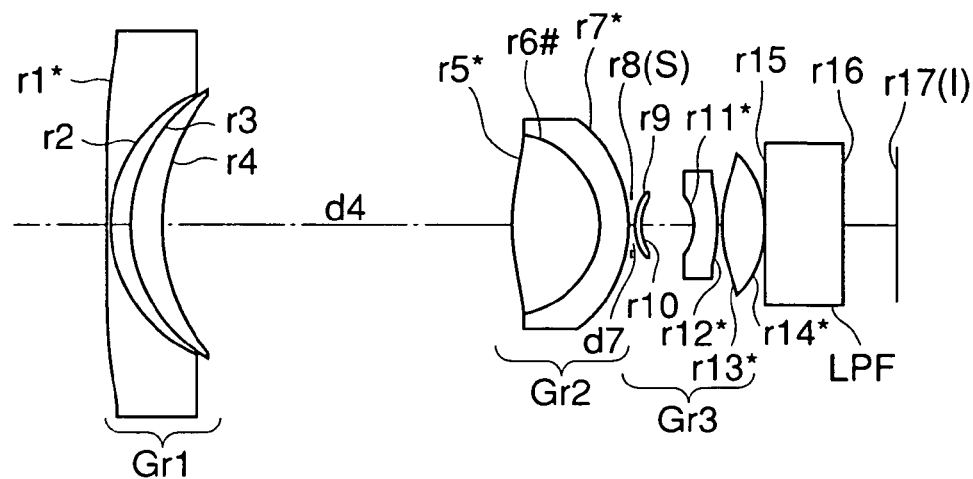
FIGS. 12A to 12C are lens arrangement diagrams of the lens optical system of a fifth embodiment (Example 5) of the present invention.
Figure 12B:
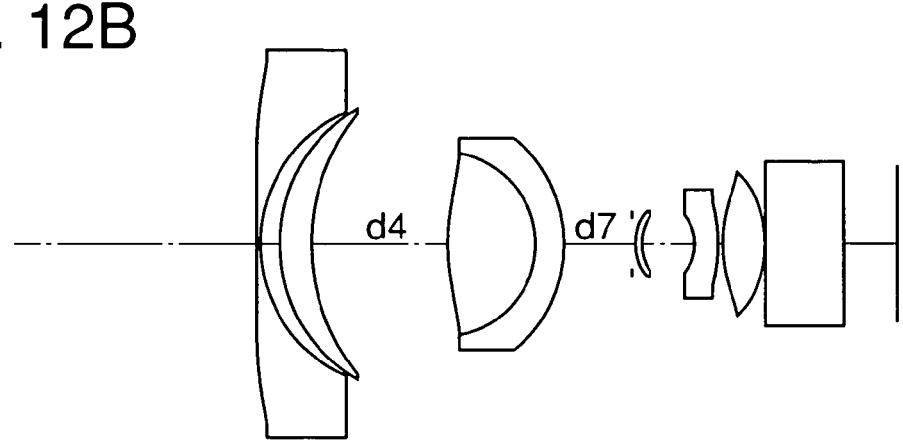
Figure 12C:
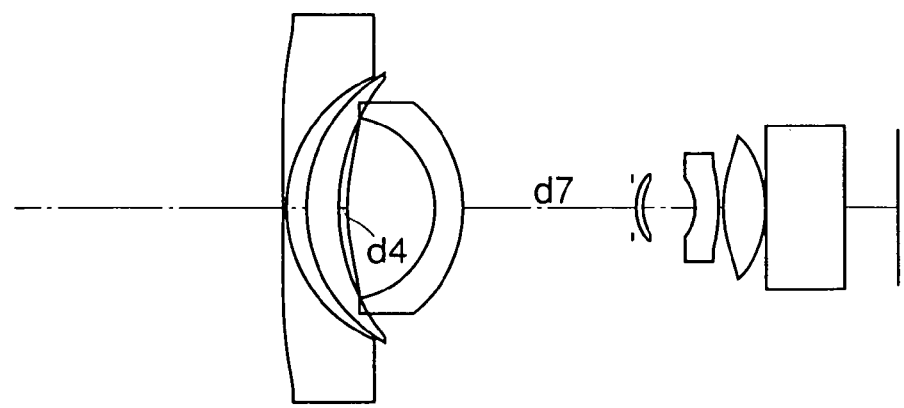
Figure 13A:
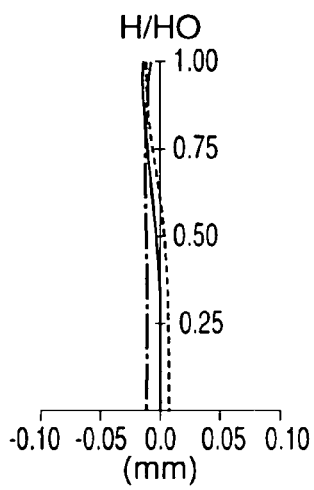
FIGS. 13A to 13I are graphic representations of the aberrations observed in the lens optical system of Example 5.
Figure 13B:
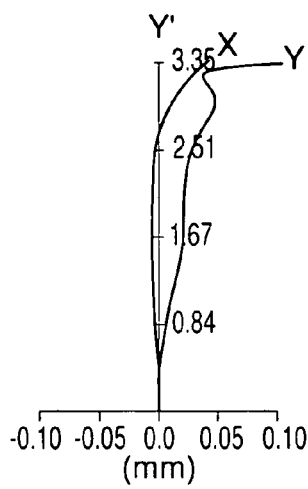
Figure 13C:
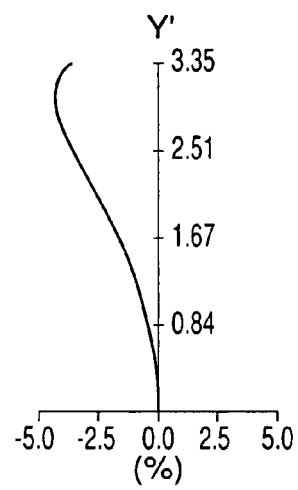
Figure 13D:
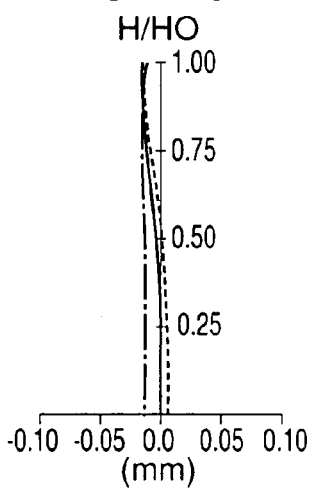
Figure 13E:
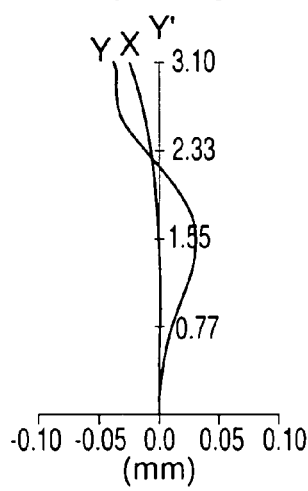
Figure 13F:
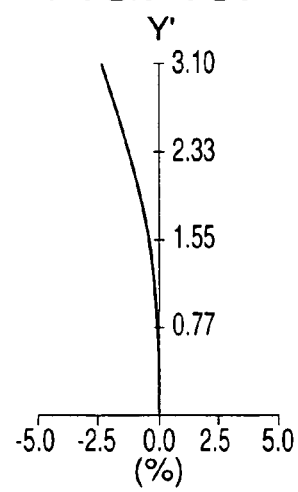
Figure 13G:
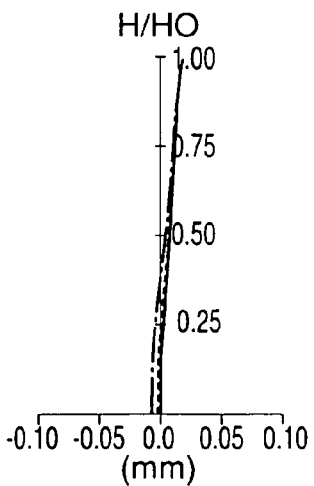
Figure 13H:
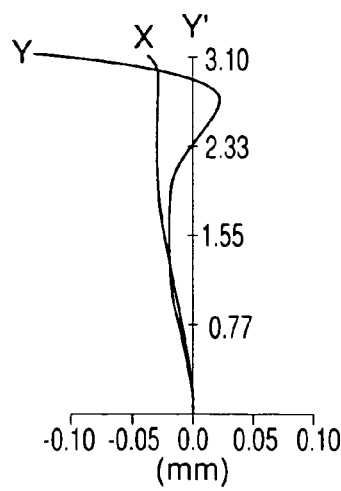
Figure 13I:
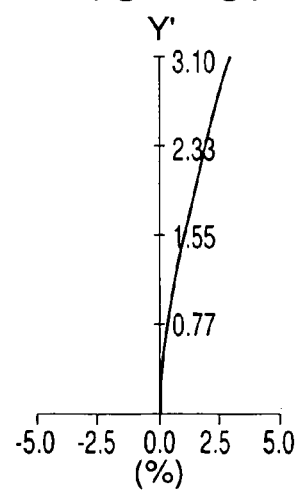

FIGS. 12A to 12C; 17A to 17C; 22A to 22C; 24A to 24C; 26A to 26C; 28A to 28C; and 36A to 36C are lens arrangement diagrams of the lens optical systems of a fifth, a sixth, a seventh, an eighth, a ninth, a tenth, and an eleventh embodiment, respectively, of the present invention. Of these diagrams, FIGS. 12A, 17A, 22A, 24A, 26A, 28A, and 36A illustrate the lens arrangements of the respective lens optical systems in the wide-angle-end condition [W], FIGS. 12B, 17B, 22B, 24B, 26B, 28B, and 36B illustrate the lens arrangements of the respective lens optical systems in the middle-focal-length condition [M], and FIGS. 12C, 17C, 22C, 24C, 26C, 28C, and 36C illustrate the lens arrangements of the respective lens optical systems in the telephoto-end condition [T]. In these diagrams, an air gap marked with di (i=1, 2, 3, . . . ) is the ith axial distance counted from the object side, though only those axial distances that vary with zooming (i.e. variable axial distances) are indicated. Moreover, in these diagrams, a surface marked with ri (i=1, 2, 3, . . . ) is the ith surface counted from the object side (note that the last surface is the image plane (I)), a surface ri marked with an asterisk (*) is an aspherical surface, and a surface ri marked with # is a diffractive lens surface, i.e. a lens surface having a diffraction grating formed thereon.

Embodiments 1 to 4

The lens optical system of the first embodiment (FIGS. 1A to 1C) is composed of a first lens unit (Gr1) having a lens element (L1) and a cemented lens element (L2), a second lens unit (Gr2) having a lens element (L3) and a cemented lens element (L4), a third lens unit (Gr3) having an aperture stop (S), a cemented lens element (L5), and a lens element (L6), and a low-pass filter (LPF). The lens optical system of the second embodiment (FIGS. 2A to 2C) is composed of a first lens unit (Gr1) having a cemented lens element (L1), a second lens unit (Gr2) having a lens element (L2) and a cemented lens element (L3), a third lens unit (Gr3) having an aperture stop (S) and two lens elements (L4 and L5), and a low-pass filter (LPF). The lens optical system of the third embodiment (FIGS. 3A to 3C) is composed of a first lens unit (Gr1) having a lens element (L1) and a cemented lens element (L2), a second lens unit (Gr2) having an aperture stop (S) and a cemented lens element (L3), and a low-pass filter (LPF). The lens optical system of the fourth embodiment (FIG. 4) is composed of an aperture stop (S), a lens element (L1), a cemented lens element (L2), and a low-pass filter (LPF).

As descried above, each of the lens optical systems of the first to fourth embodiments includes a cemented lens element composed of two lens elements made of different materials. Here, the cemented lens element has at its cementing surface (interface) a diffraction grating constituted by a relief pattern, and its two constituent lens elements each have at their interfaces with air a radius of curvature different from the radius of curvature they have at the interface therebetween. In this way, in these embodiments, effective use of a diffractive lens element that offers high diffraction efficiency over a wide wavelength range makes it possible to correct chromatic aberration properly.

In a lens optical system, like those of the first to fourth embodiments, having a cemented lens element, it is preferable that the cemented lens element have a diffraction grating constituted by a relief pattern formed at the interface between its two constituent lens elements and fulfill Condition (1) below.

$$0.1 \leq (\phi p/vd)/(\phi DOE/vDOE) \leq 35 \qquad (1)$$

where $\phi p$ represents the refractive optical power of that one of the two lens elements constituting the cemented lens element which has a refractive optical power of the opposite sign to the diffractive optical power of the interface (note that $\phi p$ does not include the diffractive optical power);

$\nu d$ represents the Abbe number of the material of that one of the two lens elements constituting the cemented lens element which has a refractive optical power of the opposite sign to the diffractive optical power of the interface;

$\phi DOE$ represents the diffractive optical power of the interface; and $\nu DOE$ represents the Abbe-number-equivalent value of the interface.

In a lens optical system, by correcting chromatic aberration by the use of both a diffractive lens element and a combination of two, a positive and a negative, refractive lens elements in such a way that Condition (1) is fulfilled, it is possible:

(A) to minimize the light-diffracting action required in the diffraction grating so that the grating pitch (d) can be made so great as to permit the blaze vertex angle (Θ) to be 70° or more, and (B) to correct chromatic aberration and the secondary spectrum properly.

If the lower limit of Condition (1) is exceeded, the degree to which the diffractive lens element needs to correct chromatic aberration becomes unduly high, and thus the blaze vertex angle of the diffraction grating needs to be made smaller than 70°, or the secondary spectrum becomes too large. If the upper limit of Condition (1) is exceeded, the degree to which the chromatic aberration caused by the optical power of one of the refractive lens elements constituting the cemented lens element is corrected by the chromatic aberration caused by the optical power of the opposite sign of the other becomes unduly high. This requires that the two refractive lens elements be given unduly large (one positive and the other negative) powers. Accordingly, the radii of curvature of the lens surfaces of those lens elements need to be reduced, and thus they cause larger aberrations. As a result, in order to correct the resultant aberrations properly, it is inevitable to use a larger number of lens elements. This leads to an undesirable increase in the manufacturing cost and the size of the optical system.

In a lens optical system, like those of the first to fourth embodiments, having a cemented lens element, it is preferable that the cemented lens element have a diffraction grating constituted by a relief pattern formed at the interface between its two constituent lens elements and fulfill Condition (2) below.

$$0.04 \leq tp/tg \leq 5 \quad (2)$$

where tp represents the axial distance of that one of the two lens elements constituting the cemented lens element which has a refractive optical power of the opposite sign to the diffractive optical power of the interface; and tg represents the axial distance of that one of the two lens elements constituting the cemented lens element which has a refractive optical power of the same sign as the diffractive optical power of the interface.

In a lens optical system, by correcting chromatic aberration by the use of both a diffractive lens element and a combination of two, a positive and a negative, refractive lens elements in such a way that Condition (2) is fulfilled, it is possible to realize a lens optical system that offers the above-described advantages (A) and (B).

The lower limit of Condition (2) is significant in cases where the lens element whose axial distance is represented by tp has a negative optical power. If the lower limit of Condition (2) is exceeded, to give the lens element a sufficiently strong optical power, the radii of curvature of the lens surfaces thereof need to be reduced. This inconveniently increases the aberrations caused by those lens surfaces. Accordingly, if the lower limit of Condition (2) is exceeded, it is essential to increase the number of constituent lens elements in order to correct the resultant aberrations properly. This leads to an undesirable increase in the manufacturing cost and the size of the optical system.

The upper limit of Condition (2) is significant in cases where the lens element whose axial distance is represented by tp has a positive optical power. If the upper limit of Condition (2) is exceeded, to give the lens element sufficiently strong optical power, the radii of curvature of the lens surfaces thereof need to be reduced. This inconveniently increases the aberrations caused by those lens surfaces. Accordingly, if the upper limit of Condition (2) is exceeded, it is essential to increase the number of constituent lens elements in order to correct the resultant aberrations properly. This leads to an undesirable increase in the manufacturing cost and the size of the optical system.

EXAMPLES 1 TO 4

Figure 5A:
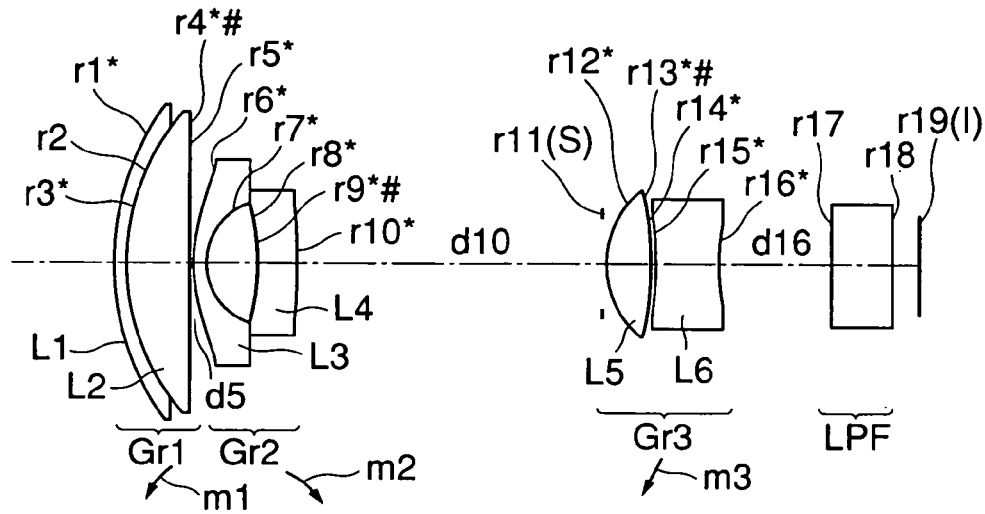
FIGS. 5A to 5C are lens arrangement diagrams of a lens optical system taken up as an example for comparison (Comparison Example 1)
Figure 5B:
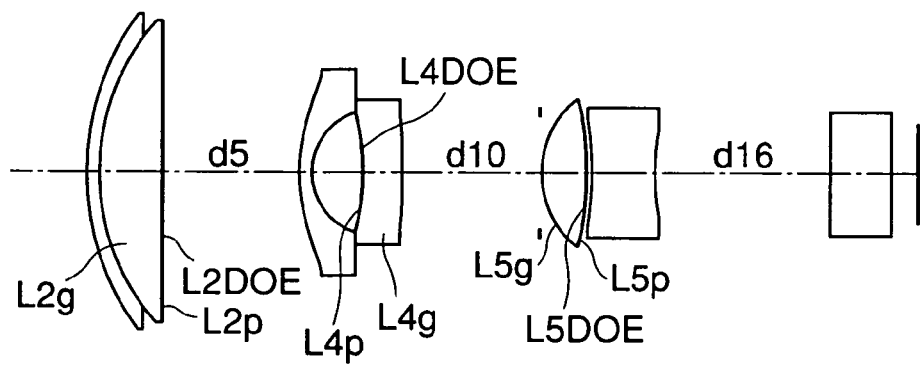
Figure 5C:
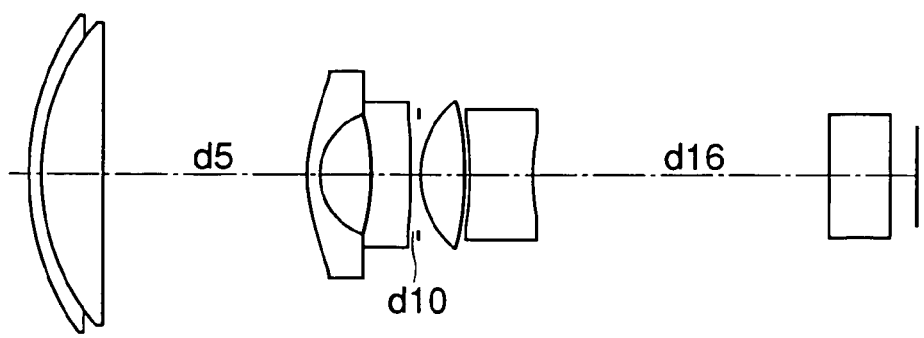
Figure 6A:
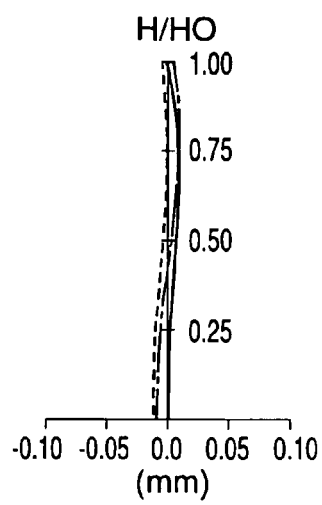
FIGS. 6A to 6I are graphic representations of the aberrations observed in the lens optical system of Example 1.
Figure 6B:
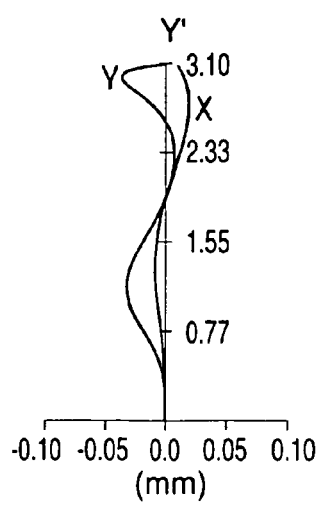
Figure 6C:
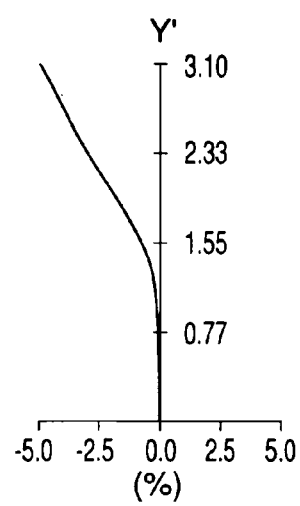
Figure 6D:
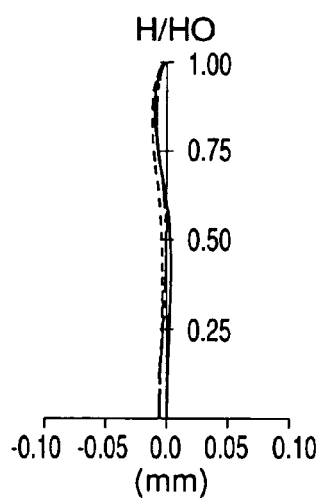
Figure 6E:
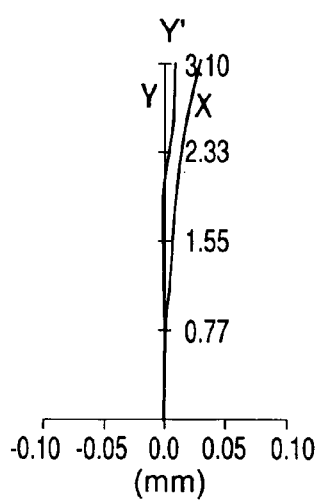
Figure 6F:
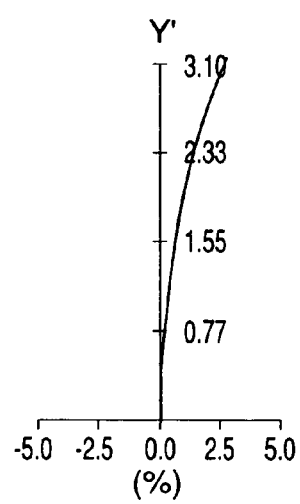
Figure 6G:
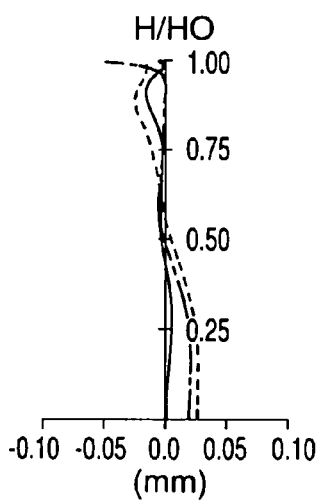
Figure 6H:
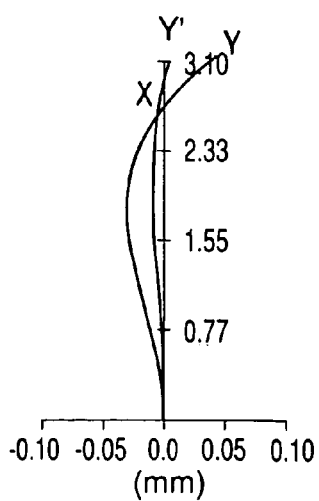
Figure 6I:
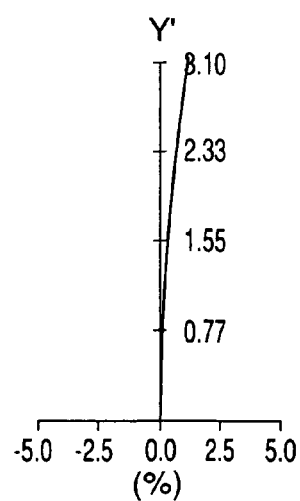
Figure 7A:
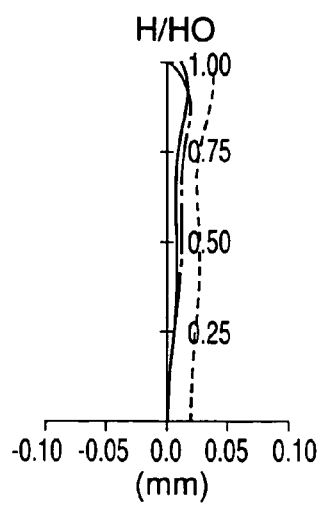
FIGS. 7A to 7I are graphic representations of the aberrations observed in the lens optical system of Example 2.
Figure 7B:
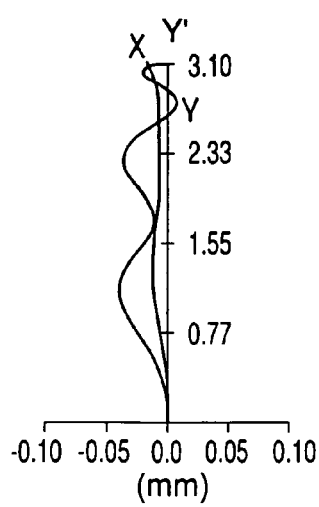
Figure 7C:
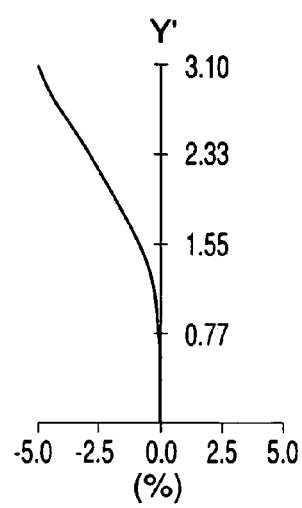
Figure 7D:
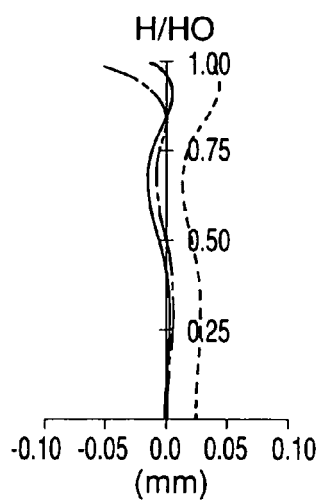
Figure 7E:
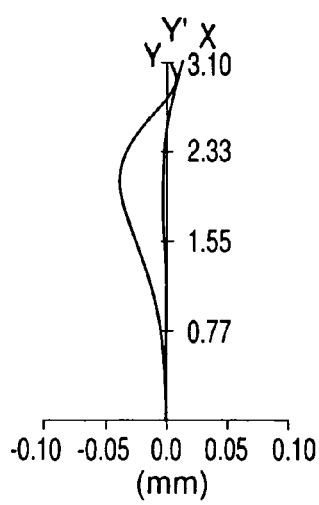
Figure 7F:
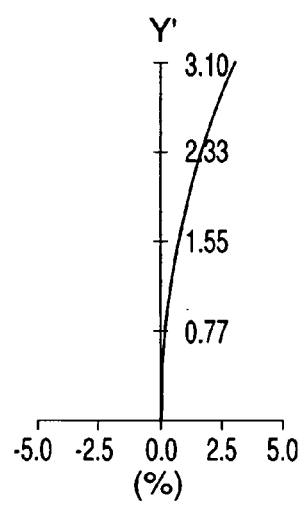
Figure 7G:
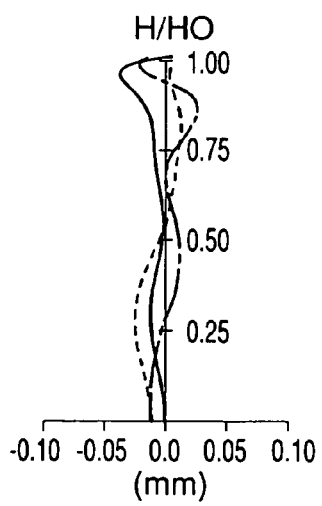
Figure 7H:
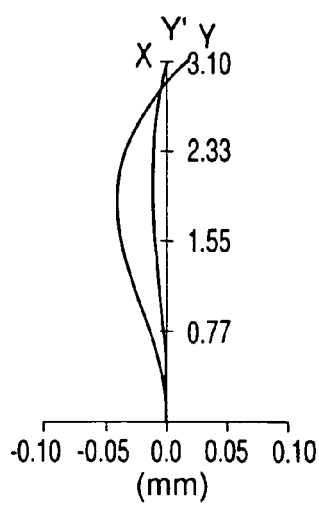
Figure 7I:
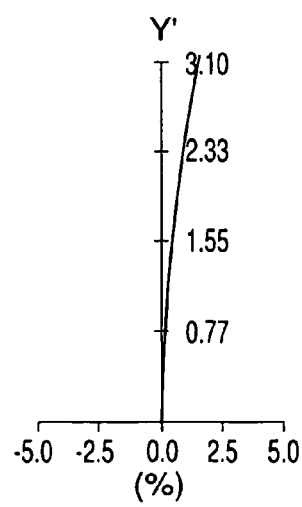
Figure 8A:
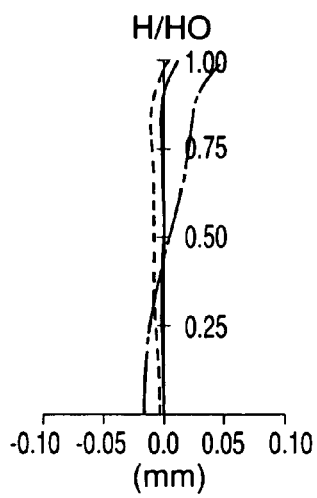
FIGS. 8A to 8I are graphic representations of the aberrations observed in the lens optical system of Example 3.
Figure 8B:
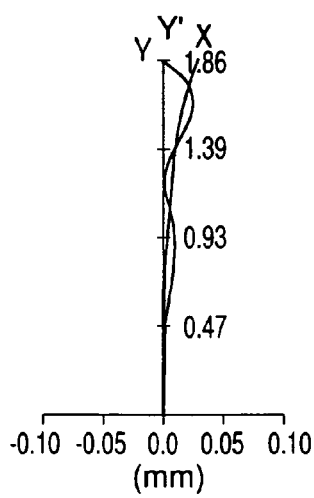
Figure 8C:
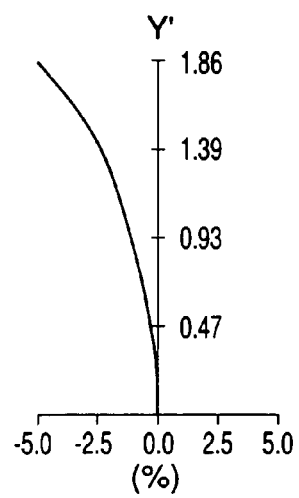
Figure 8D:
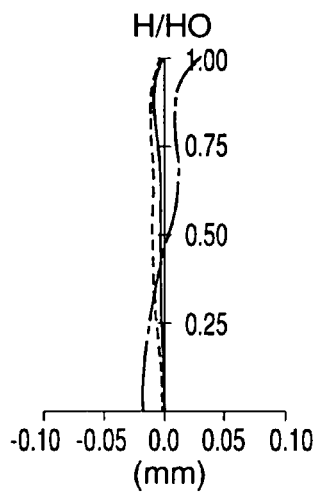
Figure 8E:
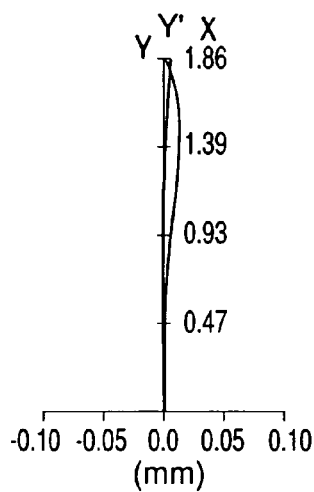
Figure 8F:
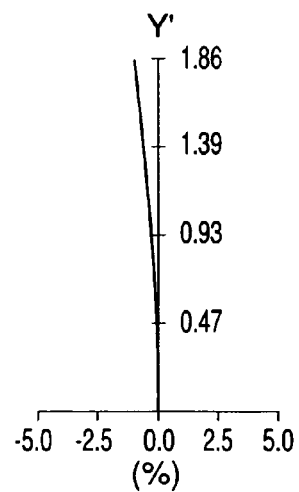
Figure 8G:
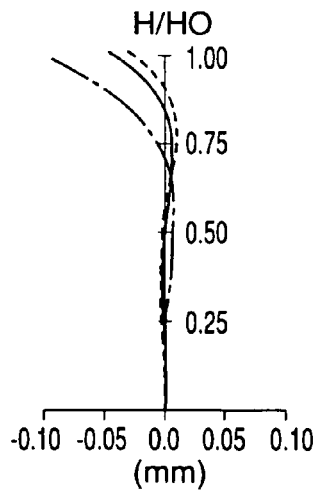
Figure 8H:
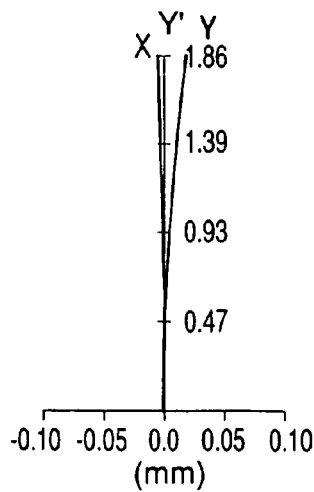
Figure 8I:
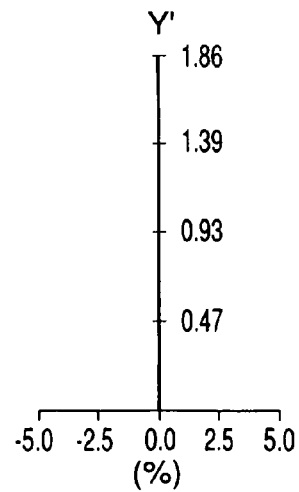

Hereinafter, examples of lens optical systems embodying the present invention will be presented with reference to their construction data, graphic representations of aberrations, and other data. Tables 1 to 4 list the construction data of Examples 1 to 4, which respectively correspond to the first to fourth embodiments described above and have lens arrangements as shown in FIGS. 1A to 1C, 2A to 2C, 3A to 3C, and 4. Moreover, Table 5 lists the construction data of an example taken up for comparison (Comparison Example 1), which corresponds to Example 1 and others and has a lens arrangement as shown in FIGS. 5A to 5C.

In the construction data of each example, ri (i=1, 2, 3, ...) represents the radius of curvature of the ith surface counted from the object side, di (i=1, 2, 3, ...) represents the ith axial distance counted from the object side, and Ni (i=1, 2, 3, ...) and νi (i=1, 2, 3, ...) respectively represent the refractive index for the d line and the Abbe number of the ith optical element counted from the object side. Moreover, in the construction data, for each of the axial distances that vary with zooming (i.e. the variable axial distances), three values are given that are, from left, the axial aerial distance between the lens units at the wide-angle end [W] (i.e. in the shortest-focal-length condition), the same distance at the middle focal length [M], and the same distance at the telephoto end [T] (i.e. in the longest-focal-length condition). Also listed are the focal length f, the half angle of view ω, and the F-number FNO of the entire lens optical system in the three focal-length conditions mentioned just above.

A surface whose radius of curvature ri is marked with an asterisk (*) is an aspherical surface, whose surface shape is defined by Formula (AS) below. A surface whose radius of curvature ri is marked with # is a surface formed as a diffractive optical surface, of which the phase shape of the pitch is defined by Formula (DS) below. Also listed together with the construction data are the aspherical surface data of each aspherical surface, the diffractive optical surface data of each diffractive optical surface, and other data.

$$Z(H)=(C0 \cdot H^2)/(1+ \sqrt{1-C0^2 \cdot H^2})+(A4 \cdot H^4+A6 \cdot H^6+A8 \cdot H^8+A10 \cdot H^{10}) \quad \text{(AS)}$$

where
  Z(H) represents the displacement along the optical axis at the height H (relative to the vertex);
  H represents the height in a direction perpendicular to the optical axis;
  C0 represents the paraxial curvature; and
  Ai represents the aspherical coefficient of the ith order.

$$\phi(H)=(2\pi/\lambda 0) \cdot (C1 \cdot H^2+C2 \cdot H^4) \quad \text{(DS)}$$

where
  φ(H) represents the phase function;
  H represents the height in a direction perpendicular to the optical axis;
  Ci represents the phase function coefficient of the 2ith order; and
  λ0 represents the design wavelength.

Figure 9A:
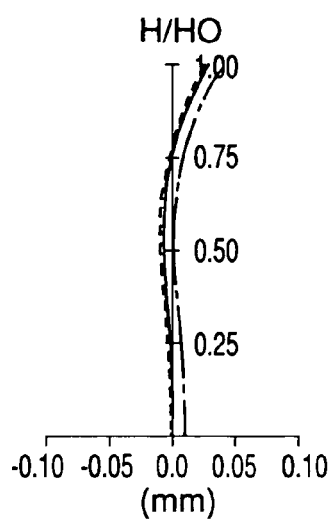
FIGS. 9A to 9C are graphic representations of the aberrations observed in the lens optical system of Example 4.
Figure 9B:
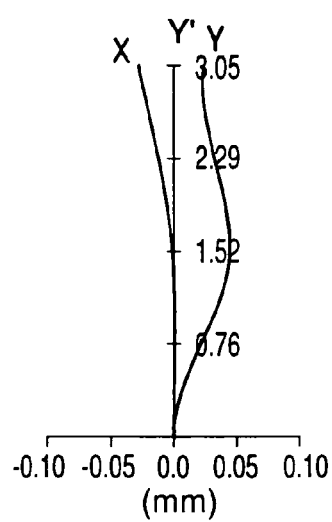
Figure 9C:
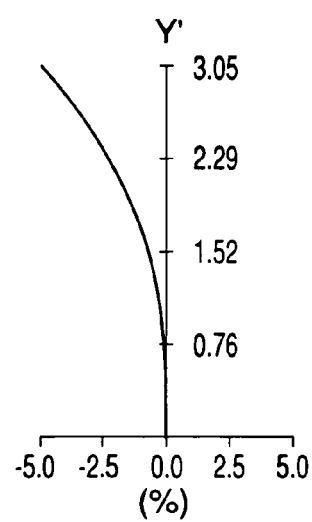
Figure 10A:
FIGS. 10A to 10I are graphic representations of the aberrations observed in the lens optical system of Comparison Example 1.
Figure 10B:
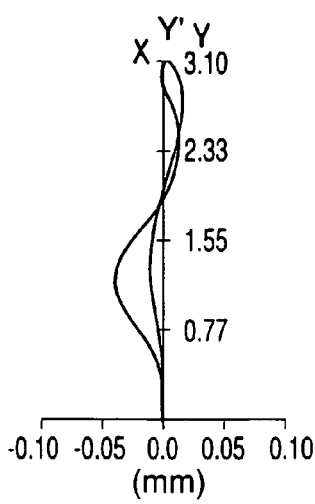
Figure 10C:
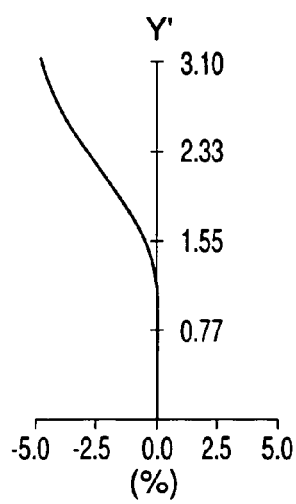
Figure 10D:
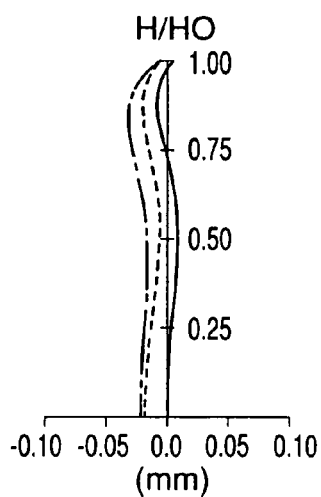
Figure 10E:
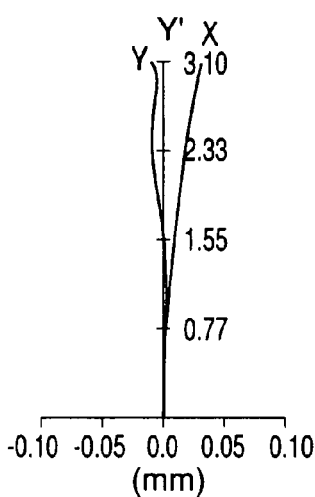
Figure 10F:
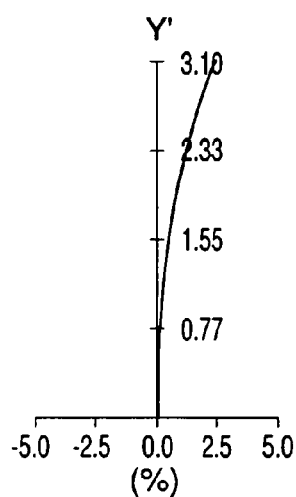
Figure 10G:
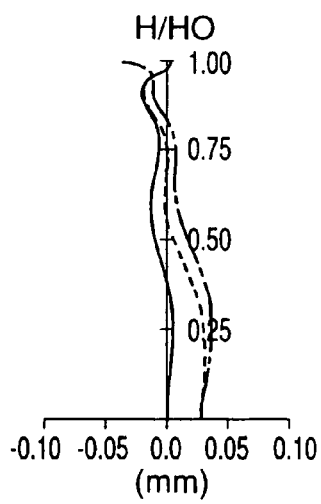
Figure 10H:
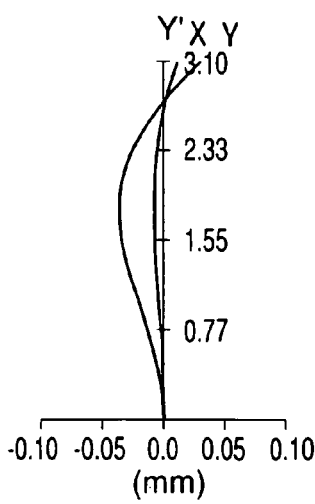
Figure 10I:
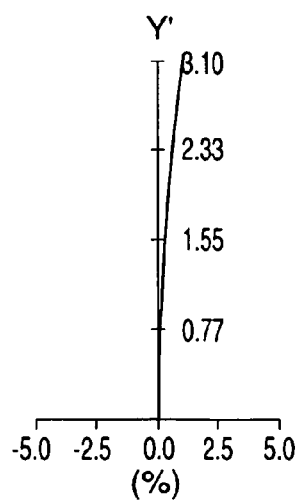
Figure 11:
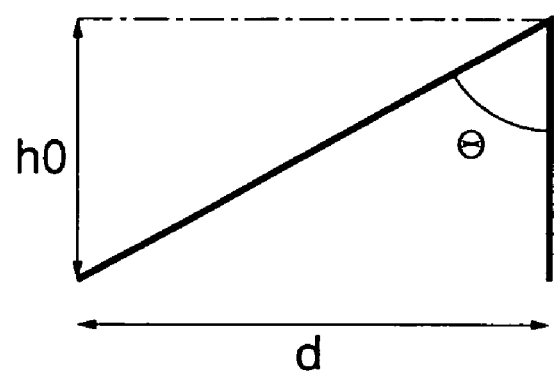
FIG. 11 is a diagram illustrating a blaze shape.

FIGS. 6A to 6I are graphic representations of the aberrations observed in the lens optical system of Example 1; FIGS. 7A to 7I are graphic representations of the aberrations observed in the lens optical system of Example 2; FIGS. 8A to 8I are graphic representations of the aberrations observed in the lens optical system of Example 3; FIGS. 9A to 9C are graphic representations of the aberrations observed in the lens optical system of Example 4; and FIGS. 10A to 10I are graphic representations of the aberrations observed in the lens optical system of Comparison Example 1. Of all the above diagrams, FIGS. 6A to 6C, 7A to 7C, 8A to 8C, and 10A to 10C show the aberrations observed at the wide-angle end [W]; FIGS. 6D to 6F, 7D to 7F, 8D to 8F, and 10D to 10F show the aberrations observed at the middle focal length [M]; and FIGS. 6G to 6I, 7G to 7I, 8G to 8I, and 10G to 10I show the aberrations observed at the telephoto end [T]. Furthermore, of these diagrams, FIGS. 6A, 6D, 6G, 7A, 7D, 7G, 8A, 8D, 8G, 9A, 10A, 10D, and 10G show spherical aberration; FIGS. 6B, 6E, 6H, 7B, 7E, 7H, 8B, 8E, 8H, 9B, 10B, 10E, and 10H show astigmatism; and FIGS. 6C, 6F, 6I, 7C, 7F, 7I, 8C, 8F, 8I, 9C, 10C, 10F, and 10I show distortion. In the spherical aberration diagrams, the broken line represents the aberration for the C line (wavelength λC: 656.3 nm), the solid line represents the aberration for the d line (wavelength λd: 587.6 nm), and the dash-and-dot line represents the aberration for the g line (wavelength kg: 435.8 nm). For spherical aberration (taken along the horizontal axis and given as the deviation (mm) from the paraxial image plane along the optical axis), the value H/H0 obtained by normalizing the height of incidence with respect to the maximum height (i.e. the relative height at which the optical axis crosses the entrance-pupil plane) is taken along the vertical axis. For astigmatism (taken along the horizontal axis and given as the deviation (mm) from the paraxial image plane along the optical axis) and distortion (taken along the horizontal axis and given in %), the image height Y'(mm) is taken along the vertical axis. In the astigmatism diagrams, the solid line X represents the astigmatism on the sagittal plane, and the solid line Y represents the astigmatism on the meridional plane.

Table 6 lists, for the diffraction grating employed in the lens optical system of each example, the grating height (h0) and the minimum grating pitch (dmin) as well as the blaze vertex angle (Θ) at the minimum grating pitch (dmin). In Examples 1 to 4, the light-diffraction action required is successfully minimized by correcting chromatic aberration by the use of both a diffractive lens element and a refractive lens element having an optical power of the opposite sign to the light-diffraction action. This allows the minimum grating pitch (dmin) and thus the blaze vertex angle (Θ) to be made relatively large. In contrast, in Comparison Example 1, the degree to which the diffractive lens element corrects chromatic aberration is relatively high. Therefore, to obtain satisfactorily strong light-diffracting action as required, the minimum grating pitch (dmin) and thus the blaze vertex angle (Θ) need to be made relatively small.

Table 7 lists the degree to which the diffractive lens element corrects chromatic aberration and the degree to which the refractive lens element having an optical power of the opposite sign to the light-diffracting action corrects chromatic aberration. The larger the ratio of the value of (φp/vd) in the refractive lens element to the value of (φDOE/vDOE) in the diffractive lens element (that is, the greater the value of Condition (1)), the higher the degree to which the refractive lens element corrects chromatic aberration. From this, it will be understood that the degree to which the refractive lens element corrects chromatic aberration is higher in Example 1 than in Comparison Example 1. Accordingly, by comparing the spherical aberration observed in Example 1 to that observed in Comparison Example 1, it will be understood that the spherical aberration for the g line (436 nm) or the C line (656 nm) (i.e. the secondary spectrum) is smaller in Example 1 than in Comparison Example 1.

Table 8 lists, for a cemented lens element having a diffraction grating, the ratio of the axial distance of that one of its constituent refractive lens elements which has an optical power of the opposite sign to the diffractive lens element to the axial distance of that one of its constituent refractive lens elements which has an optical power of the same sign as the diffractive lens element. If this ratio (i.e. the value of Condition (2)) is kept in an appropriate range, it is possible to strike a proper balance between the degree to which the diffractive lens element corrects chromatic aberration and the degree to which the refractive lens element having an optical power of the opposite sign to the light-diffraction action corrects chromatic aberration. This makes it possible to achieve proper correction of aberrations other than the secondary spectrum and chromatic aberration. By comparing Example 2 with Comparison Example 1, it will be understood that, even though the aberration correcting performance of these lens optical systems are substantially the same, the former requires fewer constituent lens elements than the latter.

As described heretofore, according to one aspect of the present invention, it is possible to achieve a lens optical system in which chromatic aberration is corrected properly by effective use of a diffractive lens element that offers high diffraction efficiency over a wide wavelength range. Moreover, according to another aspect of the present invention, it is possible to achieve a lens optical system in which chromatic aberration and the secondary spectrum are corrected properly by the use of a diffractive lens element that is easy to manufacture.

Embodiment 5

The lens optical system of the fifth embodiment is built as a three-unit zoom lens system that is composed of, from the object side, a first lens unit (Gr1) having a negative optical power, a second lens unit (Gr2) having a positive optical power, and a third lens unit (Gr3) having a positive optical power, wherein zooming is performed by varying the distance between the first and second lens units (Gr1 and Gr2)

and so forth. In this lens optical system, between the second and third lens units (Gr2 and Gr3), an aperture stop (S) is disposed that is kept in a fixed position together with the third lens unit (Gr3) during zooming. Moreover, a low-pass filter (LPF) is disposed at the image-plane (I) side end of the lens optical system.

In the lens optical system of the fifth embodiment (FIGS. 12A to 12C), the lens units are each composed, from the object side, as follows. The first lens unit (Gr1) is composed of a negative biconcave lens element and a positive meniscus lens element convex to the object side. The second lens unit (Gr2) is composed of a cemented lens element formed by cementing together a positive biconvex lens element and a negative meniscus lens element concave to the object side, with a diffraction grating formed on its cementing surface (the sixth surface (r6)). In this way, to achieve proper correction of chromatic aberration, it is preferable that the second lens unit (Gr2) be provided with a cementing surface and that a diffraction grating be formed on the cementing surface. Moreover, to make this zoom-type lens optical system satisfactorily compact, it is preferable to provide a diffraction grating in the second lens unit (Gr2) from the viewpoint of aberration correction. This will be described in detail later. The third lens unit (Gr3) is composed of a positive meniscus lens element convex to the object side, a negative meniscus lens element concave to the object side, and a positive biconvex lens element.

Next, the conditions will be described that are preferably fulfilled by a lens optical system as exemplified by the fifth embodiment, i.e. a zoom-type lens optical system having three lens units that are a negative, a positive, and a positive lens unit, wherein a diffraction grating is disposed in the second lens unit (Gr2). Note that it is not necessary that all of the conditions given below be fulfilled simultaneously; if any of those conditions is fulfilled, it is possible to achieve the corresponding advantages. It is needless to say, however, that more than one condition should preferably be fulfilled to obtain satisfactory results in terms of optical performance, miniaturization, and so forth.

It is preferable that the diffraction grating fulfill Condition (3) below.

$$0.005 < \phi doe/\phi gr2 < 0.03 \quad (3)$$

wherein $\phi$doe represents the optical power of the diffraction grating; and $\phi$gr2 represents the optical power of the second lens unit (Gr2).

Condition (3) defines the preferable ratio of the optical power doe of the diffraction grating to the optical power$\phi$gr2 of the second lens unit (Gr2) (which includes the optical power$\phi$doe). Fulfillment of Condition (3) makes it possible to achieve a satisfactorily compact lens optical system. If the value of Condition (3) is less than its lower limit, the diffractive lens element does not serve to correct chromatic aberration, and thus the lens optical system as a whole becomes unduly large. In contrast, if the value of Condition (3) is greater than its upper limit, the diffractive lens element causes unduly large astigmatism and thus does not serve to correct astigmatism. In this case, correction of astigmatism cannot be achieved without making the lens optical system as a whole unduly large.

It is preferable that the diffraction grating fulfill at least one of Conditions (4) and (5) below.

$$0.1 < tW/fW < 0.4 \quad (4)$$

$$0.4 < tT/fT < 1.2 \quad (5)$$

wherein tW represents the axial distance, as converted into an aerial distance, between the diffraction grating and the aperture stop (S) at the wide-angle end [W];

tT represents the axial distance, as converted into an aerial distance, between the diffraction grating and the aperture stop (S) at the telephoto end [T];

fW represents the focal length of the entire zoom lens system at the wide-angle end [W]; and fT represents the focal length of the entire zoom lens system at the telephoto end [T].

Fulfillment of Conditions (4) or (5) or both makes it possible to achieve a lens optical system that corrects chromatic aberration properly. If the value of Condition (4) is less than its lower limit, it is impossible to hold the lens units in position. In contrast, if the value of Condition (4) is greater than its upper limit, longitudinal chromatic aberration is undercorrected at the wide-angle end [W]. On the other hand, if the value of Condition (5) is less than its lower limit, lateral chromatic aberration is undercorrected at the telephoto end [T]. In contrast, if the value of Condition (5) is greater than its upper limit, the lens optical system as a whole becomes unduly large.

It is preferable that Condition (6) below be fulfilled. Fulfillment of Condition (6) makes it possible to keep within an acceptable range the loss of brightness as occurs at the edge of image frame when an image sensor is used.

$$|Y'max/PZ| < 0.4 \quad (6)$$

wherein

Y'max represents the maximum image height; and

PZ represents the distance from the image plane (I) to the exit pupil.

EXAMPLE 5

Figure 14A:
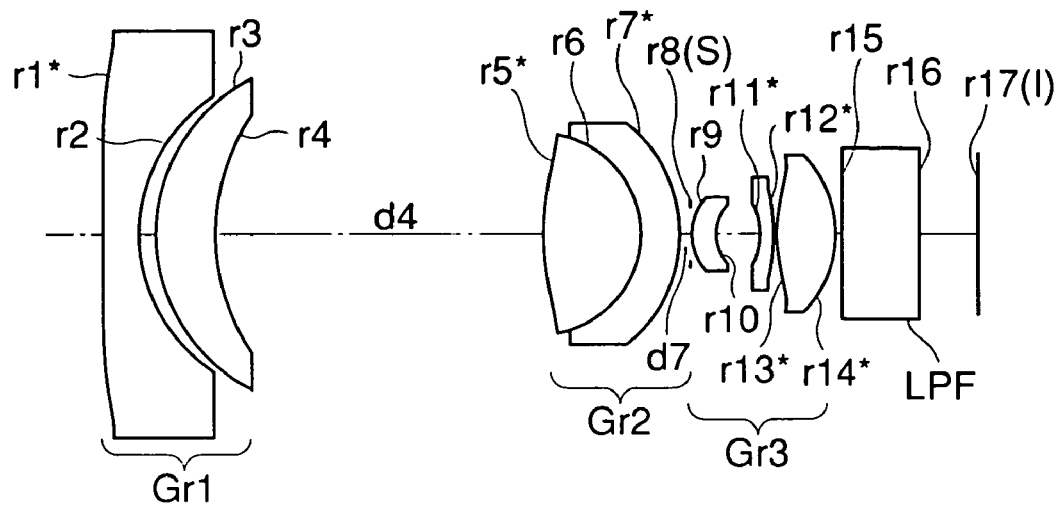
FIGS. 14A to 14C are lens arrangement diagrams of a lens optical system taken up as an example for comparison (Comparison Example 2)
Figure 14B:
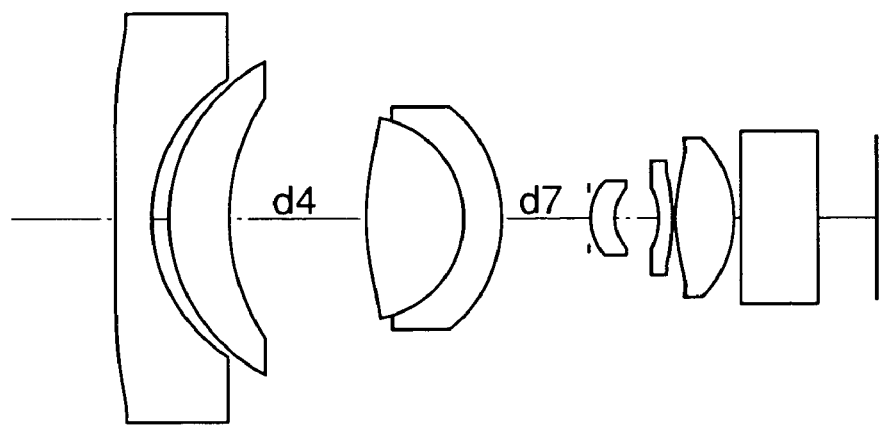
Figure 14C:
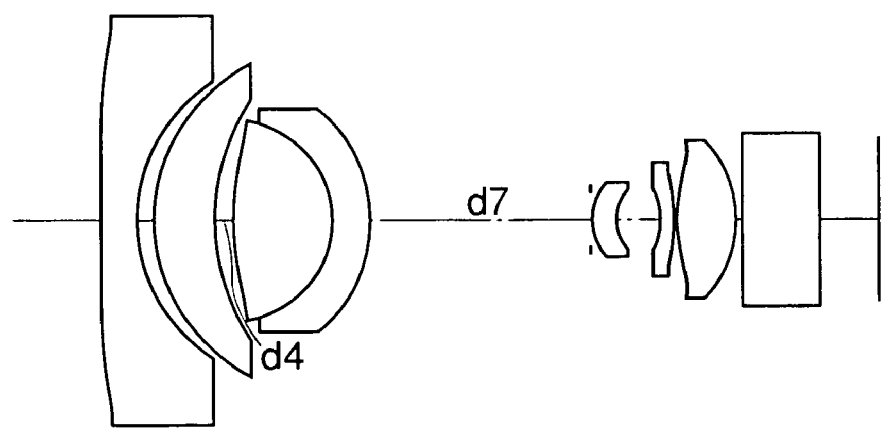
Figure 15A:
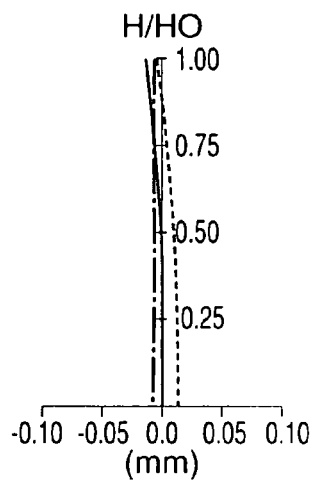
FIGS. 15A to 15I are graphic representations of the aberrations observed in the lens optical system of Comparison Example 2.
Figure 15B:
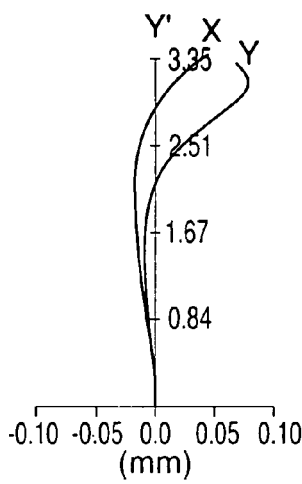
Figure 15C:
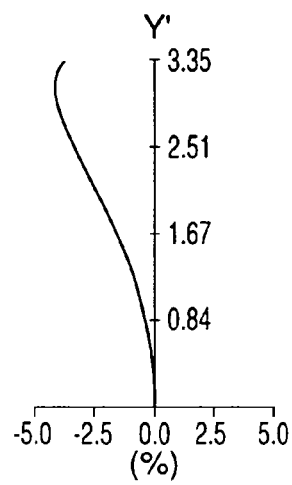
Figure 15D:
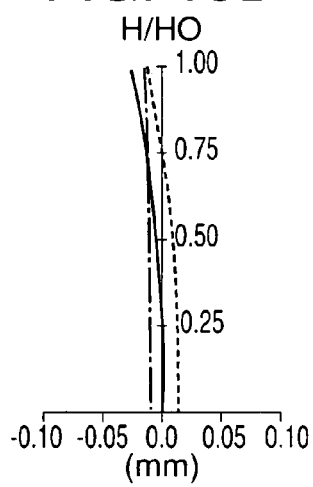
Figure 15E:
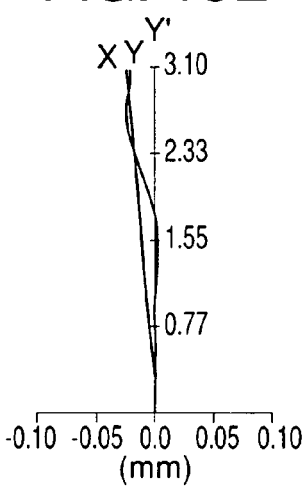
Figure 15F:
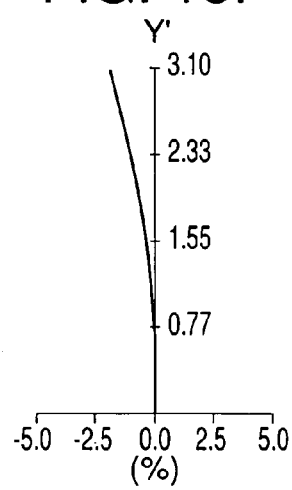
Figure 15G:
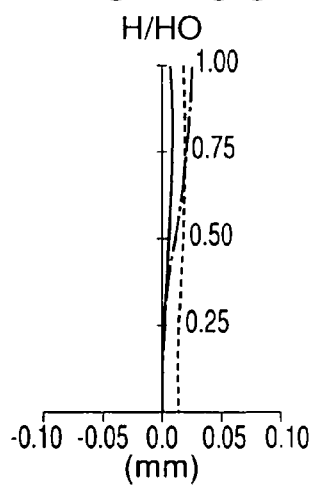
Figure 15H:
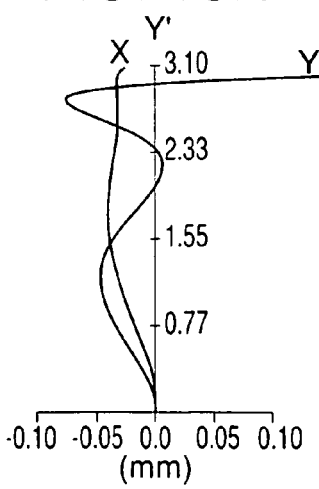
Figure 15I:
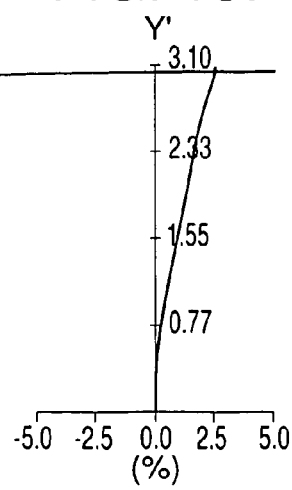

Hereinafter, an example of a lens optical system embodying the present invention will be presented with reference to its construction data, graphic representations of aberrations, and other data. Table 9 lists the construction data of Example 5, which corresponds to the fifth embodiment described above and has a lens arrangement as shown in FIGS. 12A, 12B, and 12C. Table 10 lists the construction data of Comparison Example 2, which corresponds to Example 5 but has a lens arrangement as shown in FIGS. 14A, 14B, and 14C (i.e. having no diffraction grating).

In the construction data of each example, ri (i=1, 2, 3, ...) represents the radius of curvature of the ith surface counted from the object side, di (i=1, 2, 3, ...) represents the ith axial distance counted from the object side, and Ni (i=1, 2, 3, ...) and vi (i=1, 2, 3, ...) respectively represent the refractive index for the d line and the Abbe number of the ith optical element counted from the object side. Moreover, in the construction data, for each of the axial distances that vary with zooming (i.e. the variable axial distances), three values are given that are, from left, the axial aerial distance between the lens units at the wide-angle end [W] (i.e. in the shortest-focal-length condition), the same distance at the middle focal length [M], and the same distance at the telephoto end [T] (i.e. in the longest-focal-length condition).

Also listed are the focal length f, the half angle of view ω (°), and the F-number FNO of the entire lens optical system in the three focal-length conditions [W], [M], and [T] mentioned just above, and the values corresponding to Conditions noted above.

A surface whose radius of curvature ri is marked with an asterisk (*) is an aspherical surface, whose surface shape is defined by Formula (as) below. A surface whose radius of curvature ri is marked with # is a diffractive lens surface, i.e. a lens surface having a diffraction grating formed thereon, of which the phase shape of the pitch is defined by Formula (ds) below. Also listed together are the aspherical surface data of each aspherical surface, the diffractive surface data of each diffractive lens surface, and other data.

Formula (as) provides that:

$$Z(H) = (C0 \cdot H^2)/\{1+ \sqrt{(1-C0^2 \cdot H^2)}\} + (A \cdot H^4 + B \cdot H^6 + C \cdot H^8 + D \cdot H^{10})  \quad (as)$$

wherein

Z(H) represents the displacement along the optical axis at a height H (relative to the vertex);

H represents the height with respect to the optical axis (i.e. the height in a direction perpendicular to the optical axis);

C0 represents the paraxial curvature; and

A, B, C, and D represent the aspherical coefficients.

Formula (ds) provides that:

$$\Phi(H) = (2\pi/\lambda 0) \cdot (C1 \cdot H^2 + C2 \cdot H^4 + C3 \sim H^6)  \quad (ds)$$

wherein

Φ(H) represents the phase function;

H represents the height with respect to the optical axis (i.e. the height in a direction perpendicular to the optical axis);

λ0 represents the design wavelength; and

C1, C2, and C3 represent the phase function coefficients.

The lens optical system of Comparison Example 2 is built as a three-unit zoom lens system of a negative-positive-positive configuration. In this lens optical system, each of the lens units is composed as follows. The first lens unit (Gr1) is composed of two lens elements that are a negative lens element and a positive lens element. The second lens unit (Gr2) is composed of two lens elements that are a positive lens element and a negative lens element. The third lens unit (Gr3) is composed of three lens elements that are a positive lens element, a negative lens element, and a positive lens element. Table 11 lists the chromatic aberration coefficients of the entire lens optical system, as well as of the individual lens units (Gr1, Gr2, and Gr3) thereof, of Comparison Example 2, as observed at the wide-angle end [W] and the telephoto end [T] (note that LC represents the longitudinal chromatic aberration coefficient and TC represents the lateral chromatic aberration coefficient). In Comparison Example 2, as will be understood from the chromatic aberration coefficients of the entire lens optical system listed in Table 11, at the wide angle end [W], the longitudinal chromatic aberration coefficient LC and the lateral chromatic aberration coefficient TC take great positive values, and, at the telephoto end [T], the lateral chromatic aberration coefficient TC takes a great negative value. Now, how chromatic aberration is corrected in the lens optical system of Comparison Example 2 if a diffractive lens element is provided in the first, second, or third lens unit (Gr1, Gr2, and Gr3) will be described.

Assume that a diffractive lens element is provided in the first lens unit (Gr1) of the lens optical system of Comparison Example 2. In this lens optical system, the first lens unit (Gr1) is disposed away from the aperture stop (S) on the front side thereof, and therefore the lateral chromatic aberration coefficient TC takes a great value. However, in Comparison Example 2, the lateral chromatic aberration coefficient TC changes from positive to negative over the range from the wide-angle end [W] to the telephoto end [T]. Thus, because of the lateral chromatic aberration coefficient TC produced by the diffractive lens element included in the first lens unit (Gr1), the lateral chromatic aberration coefficient TC of the entire lens optical system cannot be made to decrease gradually over the range from the wide-angle end [W] to the telephoto end [T]. Accordingly, it is not preferable to provide a diffractive lens element in the first lens unit (Gr1).

Assume that a diffractive lens element is provided in the second lens unit (Gr2) of the lens optical system of Comparison Example 2. In this case, the lens arrangement of Comparison Example 2 corresponds to the lens arrangement of Example 5. Table 12 lists, as Table 11 does, the chromatic aberration coefficients of the entire lens optical system, as well as of the individual lens units (Gr1, Gr2, and Gr3) thereof, of Example 5, as observed at the wide angle end [W] and the telephoto end [T]. Note that, here, for the second lens unit (Gr2), two sets of values are given, with the chromatic aberration coefficients of the entire second lens unit (Gr2) listed in the left-hand column and the chromatic aberration coefficients produced by the diffractive lens element included therein listed in the right-hand column.

In this lens optical system, the second lens unit (Gr2) is disposed immediately in front of the aperture stop (S) at the wide-angle end [W], and is disposed away from the aperture stop (S) on the front side thereof at the telephoto end [T]. Thus, at the wide-angle end [W], the longitudinal chromatic aberration coefficient LC takes a great value, and, at the telephoto end [T], the lateral chromatic aberration coefficient TC takes a great value. Accordingly, the negative longitudinal chromatic aberration coefficient LC produced by the diffractive lens element included in the second lens unit (Gr2) at the wide-angle end [W] acts to reduce effectively the longitudinal chromatic aberration coefficient LC of the entire lens optical system at the wide-angle end [W]. In addition, the positive lateral chromatic aberration coefficient TC of the diffractive lens element included in the second lens unit (Gr2) at the telephoto end [T] acts to reduce effectively the lateral chromatic aberration coefficient TC of the entire lens optical system at the telephoto end [T].

Assume that a diffractive lens element is provided in the third lens unit (Gr3) of the lens optical system of Comparison Example 2. In this lens optical system, since the third lens unit (Gr3) is disposed immediately behind the aperture stop (S), the longitudinal chromatic aberration coefficient LC takes a great value. Accordingly, the negative longitudinal chromatic aberration coefficient LC produced by the diffractive lens element included in the third lens unit (Gr3) at the wide-angle end [W] acts to reduce effectively the longitudinal chromatic aberration coefficient LC of the entire lens optical system at the wide-angle end [W]. In the light of the foregoing, it will be understood that it is preferable to provide a diffractive lens element in the second lens unit (Gr2) and that the diffractive lens element exhibits the greatest chromatic aberration correction effect when provided in the second lens unit (Gr2).

Figure 16A:
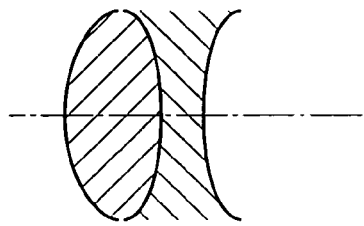
FIGS. 16A to 16C are diagrams illustrating the astigmatism and the Petzval effect obtained when a diffractive lens element is used.
Figure 16B:
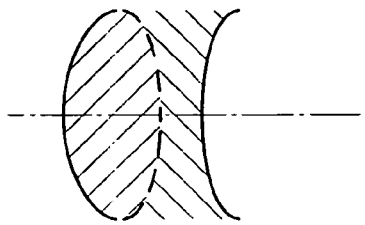
Figure 16C:
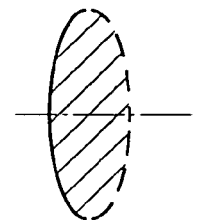
Figure 17A:
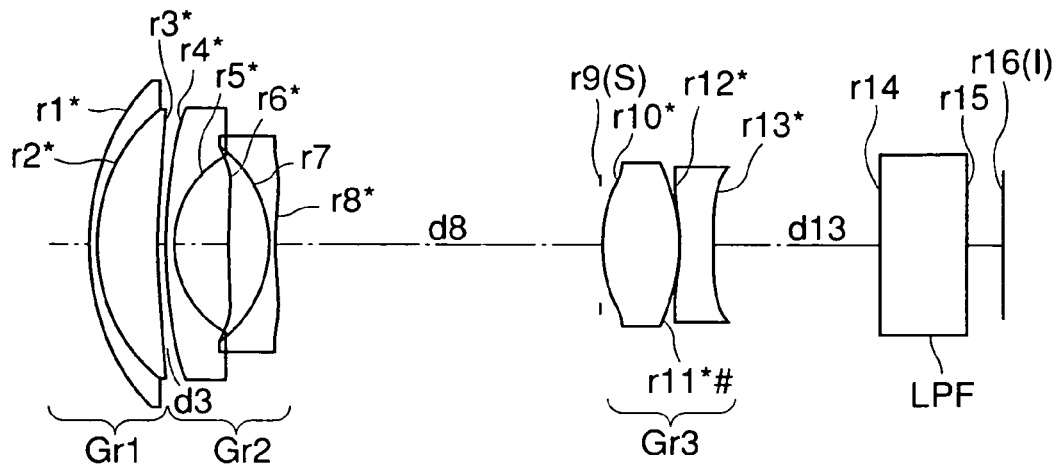
FIGS. 17A to 17C are lens arrangement diagrams of the lens optical system of a sixth embodiment (Example 6) of the present invention.
Figure 17B:
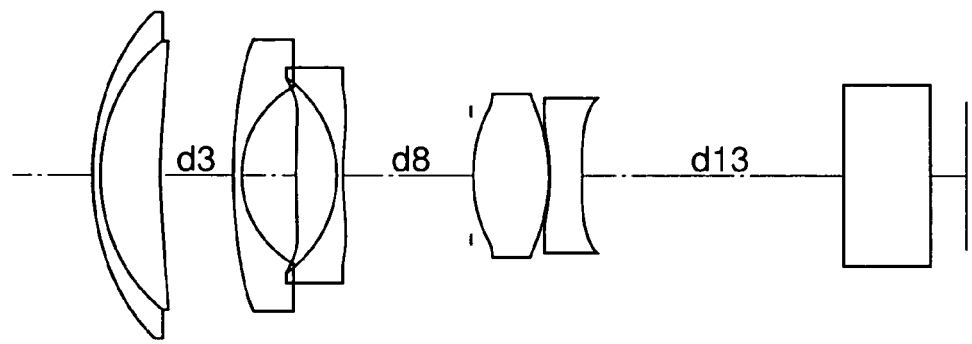
Figure 17C:
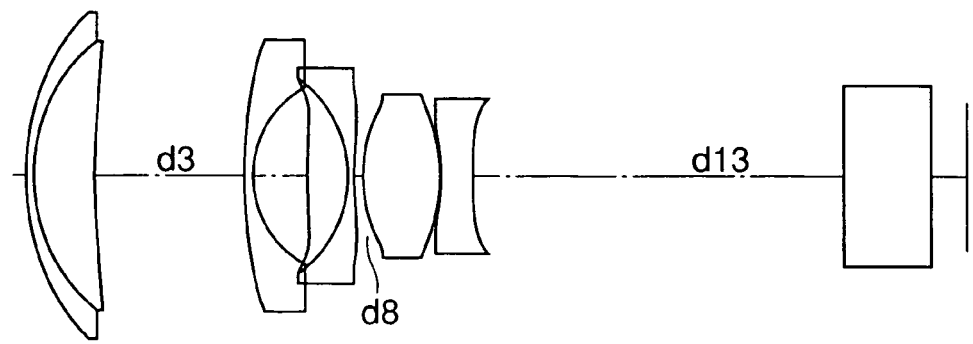
Figure 18A:
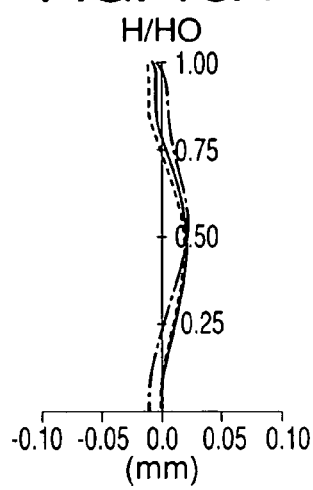
FIGS. 18A to 18I are graphic representations of the aberrations observed in the lens optical system of Example 6.
Figure 18B:
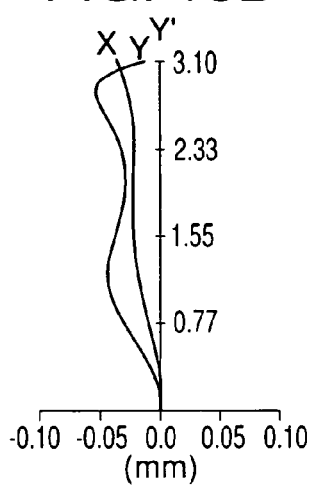
Figure 18C:
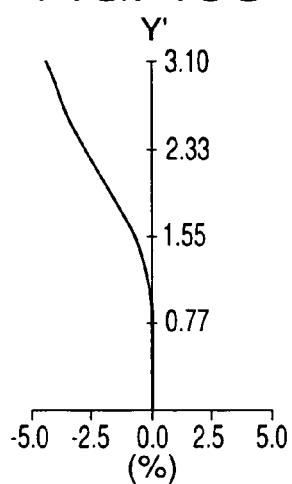
Figure 18D:
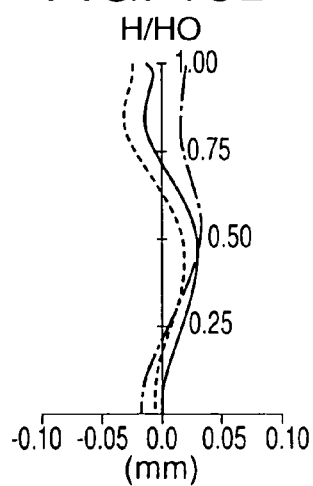
Figure 18E:
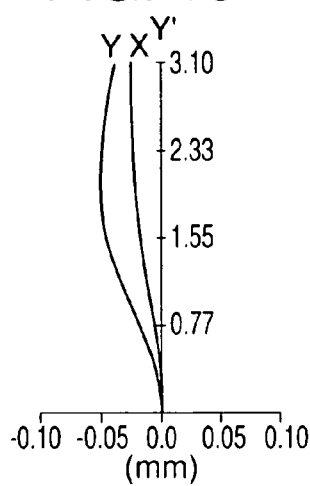
Figure 18F:
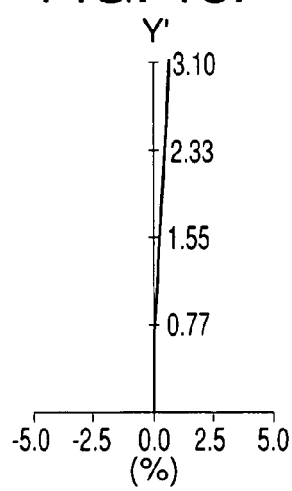
Figure 18G:
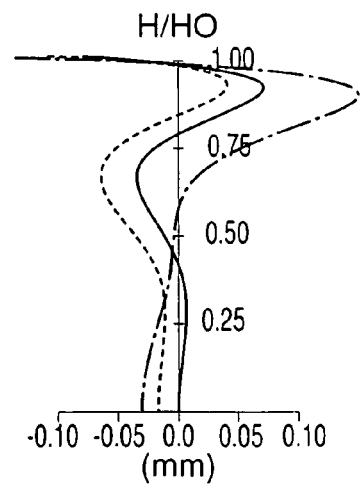
Figure 18H:
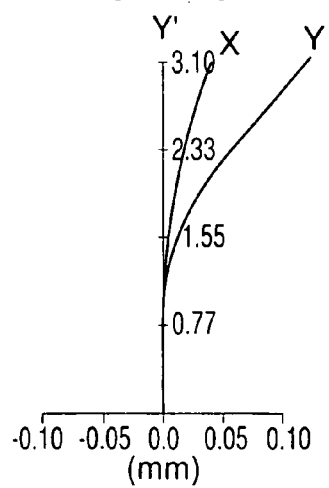
Figure 18I:
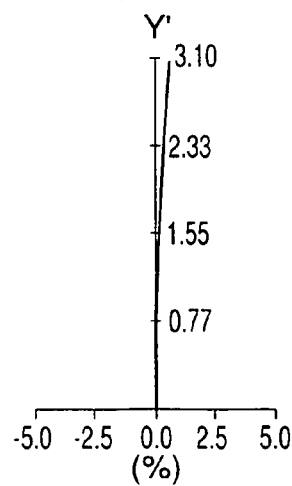

Next, the astigmatism and the Petzval effect observed when a diffractive lens element is used will be described. Here, the following three models (a), (b), and (c) of a diffractive lens element, i.e. an optical system composed of a thin lens element, as shown in FIGS. 16A, 16B, and 16C, respectively, will be considered.

(a) a cemented lens element formed by cementing together a positive and a negative lens element;

(b) a cemented lens element formed by cementing together a positive and a negative lens element, with a diffractive lens surface (indicated by a broken line) formed on its cementing surface; and (c) a single positive lens element having a diffractive lens surface (indicated by a broken line) formed thereon.

In the model (a), chromatic aberration is corrected by the combination of the positive and negative lens elements. In the model (b), chromatic aberration is corrected by the combination of the positive and negative lens elements and also by the diffractive lens surface. In the model (c), chromatic aberration is corrected solely by the diffractive lens surface. The relationship among these models (a), (b), and (c) in terms of the degree to which they, acting as diffractive lens elements, correct chromatic aberration is given as: (a)<(b)<(c). Thus, the relationship among those models (a), (b), and (c) in terms of the power they exert as diffractive lens elements is also given as: (a)<(b)<(c). Accordingly, the diffractive lens element of the model (c), which corrects chromatic aberration to the highest degree, exerts the strongest optical power.

In Comparison Example 2, the second lens unit (Gr2) is composed of a positive and a negative lens element. The positive lens element is made of a glass material that has a relatively low refractive index and a relatively low dispersion. The negative lens element is made of a glass material that has a relatively high refractive index and a relatively high dispersion. Correspondingly, it is assumed that the cemented lens element constituting the models (a) and (b) employs a positive lens element made of a glass material that has a relatively low refractive index and a relatively low dispersion, and a negative lens element made of a glass material that has a relatively high refractive index and a relatively high dispersion. Table 13 lists the data of the glass materials employed here (note that nd represents the refractive index for the d line and vd represents the Abbe number).

Table 14 lists the aberration coefficients of the optical system as a whole of the models (a), (b), and (c) (note that PT represents a Petzval coefficient and AS represents an astigmatism coefficient). In Comparison Example 2, the second lens unit (Gr2) is disposed on the front side of the aperture stop (S). Correspondingly, the aberration coefficients are calculated on the assumption that the models (a), (b), or (c) is disposed on the front side of the aperture stop (S). Moreover, the aberration coefficients of the models (a), (b), and (c) are calculated on the assumption that the lens surfaces are given curvatures (bending) such that the spherical aberration coefficients of the entire optical system is minimized. As will be understood from Table 14, the stronger the optical power of the diffractive lens element, the smaller the Petzval coefficient PT. On the other hand, the weaker (or the stronger) the optical power of the diffractive lens element, the greater the astigmatism coefficient AS; that is, the astigmatism coefficient AS is at its minimum when the diffractive lens element has a predetermined optical power.

Table 15 lists the Petzval coefficients PT and the astigmatism coefficients AS as observed in Comparison Example 2 and Example 5 (an optical system having a diffractive lens element disposed in its second lens unit (Gr2)). These two optical systems are designed to have such sizes as to offer equivalent lens performance. As will be understood from Table 15, in Comparison Example 2, at the telephoto end [T], the astigmatism coefficient AS takes a great positive value; in contrast, in Example 5, the diffractive lens element included in the second lens unit (Gr2) serves to reduce the astigmatism coefficient AS of that lens unit.

As will be understood from the foregoing, with a lens optical system employing a diffractive lens element, how compact it can be made depends on the balance between the effect of chromatic aberration correction and the effects of the Petzval sum and astigmatism. Moreover, by providing a diffractive lens element in the second lens unit (Gr2) of a zoom-type lens optical system having three lens units that are a negative, a positive, and a positive lens unit, like that of Example 5, it is possible to achieve a satisfactorily compact lens optical system, thanks to the effect of chromatic aberration correction.

FIGS. 13A to 13I are graphic representations of the aberrations observed in the lens optical system of Example 5, and FIGS. 15A to 15I are graphic representations of the aberrations observed in the lens optical system of Comparison Example 2. Of these diagrams, FIGS. 13A, 13B, 13C, 15A, 15B, and 15C show the aberrations observed at the wide-angle end [W]; FIGS. 13D, 13E, 13F, 15D, 15E, and 15F show the aberrations observed at the middle focal length [M]; and FIGS. 13G, 13H, 13I, 15G, 15H, and 15I show the aberrations observed at the telephoto end [T]. Furthermore, of these diagrams, FIGS. 13A, 13D, 13G, 15A, 15D, and 15G show spherical aberration; FIGS. 13B, 13E, 13H, 15B, 15E, and 15H show astigmatism; and FIGS. 13C, 13F, 13I, 15C, 15F, and 15I show distortion. In the spherical aberration diagrams, the value H/H0 obtained by normalizing the height H at which a light ray enters the entrance pupil with respect to the maximum height H0 (=1) (i.e. the relative height at which the light ray crosses the entrance-pupil plane) is taken along the vertical axis, and the deviation (mm) from the paraxial imaging position along the optical axis is taken along the horizontal axis. In addition, the broken line represents the spherical aberration for the C line (wavelength $\lambda C$: 656. 3 nm), the solid line represents the spherical aberration for the d line (wavelength $\lambda d$: 587. 6 nm), and the dash-and-dot line represents the spherical aberration for the g line (wavelength $\lambda g$: 435. 8 nm). In the astigmatism diagrams, the image height Y' (mm) is taken along the vertical axis, and the deviation (mm) from the paraxial imaging position along the optical axis is taken along the horizontal axis. In addition, the solid line X represents the astigmatism on the sagittal plane, and the solid line Y represents the astigmatism on the meridional plane. In the distortion diagrams, the image height Y' (mm) is taken along the vertical axis, and the amount of distortion (%) is taken along the horizontal axis.

Embodiment 6

The lens optical system of the sixth embodiment is built as a three-unit zoom lens system that is composed of, from the object side, a first lens unit (Gr1) having a positive optical power, a second lens unit (Gr2) having a negative optical power, and a third lens unit (Gr3) having a positive optical power, wherein zooming is performed by varying the distance between the first and second lens units (Gr1 and Gr2) and so forth. In this lens optical system, between the second and third lens units (Gr2 and Gr3), an aperture stop (S) is disposed that moves together with the third lens unit (Gr3) during zooming. Moreover, a low-pass filter (LPF) is disposed at the image-plane (I) side end of the lens optical system.

In the lens optical system of the sixth embodiment (FIGS. 17A to 17C), the lens units are each composed, from the object side, as follows. The first lens unit (Gr1) is composed of a cemented lens element formed by cementing together a negative meniscus lens element convex to the object side and a positive meniscus lens element convex to the object side. The second lens unit (Gr2) is composed of a negative meniscus lens element concave to the image side and a cemented lens element formed by cementing together a positive biconvex lens element and a negative biconcave lens element. The third lens unit (Gr3) is composed of a positive biconvex lens element and a negative meniscus lens element concave to the object side, with a diffraction grating formed on its eleventh surface (r11). In order to make this zoom-type lens optical system satisfactorily compact, it is preferable to provide a diffraction grating in the third lens unit (Gr3) from the viewpoint of aberration correction. This will be described in detail later.

Next, the conditions will be described that are preferably fulfilled by a lens optical system as exemplified by the sixth embodiment, i.e. a zoom-type lens optical system having three lens units that are a positive, a negative, and a positive lens unit, wherein a diffraction grating is disposed in the third lens unit (Gr3). Note that it is not necessary that all of the conditions given below be fulfilled simultaneously; if any of those conditions is fulfilled, it is possible to achieve the corresponding advantages. It is needless to say, however, that more than one condition should preferably be fulfilled to obtain satisfactory results in terms of optical performance, miniaturization, and so forth.

It is preferable that the diffraction grating fulfill Condition (7) below.

$$0.01 < \phi doe/\phi gr3 < 0.04 \tag{7}$$

wherein
  $\phi doe$ represents the optical power of the diffraction grating; and
  $\phi gr3$ represents the optical power of the third lens unit (Gr2).

Condition (7) defines the preferable ratio of the optical power $\phi doe$ of the diffraction grating to the optical power $\phi gr3$ of the third lens unit (Gr3) (which includes the optical power $\phi doe$). Fulfillment of Condition (7) makes it possible to achieve a satisfactorily compact lens optical system. If the value of Condition (7) is less than its lower limit, the diffractive lens element does not serve to correct chromatic aberration, and thus the lens optical system as a whole becomes unduly large. In contrast, if the value of Condition (7) is greater than its upper limit, the diffractive lens element causes unduly large astigmatism. In this case, correction of astigmatism cannot be achieved without making the lens optical system as a whole unduly large.

It is preferable that the diffraction grating fulfill Condition (8) below. Fulfillment of Condition (8) makes it possible to achieve a lens optical system that corrects chromatic aberration properly. If the value of Condition (8) is less than its lower limit, it is impossible to hold the lens units in position. In contrast, if the value of Condition (8) is greater than its upper limit, longitudinal chromatic aberration is undercorrected at the wide-angle end [W].

$$0.1 < tW/fW < 0.6 \tag{8}$$

wherein
  tW represents the axial distance, as converted into an aerial distance, between the diffraction grating and the aperture stop (S) at the wide-angle end [W]; and
  fW represents the focal length of the entire zoom lens system at the wide-angle end [W].

It is preferable that Condition (9) below be fulfilled. Fulfillment of Condition (9) makes it possible to keep within an acceptable range the loss of brightness as occurs at the edge of image frame when an image sensor is used.

$$|Y'max/PZ| < 0.4 \tag{9}$$

wherein
  Y'max represents the maximum image height; and
  PZ represents the distance from the image plane (I) to the exit pupil.

EXAMPLE 6

Figure 19A:
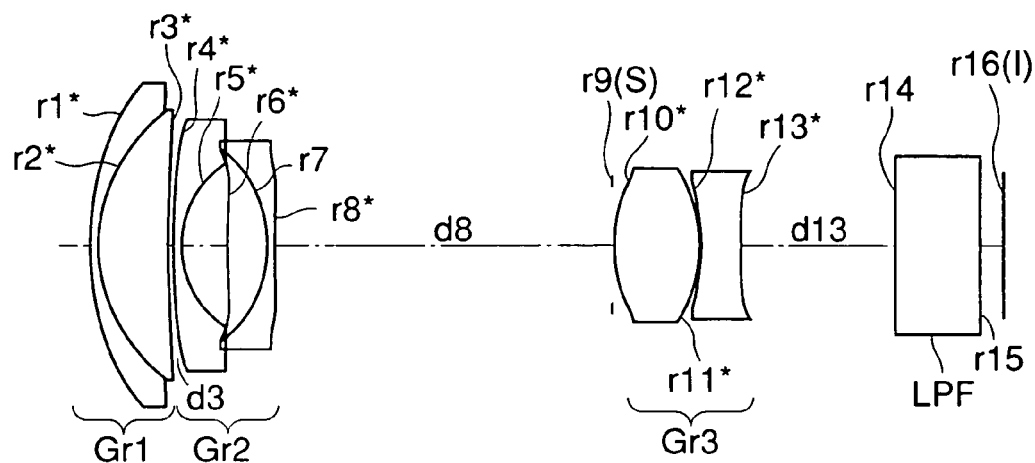
FIGS. 19A to 19C are lens arrangement diagrams of a lens optical system taken up as an example for comparison (Comparison Example 3)
Figure 19B:
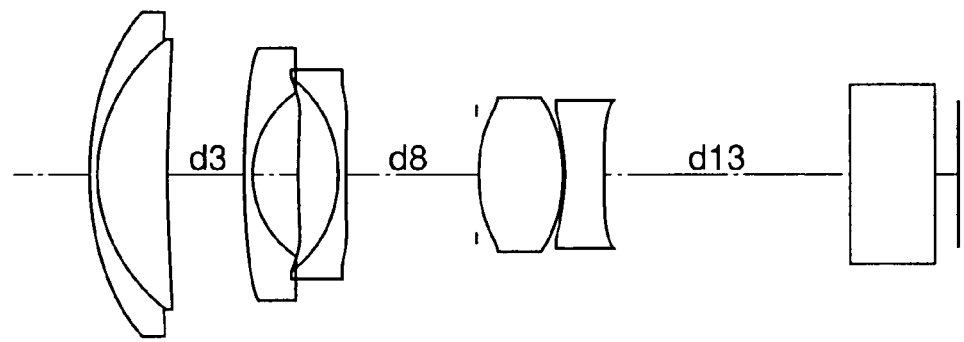
Figure 19C:
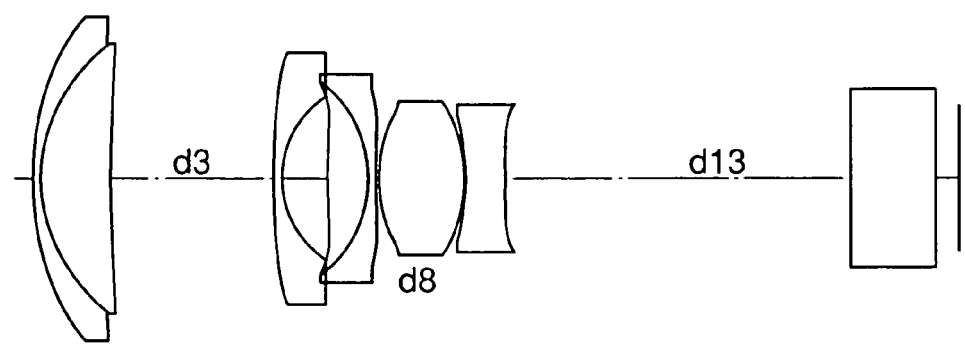
Figure 20A:
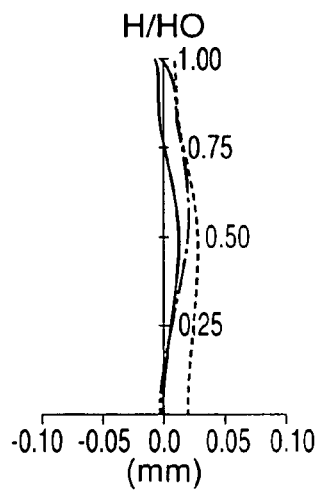
FIGS. 20A to 20I are graphic representations of the aberrations observed in the lens optical system of Comparison Example 3.
Figure 20B:
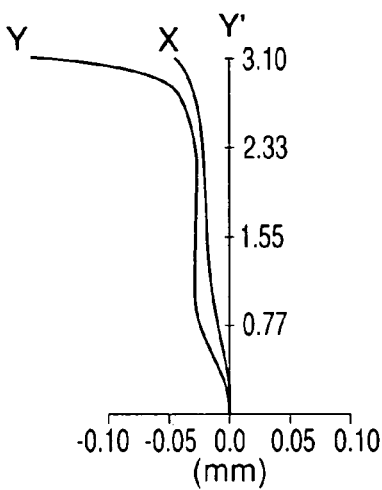
Figure 20C:
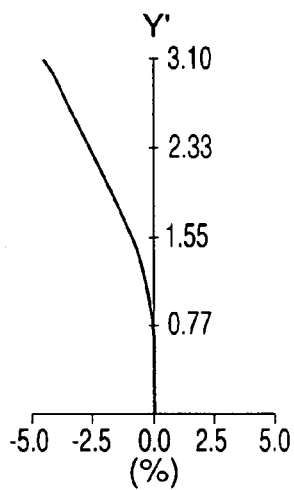
Figure 20D:
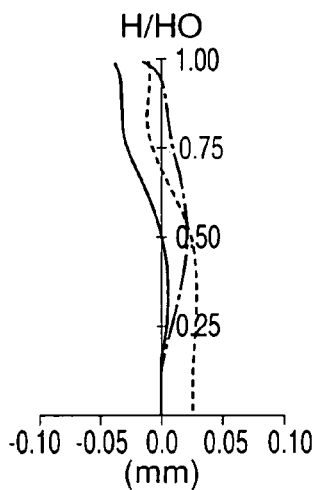
Figure 20E:
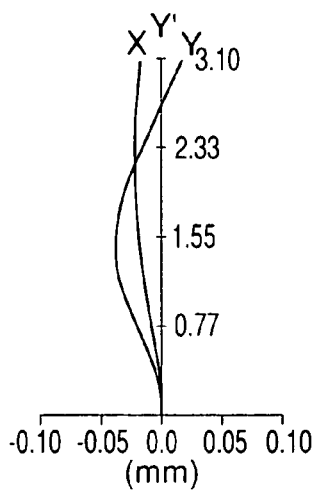
Figure 20F:
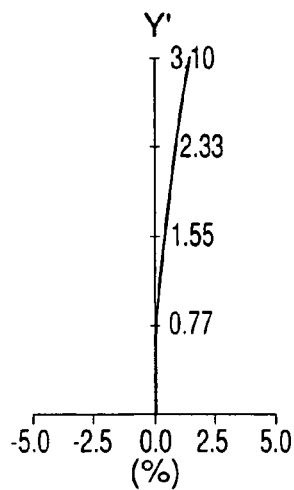
Figure 20G:
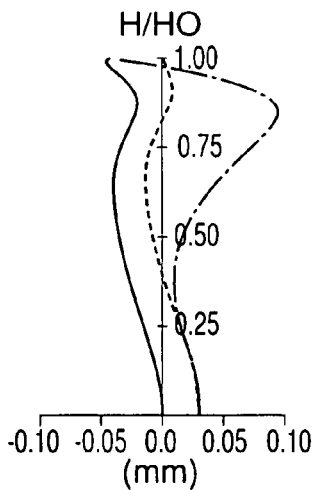
Figure 20H:
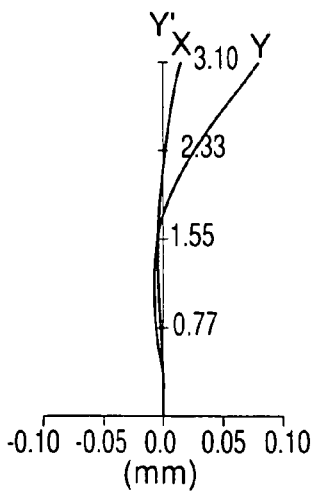
Figure 20I:
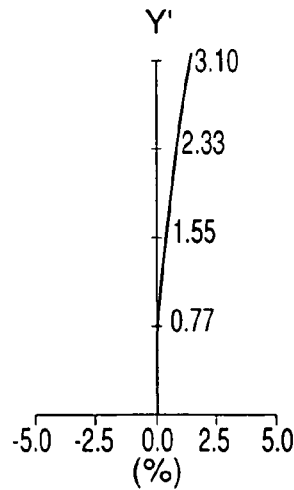

Hereinafter, an example of a lens optical system embodying the present invention will be presented with reference to its construction data, graphic representations of aberrations, and other data. Table 16 lists the construction data of Example 6, which corresponds to the sixth embodiment described above and has a lens arrangement as shown in FIGS. 17A, 17B, and 17C. Table 17 lists the construction data of Comparison Example 3, which corresponds to Example 6 but has a lens arrangement as shown in FIGS. 19A, 19B, and 19C (i.e. having no diffraction grating).

In the construction data of each example, ri (i=1, 2, 3, . . . ) represents the radius of curvature of the ith surface counted from the object side, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith optical element counted from the object side. Moreover, in the construction data, for each of the axial distances that vary with zooming (i.e. the variable axial distances), three values are given that are, from left, the axial aerial distance between the lens units at the wide-angle end [W] (i.e. in the shortest-focal-length condition), the same distance at the middle focal length [M], and the same distance at the telephoto end [T] (i.e. in the longest-focal-length condition). Also listed are the focal length f, the half angle of view ω (°), and the F-number FNO of the entire lens optical system in the three focal-length conditions [W], [M], and [T] mentioned just above, and the values corresponding to Conditions noted above.

A surface whose radius of curvature ri is marked with an asterisk (*) is an aspherical surface, whose surface shape is defined by Formula (as) noted previously. A surface whose radius of curvature ri is marked with # is a diffractive lens surface, i.e. a lens surface having a diffraction grating formed thereon, of which the phase shape of the pitch is defined by Formula (ds) noted previously. Also listed together are the aspherical surface data of each aspherical surface, the diffractive surface data of each diffractive lens surface, and other data.

The lens optical system of Comparison Example 3 is built as a three-unit zoom lens system of a positive-negative-positive configuration. In this lens optical system, the lens units are each composed as follows. The first lens unit (Gr1) is composed of two lens elements that are a negative lens element and a positive lens element. The second lens unit (Gr2) is composed of three lens elements that are a negative lens element, a positive lens element, and a negative lens element. The third lens unit (Gr3) is composed of two lens elements that are a positive lens element and a negative lens element. Table 18 lists the chromatic aberration coefficients of the entire lens optical system, as well as of the individual lens units (Gr1, Gr2, and Gr3) thereof, of Comparison Example 3, as observed at the wide angle end [W] and the telephoto end [T] (note that LC represents the longitudinal chromatic aberration coefficient, and TC represents the lateral chromatic aberration coefficient). In Comparison Example 3, as will be understood from the chromatic aberration coefficients of the entire lens optical system listed in Table 18, at the wide angle end [W], the longitudinal chromatic aberration coefficient LC and the lateral chromatic aberration coefficient TC take great positive values, and, at the telephoto end [T], the lateral chromatic aberration coefficient TC takes a great positive value. Now, how chromatic aberration is corrected in the lens optical system of Comparison Example 3 if a diffractive lens element is provided in the first, second, or third lens unit (Gr1, Gr2, and Gr3) will be described.

Assume that a diffractive lens element is provided in the first lens unit (Gr1) of the lens optical system of Comparison Example 3. In this lens optical system, since the first lens unit (Gr1) is disposed away from the aperture stop (S) on the front side thereof, the lateral chromatic aberration coefficient TC takes a great value. If, to correct this, a diffractive lens element which produces a negative lateral chromatic aberration coefficient TC is provided in the first lens unit (Gr1), the diffractive lens element will cause a positive longitudinal chromatic aberration coefficient LC. Even though this positive longitudinal chromatic aberration coefficient LC is small, it increases the longitudinal chromatic aberration coefficients LC of the entire lens optical system in the positive direction. Accordingly, it is not preferable to provide a diffractive lens element in the first lens unit (Gr1).

Assume that a diffractive lens element is provided in the second lens unit (Gr2) of the lens optical system of Comparison Example 3. In this lens optical system, the second lens unit (Gr2) is disposed away from the aperture stop (S) on the front side thereof at the wide-angle end [W], and is disposed immediately in front of the aperture stop (S) at the telephoto end [T]. Thus, at the wide-angle end [W], the lateral chromatic aberration coefficient TC takes a great value, and, at the telephoto end [T], the longitudinal chromatic aberration coefficient LC takes a great value. In Comparison Example 3, both the lateral chromatic aberration coefficient TC observed at the wide-angle end [W] and the longitudinal chromatic aberration coefficient LC observed at the telephoto end [T] bear a positive sign. In the diffractive lens element included in the second lens unit (Gr2), however, the longitudinal chromatic aberration coefficient LC and the lateral chromatic aberration coefficients TC bear opposite signs and are thus expected to be irreconcilable with each other. Accordingly, it is not preferable to provide a diffractive lens element in the second lens unit (Gr2).

Assume that a diffractive lens element is provided in the third lens unit (Gr3) of the lens optical system of Comparison Example 3. In this case, the lens arrangement of Comparison Example 3 corresponds to the lens arrangement of Example 6. Table 19 lists, as Table 18 does, the chromatic aberration coefficients of the entire lens optical system, as well as of the individual lens units (Gr1, Gr2, and Gr3) thereof, of Example 6, as observed at the wide angle end [W] and the telephoto end [T]. Note that, here, for the third lens unit (Gr3), two sets of values are given, with the chromatic aberration coefficients of the entire third lens unit (Gr3) listed in the left-hand column and the chromatic aberration coefficients produced by the diffractive lens element included therein listed in the right-hand column.

Since the third lens unit (Gr3) is disposed immediately behind the aperture stop (S), the longitudinal chromatic aberration coefficient LC takes a great value. Accordingly, the negative longitudinal chromatic aberration coefficient LC produced by the diffractive lens element included in the third lens unit (Gr3) at the wide-angle end [W] acts to reduce effectively the longitudinal chromatic aberration coefficient LC of the entire lens optical system at the wide-angle end [W]. Moreover, in Example 6, both the longitudinal chromatic aberration coefficient LC observed at the wide-angle end [W] and the lateral chromatic aberration coefficient TC observed at the telephoto end [T] are reduced. In the light of the foregoing, it will be understood that it is preferable to provide a diffractive lens element in the third lens unit (Gr3) and that the diffractive lens element exhibits the greatest chromatic aberration correction effect when provided in the third lens unit (Gr3).

Figure 21A:
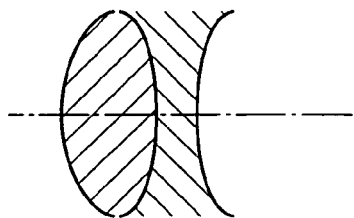
FIGS. 21A to 21C are diagrams illustrating the astigmatism and the Petzval effect obtained when a diffractive lens element is used.
Figure 21B:
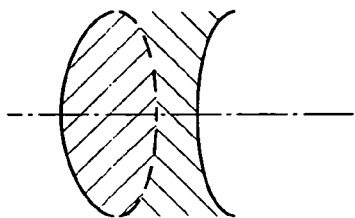
Figure 21C:
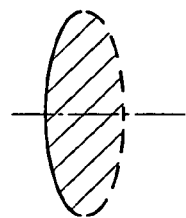
Figure 22A:
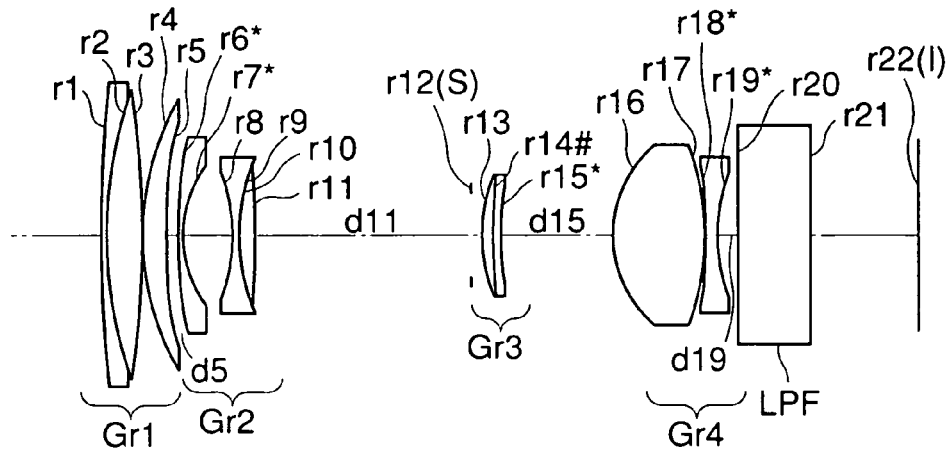
FIGS. 22A to 22C are lens arrangement diagrams of the lens optical system of a seventh embodiment (Example 7) of the present invention.
Figure 22B:
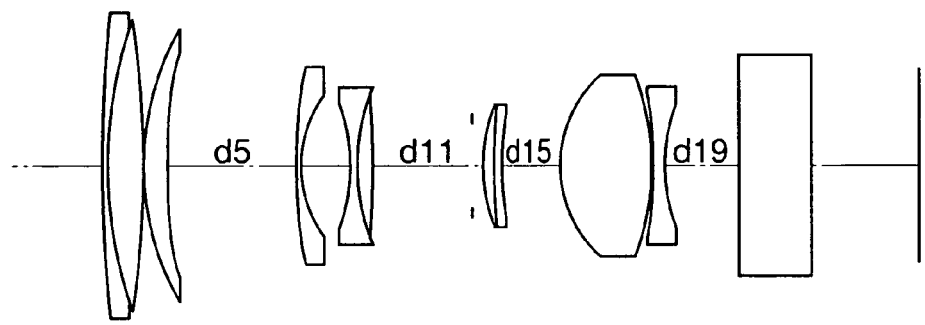
Figure 22C:
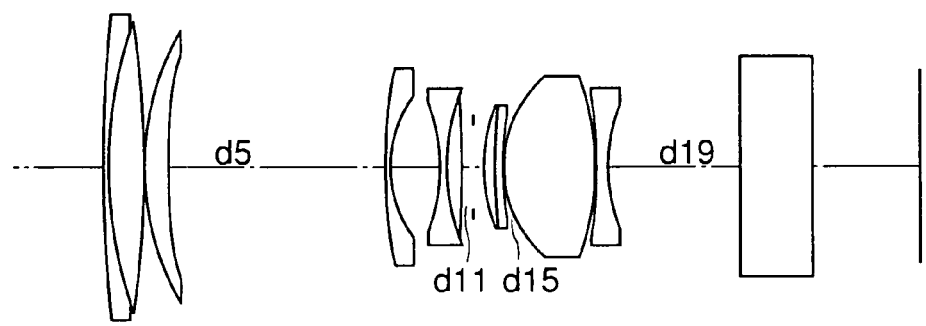
Figure 23A:
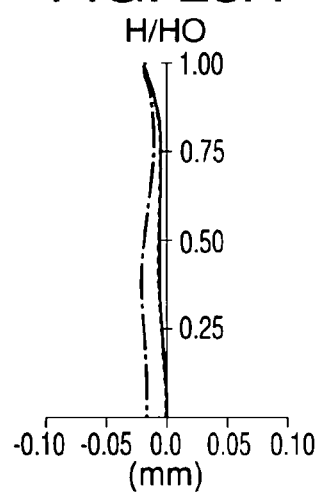
FIGS. 23A to 23I are graphic representations of the aberrations observed in the lens optical system of Example 7.
Figure 23B:
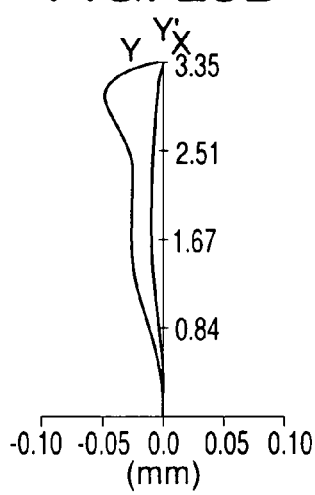
Figure 23C:
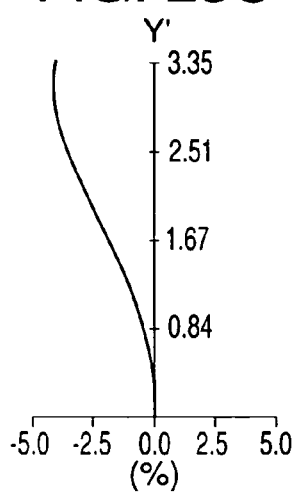
Figure 23D:
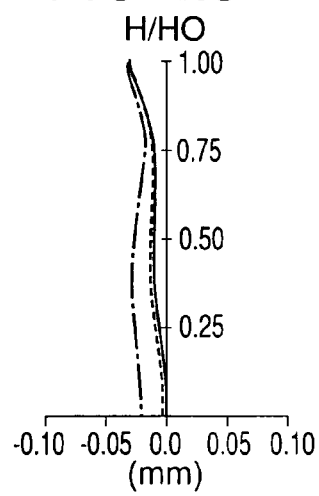
Figure 23E:
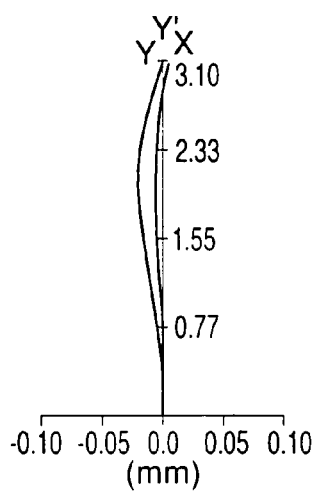
Figure 23F:
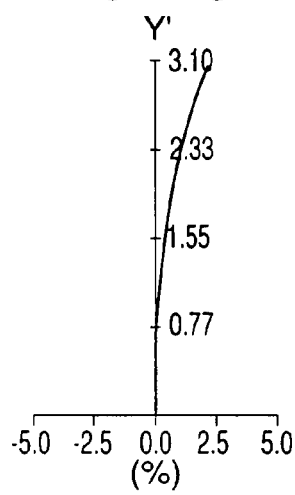
Figure 23G:
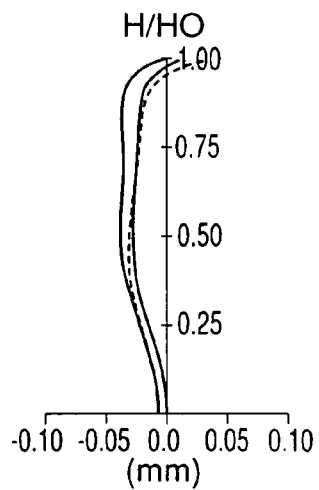
Figure 23H:
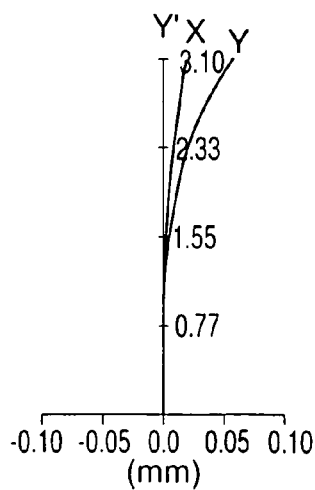
Figure 23I:
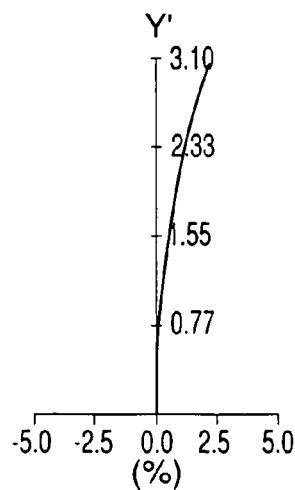
Figure 24A:
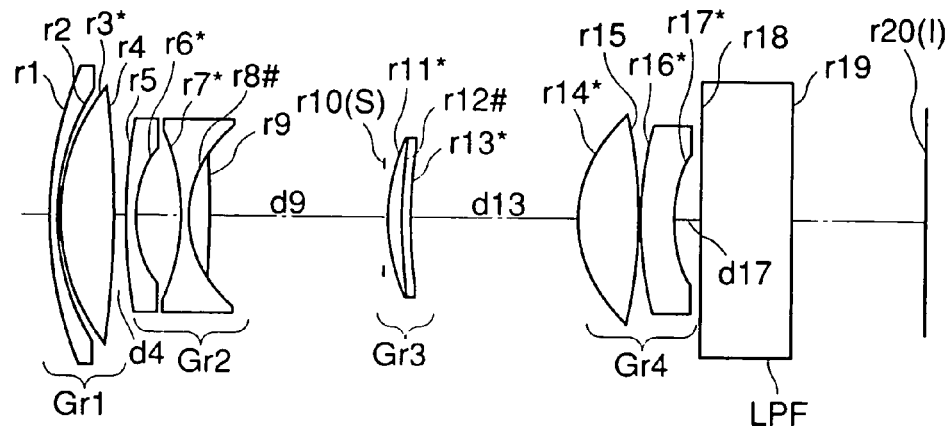
FIGS. 24A to 24C are lens arrangement diagrams of the lens optical system of an eighth embodiment (Example 8) of the present invention.
Figure 24B:
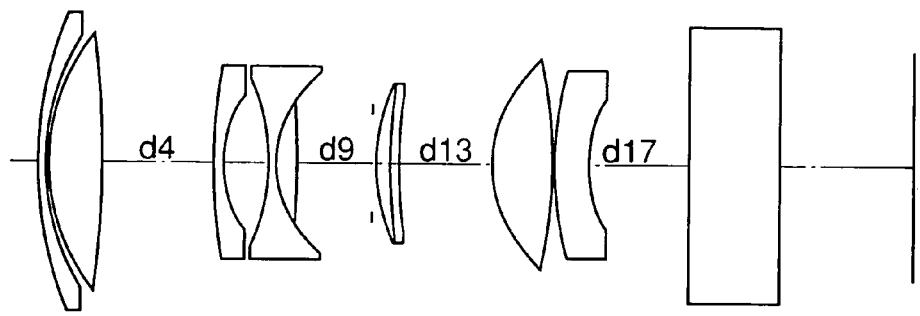
Figure 24C:
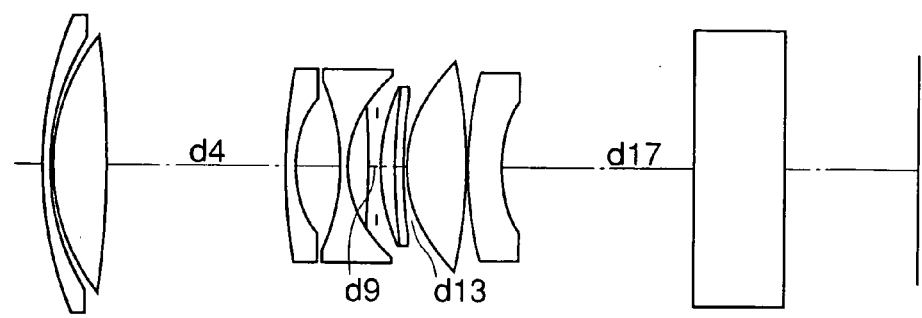
Figure 25A:
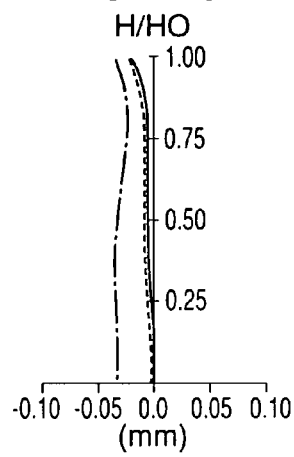
FIGS. 25A to 25I are graphic representations of the aberrations observed in the lens optical system of Example 8.
Figure 25B:
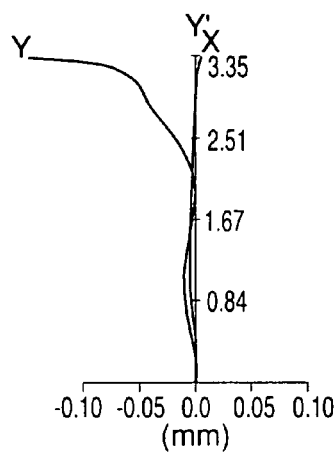
Figure 25C:
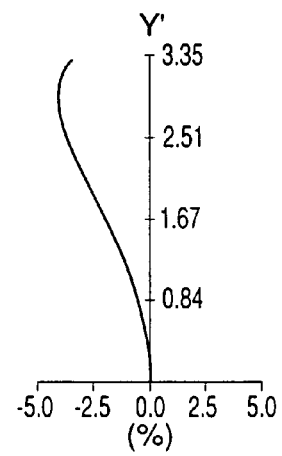
Figure 25D:
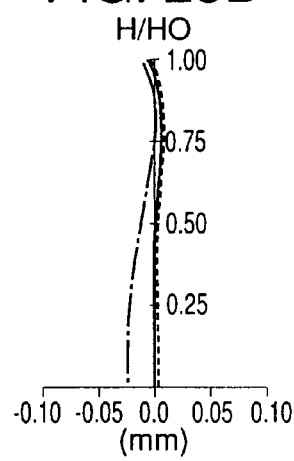
Figure 25E:
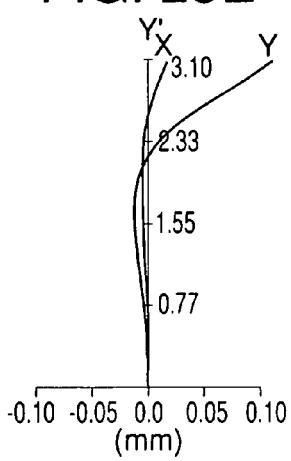
Figure 25F:
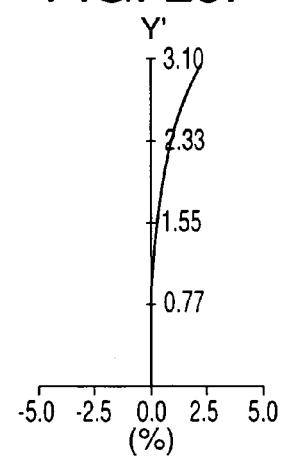
Figure 25G:
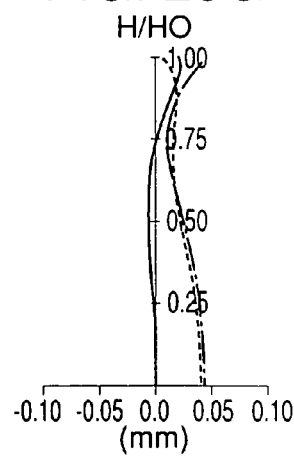
Figure 25H:
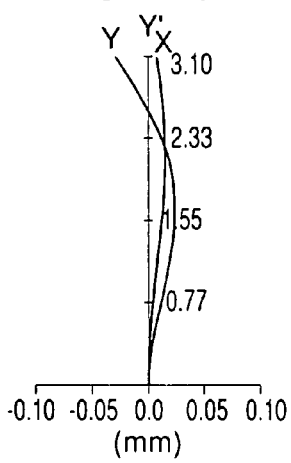
Figure 25I:
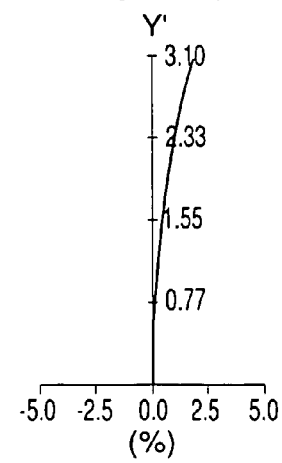
Figure 26A:
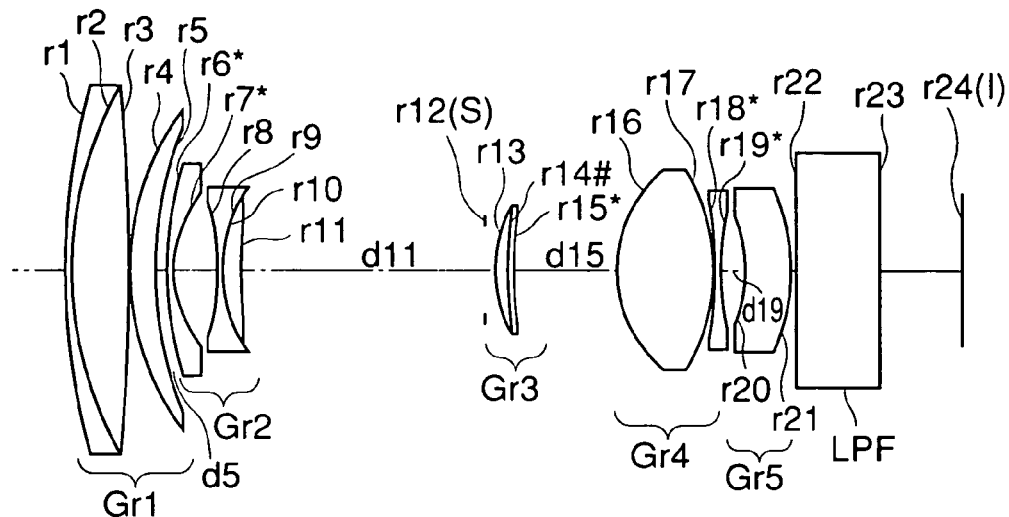
FIGS. 26A to 26C are lens arrangement diagrams of the lens optical system of a ninth embodiment (Example 9) of the present invention.
Figure 26B:
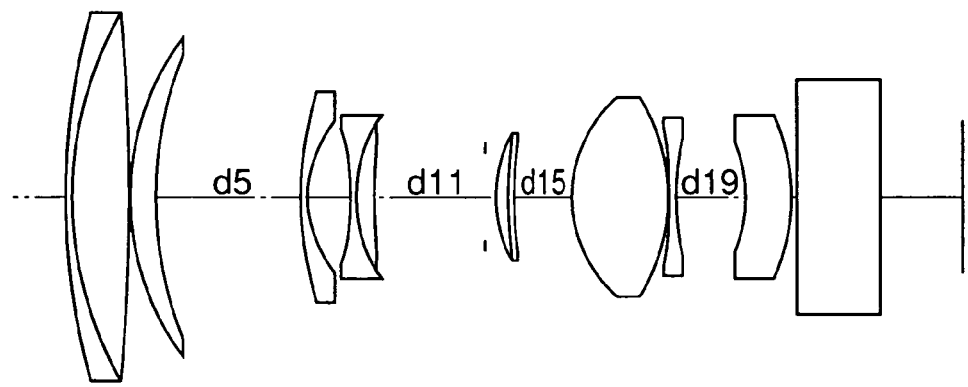
Figure 26C:
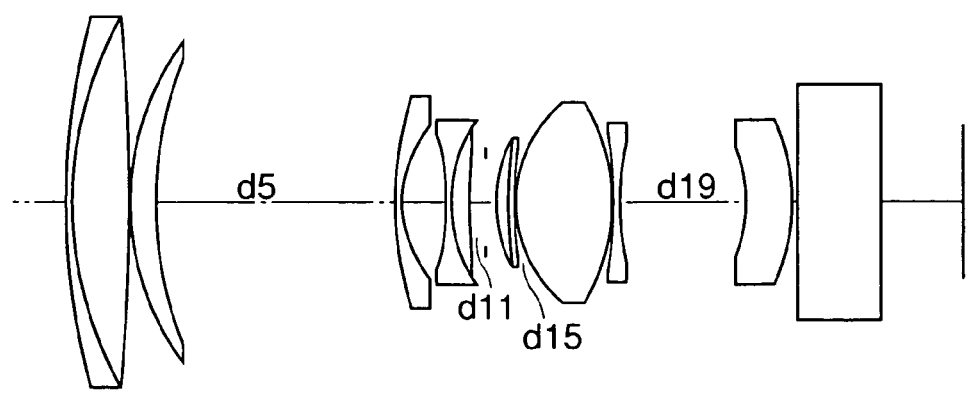
Figure 27A:
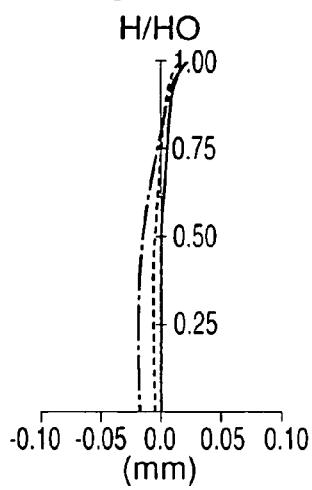
FIGS. 27A to 27I are graphic representations of the aberrations observed in the lens optical system of Example 9.
Figure 27B:
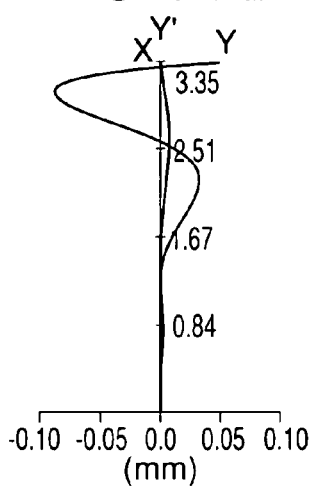
Figure 27C:
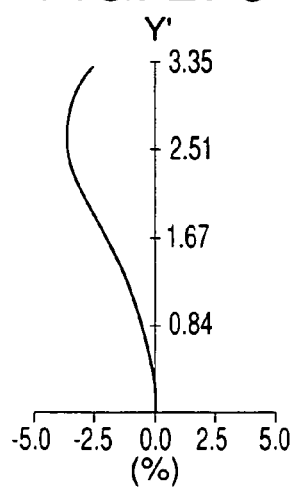
Figure 27D:
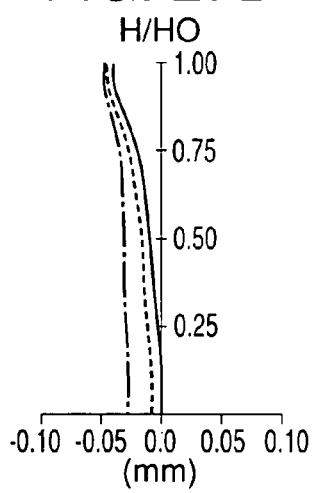
Figure 27E:
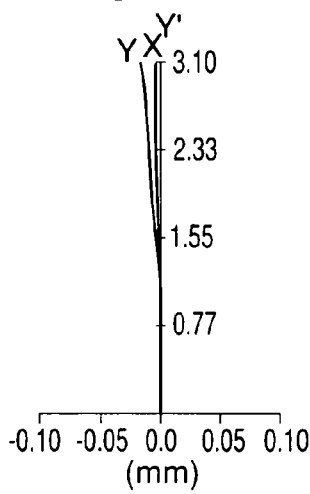
Figure 27F:
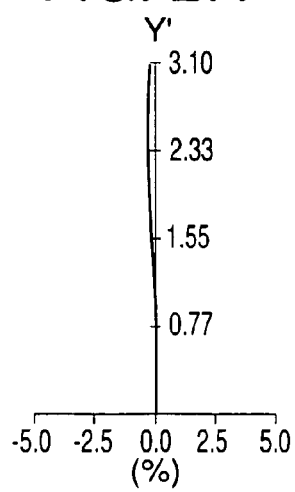
Figure 27G:
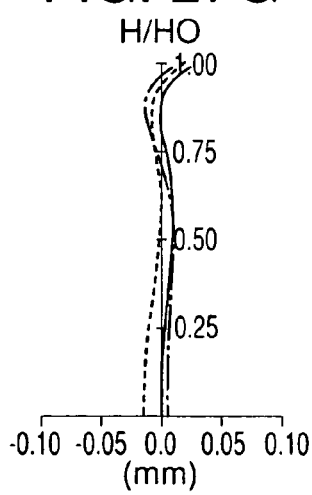
Figure 27H:
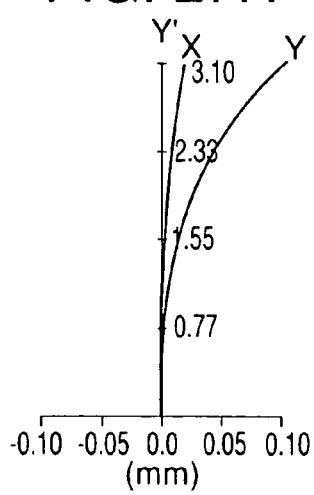
Figure 27I:
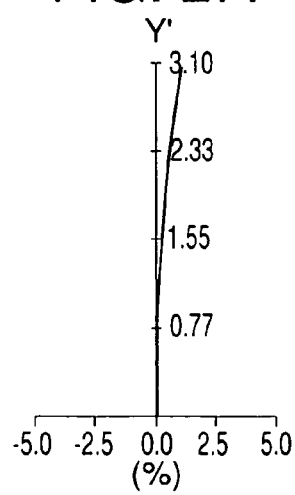
Figure 28A:
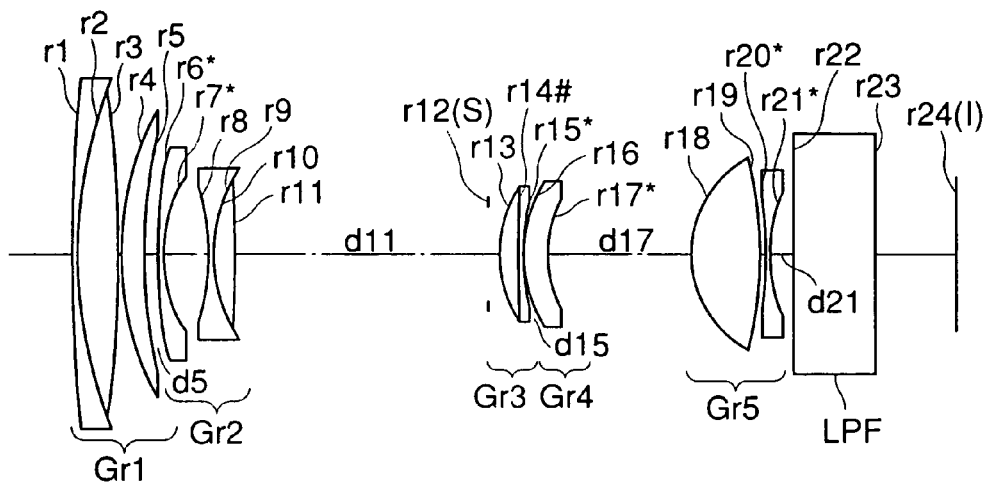
FIGS. 28A to 28C are lens arrangement diagrams of the lens optical system of a tenth embodiment (Example 10) of the present invention.
Figure 28B:
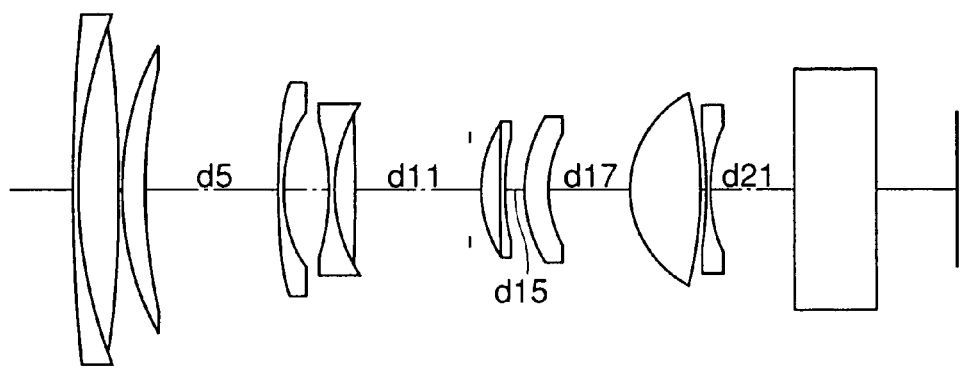
Figure 28C:
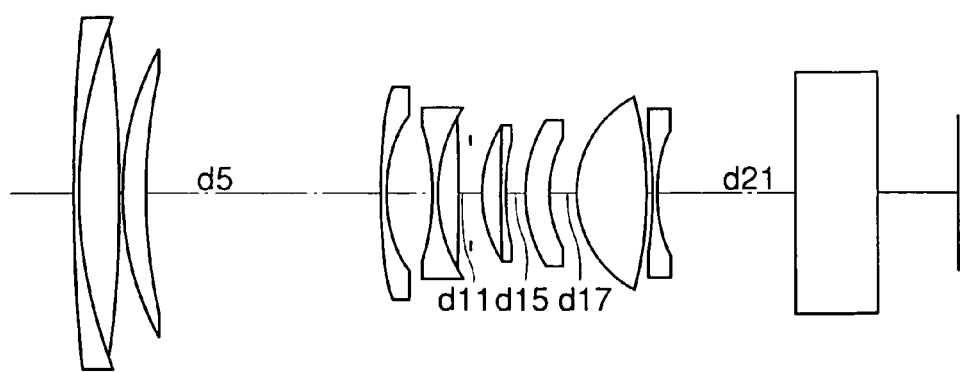
Figure 29A:
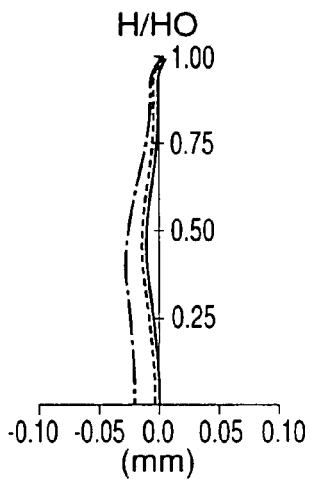
FIGS. 29A to 29I are graphic representations of the aberrations observed in the lens optical system of Example 10.
Figure 29B:
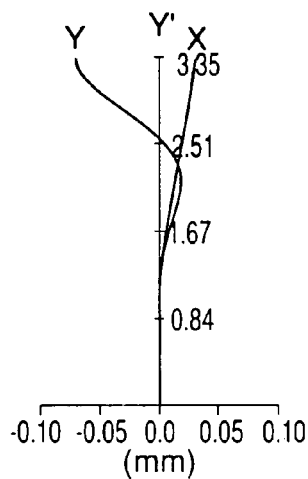
Figure 29C:
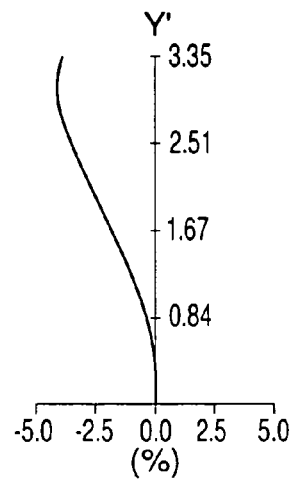
Figure 29D:
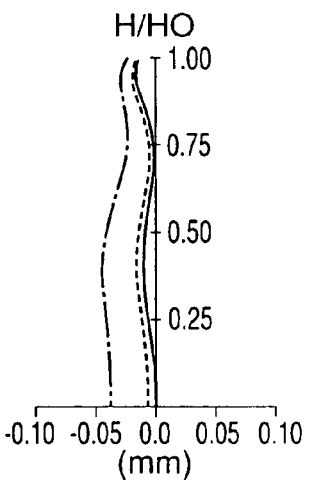
Figure 29E:
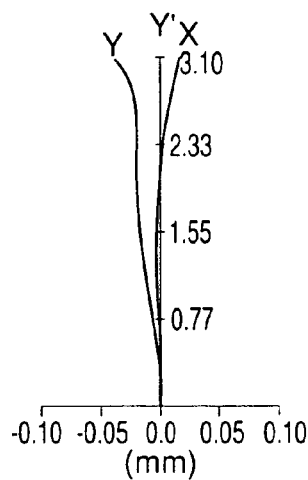
Figure 29F:
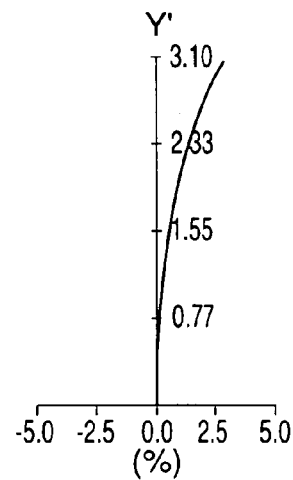
Figure 29G:
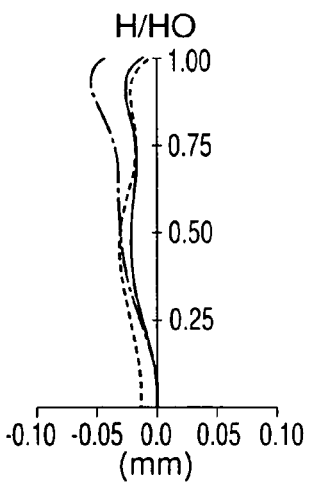
Figure 29H:
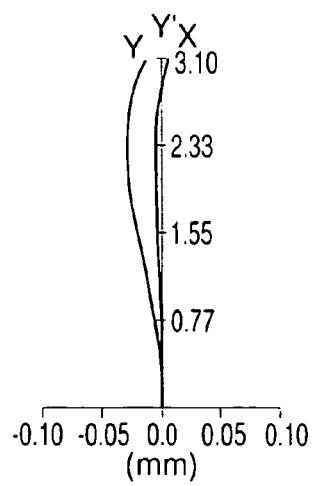
Figure 29I:
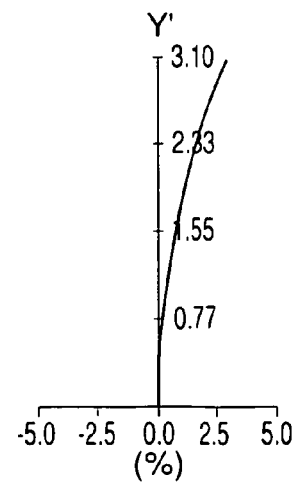

Next, the astigmatism and the Petzval effect observed when a diffractive lens element is used will be described. Here, the following three models (a), (b), and (c) of a diffractive lens element, i.e. an optical system composed of a thin lens element, as shown in FIGS. 21A, 21B, and 21C, respectively, will be considered.

(a) a cemented lens element formed by cementing together a positive and a negative lens element;

(b) a cemented lens element formed by cementing together a positive and a negative lens element, with a diffractive lens surface (indicated by a broken line) formed on its cementing surface; and (c) a single positive lens element having a diffractive lens surface (indicated by a broken line) formed thereon.

In the model (a), chromatic aberration is corrected by the combination of the positive and negative lens elements. In the model (b), chromatic aberration is corrected by the combination of the positive and negative lens elements and also by the diffractive lens surface. In the model (c), chromatic aberration is corrected solely by the diffractive lens surface. The relationship among these models (a), (b), and (c) in terms of the degree to which they, acting as diffractive lens elements, correct chromatic aberration is given as: (a)<(b)<(c). Thus, the relationship among those models (a), (b), and (c) in terms of the power they exert as diffractive lens elements is also given as: (a)<(b)<(c). Accordingly, the diffractive lens element of the model (c), which corrects chromatic aberration to the highest degree, exerts the strongest optical power.

In Comparison Example 3, the third lens unit (Gr3) is composed of a positive and a negative lens element. The positive lens element is made of a glass material that has a relatively low refractive index and a relatively low dispersion. The negative lens element is made of a glass material that has a relatively high refractive index and a relatively high dispersion. Correspondingly, it is assumed that the cemented lens element constituting the models (a) and (b) employs a positive lens element made of a glass material that has a relatively low refractive index and a relatively low dispersion, and a negative lens element made of a glass material that has a relatively high refractive index and a relatively high dispersion. Table 20 lists the data of the glass materials employed here (note that nd represents the refractive index for the d line and vd represents the Abbe number).

Table 21 lists the aberration coefficients of the optical system as a whole of the models (a), (b), and (c) (note that PT represents a Petzval coefficient and AS represents an astigmatism coefficient). In Comparison Example 3, the third lens unit (Gr3) is disposed behind the aperture stop (S). Correspondingly, the aberration coefficients are calculated on the assumption that the models (a), (b), or (c) is disposed behind the aperture stop (S). Moreover, the aberration coefficients of the models (a), (b), and (c) are calculated on the assumption that the lens surfaces are given curvatures (bending) such that the spherical aberration coefficients of the entire optical system is minimized. As will be understood from Table 21, the stronger the optical power of the diffractive lens element, the smaller the Petzval coefficient PT and the greater the astigmatism coefficient AS.

Table 22 lists the Petzval coefficients PT and the astigmatism coefficients AS as observed in Comparison Example 3 and Example 6 (an optical system having a diffractive lens element disposed in its third lens unit (Gr3)). These two optical systems are designed to have such sizes as to offer equivalent lens performance. As will be understood from Table 22, in Comparison Example 3, at the wide-angle end [W], the astigmatism coefficient AS takes a great positive value. On the other hand, by giving a strong optical power to the diffractive lens element included in the third lens unit (Gr3), it is possible to obtain the effect of chromatic aberration correction, but simultaneously the astigmatism coefficient AS takes an unduly great value.

As will be understood from the foregoing, with a lens optical system employing a diffractive lens element, how compact it can be made depends on the balance between the effect of chromatic aberration correction and the effects of the Petzval sum and astigmatism. Moreover, by providing a diffractive lens element in the third lens unit (Gr3) of a zoom-type lens optical system having three lens units that are a positive, a negative, and a positive lens unit, like that of Example 6, it is possible to achieve a satisfactorily compact lens optical system, thanks to the effect of chromatic aberration correction.

FIGS. 18A to 18I are graphic representations of the aberrations observed in the lens optical system of Example 6, and FIGS. 20A to 20I are graphic representations of the aberrations observed in the lens optical system of Comparison Example 3. Of these diagrams, FIGS. 18A, 18B, 18C, 20A, 20B, and 20C show the aberrations observed at the wide-angle end [W]; FIGS. 18D, 18E, 18F, 20D, 20E, and 20F show the aberrations observed at the middle focal length [M]; and FIGS. 18G, 18H, 18I, 20G, 20H, and 20I show the aberrations observed at the telephoto end [T]. Furthermore, of these diagrams, FIGS. 18A, 18D, 18G, 20A, 20D, and 20G show spherical aberration; FIGS. 18B, 18E, 18H, 20B, 20E, and 20H show astigmatism; and FIGS. 18C, 18F, 18I, 20C, 20F, and 20I show distortion. In the spherical aberration diagrams, the value H/H0 obtained by normalizing the height H at which a light ray enters the entrance pupil with respect to the maximum height H0 (=1) (i.e. the relative height at which the light ray crosses the entrance-pupil plane) is taken along the vertical axis, and the deviation (mm) from the paraxial imaging position along the optical axis is taken along the horizontal axis. In addition, the broken line represents the spherical aberration for the C line (wavelength λC: 656. 3 nm), the solid line represents the spherical aberration for the d line (wavelength λd: 587. 6 nm), and the dash-and-dot line represents the spherical aberration for the g line (wavelength kg: 435. 8 nm). In the astigmatism diagrams, the image height Y' (mm) is taken along the vertical axis, and the deviation (mm) from the paraxial imaging position along the optical axis is taken along the horizontal axis. In addition, the solid line X represents the astigmatism on the sagittal plane, and the solid line Y represents the astigmatism on the meridional plane. In the distortion diagrams, the image height Y' (mm) is taken along the vertical axis, and the amount of distortion (%) is taken along the horizontal axis.

Embodiments 7 to 10

The lens optical systems of the seventh and eighth embodiments are each built as a four-unit zoom lens system that is composed of, from the object side, a first lens unit (Gr1) having a positive optical power, a second lens unit (Gr2) having a negative optical power, a third lens unit (Gr3) having a positive optical power, and a fourth lens unit (Gr4) having a positive optical power. The lens optical system of the ninth embodiment is built as a five-unit zoom lens system that is composed of, from the object side, a first lens unit (Gr1) having a positive optical power, a second lens unit (Gr2) having a negative optical power, a third lens unit (Gr3) having a positive optical power, a fourth lens unit (Gr4) having a positive optical power, and a fifth lens unit (Gr5) having a negative optical power. The lens optical system of the tenth embodiment is built as a five-unit zoom lens system that is composed of, from the object side, a first lens unit (Gr1) having a positive optical power, a second lens unit (Gr2) having a negative optical power, a third lens unit (Gr3) having a positive optical power, a fourth lens unit (Gr4) having a negative optical power, and a fifth lens unit (Gr5) having a positive optical power.

In any of the seventh to tenth embodiments, the lens optical system is built as a zoom-type lens optical system having four lens units that are a positive, a negative, a positive, and a positive (or a negative) lens unit and having a diffraction grating disposed in its third lens unit (Gr3), wherein zooming is performed by varying the distance between the first and second lens units (Gr1 and Gr2), the distance between the third and fourth lens units (Gr3 and Gr4), and so forth. Moreover, in this lens optical system, between the second lens unit (Gr2) and the third lens unit (Gr3), an aperture stop (S) is disposed that moves together with the third lens unit (Gr3) during zooming. In addition, a low-pass filter (LPF) is disposed at the image-plane (I) side end of the lens optical system.

In the lens optical system of the seventh embodiment (FIGS. 22A to 22C), the lens units are each composed, from the object side, as follows. The first lens unit (Gr1) is composed of a cemented lens element formed by cementing together a negative meniscus lens element concave to the image side and a positive biconvex lens element, and a positive meniscus lens element convex to the object side. The second lens unit (Gr2) is composed of a negative meniscus lens element concave to the image side and a cemented lens element formed by cementing together a negative biconcave lens element and a positive biconvex lens element. The third lens unit (Gr3) is composed of a cemented lens element formed by cementing together a positive meniscus lens element convex to the object side and a negative meniscus lens element concave to the image side, with a diffraction grating formed on its fourteenth surface (r14). The fourth lens unit (Gr4) is composed of a positive biconvex lens element and a negative biconcave lens element.

In the lens optical system of the eighth embodiment (FIGS. 24A to 24C), the lens units are each composed, from the object side, as follows. The first lens unit (Gr1) is composed of a negative meniscus lens element concave to the image side and a positive biconvex lens element. The second lens unit (Gr2) is composed of a negative meniscus lens element concave to the image side and a cemented lens element formed by cementing together a negative biconcave lens element and a positive meniscus lens element convex to the object side, with a diffraction grating formed on its eighth surface (r8). The third lens unit (Gr3) is composed of a cemented lens element formed by cementing together two positive meniscus lens elements convex to the object side, with a diffraction grating formed on its twelfth surface (r12). The fourth lens unit (Gr4) is composed of a positive biconvex lens element and a negative meniscus lens element concave to the image side.

In the lens optical system of the ninth embodiment (FIGS. 26A to 26C), the lens units are each composed, from the object side, as follows. The first lens unit (Gr1) is composed of a cemented lens element formed by cementing together a negative meniscus lens element concave to the image side and a positive biconvex lens element, and a positive meniscus lens element convex to the object side. The second lens unit (Gr2) is composed of a negative meniscus lens element concave to the image side and a cemented lens element formed by cementing together a negative biconcave lens element and a positive meniscus lens element convex to the object side. The third lens unit (Gr3) is composed of a cemented lens element formed by cementing together a positive meniscus lens element convex to the object side and a negative meniscus lens element concave to the image side, with a diffraction grating formed on its fourteenth surface (r14). The fourth lens unit (Gr4) is composed of a positive biconvex lens element and a negative biconcave lens element. The fifth lens unit (Gr5) is composed of a negative meniscus lens element concave to the object side.

In the lens optical system of the tenth embodiment (FIGS. 28A to 28C), the lens units are each composed, from the object side, as follows. The first lens unit (Gr1) is composed of a cemented lens element formed by cementing together a negative meniscus lens element concave to the image side and a positive biconvex lens element, and a positive meniscus lens element convex to the object side. The second lens unit (Gr2) is composed of a negative meniscus lens element concave to the image side and a cemented lens element formed by cementing together a negative biconcave lens element and a positive meniscus lens element convex to the object side. The third lens unit (Gr3) is composed of a cemented lens element formed by cementing together a positive biconvex lens element and a negative biconcave lens element, with a diffraction grating formed on its fourteenth surface (r14). The fourth lens unit (Gr4) is composed of a negative meniscus lens element concave to the image side. The fifth lens unit (Gr5) is composed of a positive biconvex lens element and a negative biconcave lens element.

In order to make compact a zoom-type lens optical system including a positive, a negative, a positive, and a positive (or a negative) lens unit, it is preferable to provide, as in the lens optical systems of the seventh to tenth embodiments, a diffraction grating in the third lens unit (Gr3) from the viewpoint of aberration correction. Moreover, it is preferable that the third lens unit (Gr3) include a cemented lens element having a diffraction grating formed at its cementing interface (i.e. the interface between two different optical materials), and that the cementing interface have a curvature different from the curvatures of the incident and exiting surfaces of the cemented lens element. This will be described in detail later.

Next, the conditions will be described that are preferably fulfilled by a lens optical system as exemplified by the seventh to tenth embodiments, i.e. a zoom-type lens optical system having four lens units that are a positive, a negative, a positive, and a positive (or a negative) lens unit and having a diffraction grating disposed in its third lens unit (Gr3), wherein the third lens unit (Gr3) has a cemented lens element having a diffraction grating formed at its cementing interface, and the cementing interface has a curvature different from the curvatures of the incident and exiting surfaces of the cemented lens element. Note that it is not necessary that all of the conditions given below be fulfilled simultaneously; if any of those conditions is fulfilled, it is possible to achieve the corresponding advantages. It is needless to say, however, that more than one condition should preferably be fulfilled to obtain satisfactory results in terms of optical performance, miniaturization, and so forth.

It is preferable that the diffraction grating fulfill Condition (10) below.

$$0.02 < \phi doe/\phi gr3 < 0.1 \tag{10}$$

wherein
- $\phi doe$ represents the optical power of the diffraction grating; and
- $\phi gr3$ represents the optical power of the third lens unit (Gr3).

Condition (10) defines the preferable ratio of the optical power $\phi doe$ of the diffraction grating to the optical power $\phi gr3$ of the third lens unit (Gr3) (which includes the optical power $\phi doe$). Fulfillment of Condition (10) makes it possible to achieve a satisfactorily compact lens optical system. If the value of Condition (10) is less than its lower limit, the diffractive lens element does not serve to correct chromatic aberration, and thus the lens optical system as a whole becomes unduly large. In contrast, if the value of Condition (10) is greater than its upper limit, the diffractive lens element causes unduly large astigmatism. In this case, correction of astigmatism cannot be achieved without making the lens optical system as a whole unduly large.

It is preferable that the diffraction grating fulfill Condition (11) below. Fulfillment of Condition (11) makes it possible to achieve a lens optical system that corrects chromatic aberration properly. If the value of Condition (11) is less than its lower limit, it is impossible to hold the lens units in position. In contrast, if the value of Condition (11) is greater than its upper limit, longitudinal chromatic aberration is undercorrected at the wide-angle end [W].

$$0.05 < tW/fW < 0.4 \tag{11}$$

wherein
- tW represents the axial distance, as converted into an aerial distance, between the diffraction grating and the aperture stop (S) at the wide-angle end [W]; and
- fW represents the focal length of the entire zoom lens system at the wide-angle end [W].

It is preferable that Condition (12) below be fulfilled. Fulfillment of Condition (12) makes it possible to keep within an acceptable range the loss of brightness as occurs at the edge of image frame when an image sensor is used.

$$|Y'max/PZ| < 0.4 \tag{12}$$

wherein
- Y'max represents the maximum image height; and
- PZ represents the distance from the image plane (I) to the exit pupil.

Here, the conditions will be described that are preferably fulfilled by a lens optical system that has, like those of the seventh to tenth embodiments, a diffraction grating acting as a lens formed at the cementing interface between two different optical materials. Note that, as in Conditions (10) and (12) mentioned above, it is not necessary that all of the conditions given below be fulfilled simultaneously; if any of those conditions is fulfilled, it is possible to achieve the corresponding advantages. However, it is more preferable that more than one condition be fulfilled to obtain satisfactory results in terms of optical performance, miniaturization, and so forth.

It is preferable that the diffraction grating fulfill Condition (13) below which defines the blaze shape at an arbitrary height H in a direction perpendicular to the optical axis. The degradation of the diffraction efficiency for an obliquely-incident light ray does not lead to any serious problem as long as the diffraction grating fulfills Condition (13) below. If the value of Condition (13) is greater than its upper limit, the diffractive lens element does not exhibit sufficiently high diffraction efficiency.

$$|(h/d)\tan\theta| \leq 0.045 \qquad (13)$$

wherein
h represents the grating height of the diffraction grating;
d represents the grating pitch; and
θ represents the angle of incidence.

Here, based on the formula of the phase function Φ(H)

$$\Phi(H) = (2\pi/\lambda 0) \cdot \sum_{i=1}(C_i \cdot H^{2i})$$

(where Ci represents the phase function coefficient and λ0 represents the design wavelength), the grating pitch d is given by the following formula, for a specific height H in a direction perpendicular to the optical axis:

$$d(H) = -2\pi/(d\Phi/dH)$$

It is preferable that the diffraction grating fulfill Condition (14) below. The degradation of the diffraction efficiency for an obliquely-incident light ray does not lead to any serious problem as long as the diffraction grating fulfills Condition (14) below. If the value of Condition (14) is less than its lower limit, the diffractive lens element undercorrects chromatic aberration. In contrast, if the value of Condition (14) is greater than its upper limit, the diffractive lens element does not exhibit sufficiently high diffraction efficiency.

$$0.01 \leq |\{(h \cdot \phi doe \cdot Ddoe)/(2 \cdot \lambda 0)\} \cdot \tan(\omega max)| \leq 0.06 \qquad (14)$$

wherein
h represents the grating height of the diffraction grating;
λ0 represents the design wavelength;
φdoe represents the optical power of the diffraction grating;
Ddoe represents the effective diameter of the diffraction grating acting as a lens; and
ωmax represents the maximum value of the half angle of view of the lens optical system.

It is preferable that the diffraction grating fulfill Condition (15) below. In an ordinary taking lens system, the degradation of the diffraction efficiency for an obliquely-incident light ray does not lead to any serious problem as long as the diffraction grating fulfills Condition (15) below. If the value of Condition (15) is less than its lower limit, the diffractive lens element undercorrects chromatic aberration. In contrast, if the value of Condition (15) is greater than its upper limit, the diffractive lens element does not exhibit sufficiently high diffraction efficiency.

$$0.005 \leq |(h/dmin) \cdot \tan(\omega max)| \leq 0.07 \qquad (15)$$

wherein
h represents the grating height of the diffraction grating;
dmin represents the minimum grating pitch within the effective diameter of the diffraction grating acting as a lens; and
ωmax represents the maximum value of the half angle of view of the lens optical system.

Figure 33A:
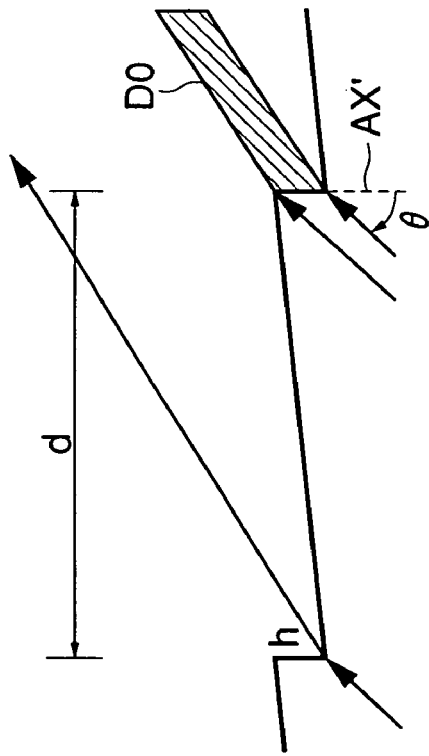
FIGS. 33A and 33B are diagrams illustrating the effects of the grating height in cases where a light ray is obliquely incident on a blaze-formed diffraction grating.
Figure 33B:
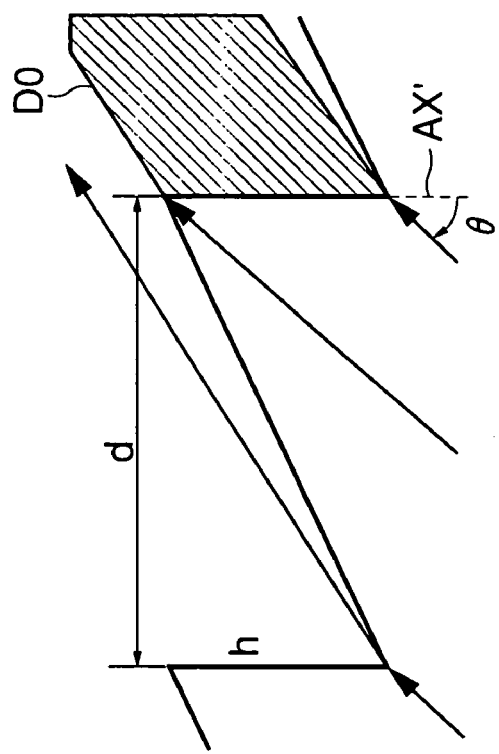

Next, in connection with Conditions (13), (14), and (15) noted above, the diffraction efficiency obtained when a light ray is obliquely incident on the diffraction grating employed in the lens optical systems of the seventh to tenth embodiments will be described. FIGS. 33A and 33B are enlarged views each showing a state in which a light ray is obliquely incident on a blaze-formed diffraction grating. Of these two diagrams, FIG. 33A shows a case where the grating height h is low, corresponding to a case where the diffraction grating is provided on a lens surface bordering air. FIG. 33B shows a case where the grating height h is high, corresponding to a case where the diffraction grating is provided at the interface between two different optical materials. Note that, in FIGS. 33A and 33B, the dotted line AX' indicates a line parallel to the optical axis (AX shown in FIG. 35) of the lens optical system, and the hatched area Do indicates a non-diffractive region that results from the grating height h.

As will be understood from FIGS. 33A and 33B, the higher the grating height h, the wider the non-diffractive region D0. Accordingly, it is expected that, as the grating pitch d becomes smaller, the grating height h becomes higher relatively, and thus the non-diffractive region D0 becomes wider. Moreover, it is also expected that, the larger the angle of incidence θ, the wider the non-diffractive region D0. In addition, as will be understood from the relationship between FIGS. 33A and 33B, the size of the non-diffractive region D0 is proportional to (h/d)tan θ.

Figure 34:
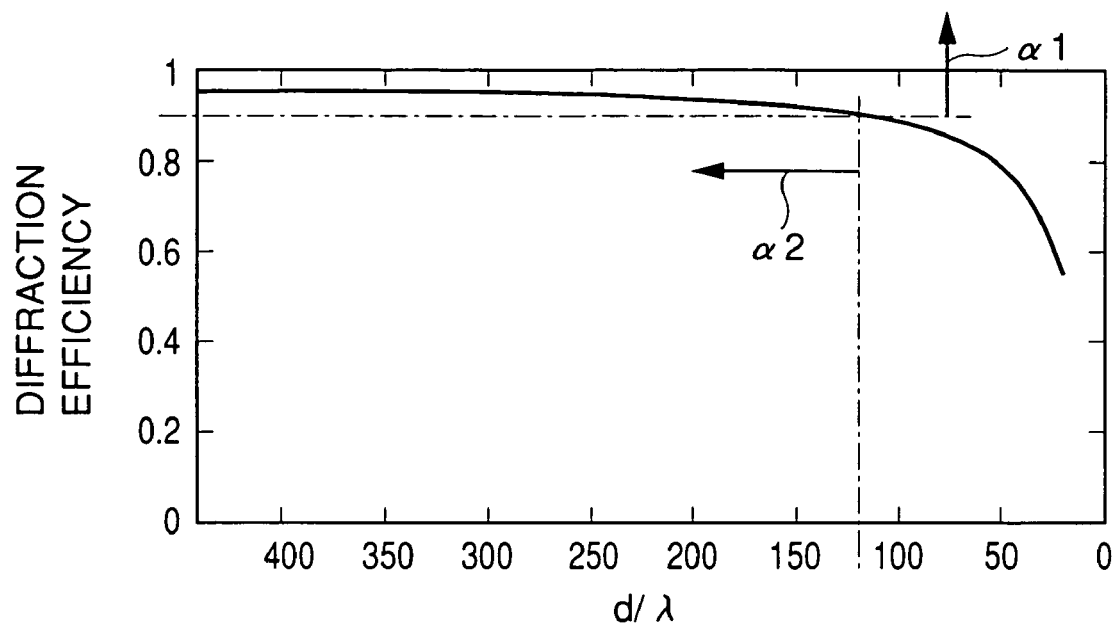
FIG. 34 is a diagram showing the relationship between the grating pitch and the diffraction efficiency at an angle of incidence of 10°.

FIG. 34 is a graph showing the relationship between the grating pitch (d/λ0) and the diffraction efficiency. This graph shows calculation results of how the diffraction efficiency varies with respect to the grating pitch d when a light ray of the design wavelength λ0=587 nm is incident, at an angle of incidence θ=10°, on a blaze-formed diffraction grating having a grating height of h=17 μm. It is experimentally known that diffraction efficiency as high as 0.9 or more is required in practical use. Thus, in FIG. 34, the range indicated by arrow α1 is the range of diffraction efficiency required in practical use. Based on this range of diffraction efficiency required in practical use, the range, indicated by arrow α2 in FIG. 34, that should be fulfilled by the grating pitch d is determined. If the value of (h/d)tan θ, which depends on the grating height h of the blaze-formed diffraction grating, the grating pitch d, and the angle of incidence θ at which a light ray is incident on the diffraction grating, lies within the range defined by Condition (13), it is possible to obtain sufficiently high diffraction efficiency required in practical use.

$$|(h/d)\tan\theta| \leq 0.045 \qquad (13)$$

Next, the grating pitch d will be described. In a case where a diffraction grating acts as a lens, if it is assumed that Ci represents the phase function coefficient and λ0 represents the design wavelength, then, for a height H with respect to the optical axis, the phase function Φ(H) of the diffraction grating is defined by the following formula:

$$\Phi(H) = (2\pi/\lambda 0) \cdot \sum_{i=1}(C_i \cdot H^{2i})$$

In particular, the optical power φdoe of the diffraction grating is defined by the following formula:

$$\phi doe = -2 \cdot C1$$

The grating pitch d is defined by the following formula, which is obtained by the first-order differentiation of the phase function Φ(H) with respect to the height H in a direction perpendicular to the optical axis:

$$d(H) = -2\pi/(d\Phi/dH)$$

In an ordinary diffractive lens element, the phase function coefficient C1 (i.e. Ci with i=1) used to determine the optical power thereof is so great that, for a height H in a direction perpendicular to the optical axis smaller than the effective radius, the grating pitch d(H) decreases monotonically. Here, the phase function coefficient Ci with i>1 is very small, and thus, if it is ignored and the effective diameter of the diffraction grating acting as a lens is assumed to be D doe, then the minimum value dmin of the grating pitch d(H) is defined by Condition (16) below. From Condition (16), it will be understood that, the stronger the optical power φdoe of the diffractive lens element, and the larger the effective diameter Ddoe, the narrower the grating pitch d(H).

$$d\min = d(Ddoe/2) = -(2 \cdot \lambda 0)/(2 \sim C1 \cdot Ddoe) = (2 \cdot \lambda 0)/(\phi doe \cdot Ddoe) \quad (16)$$

Figure 35:
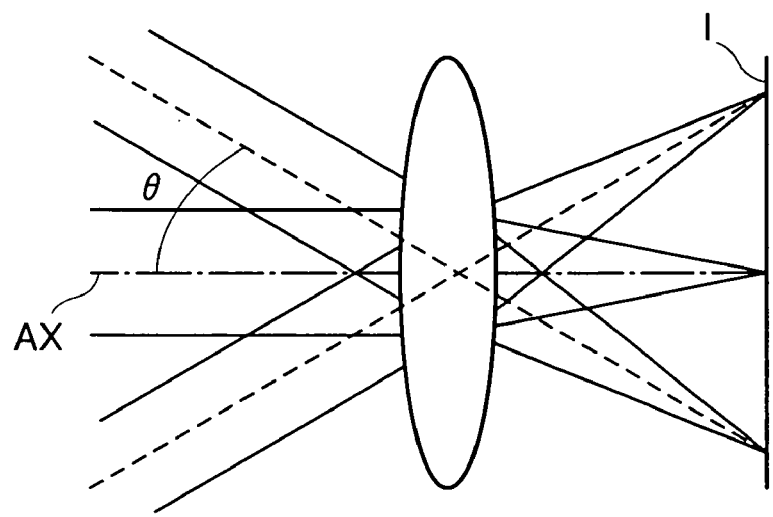
FIG. 35 is an optical path diagram illustrating an angle of incidence with respect to the lens optical system.
Figure 36A:
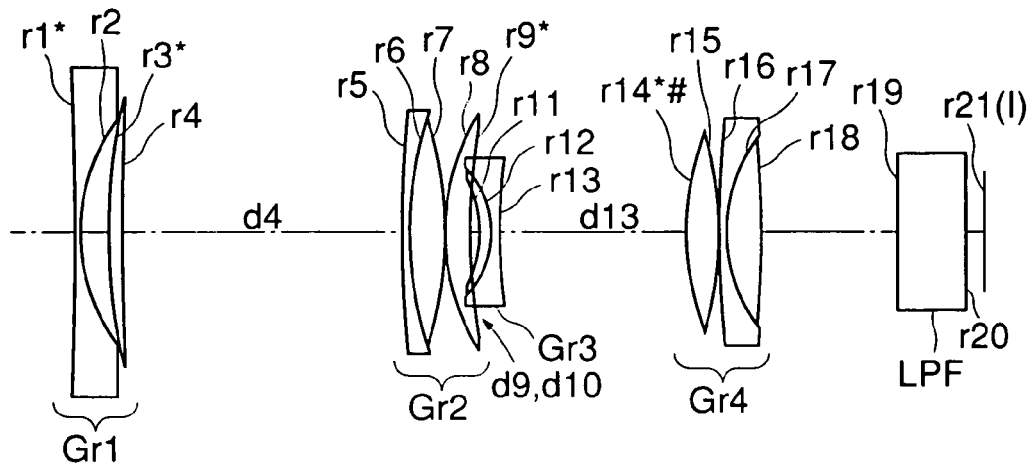
FIGS. 36A to 36C are lens arrangement diagrams of the lens optical system of an eleventh embodiment (Example 11) of the present invention.
Figure 36B:
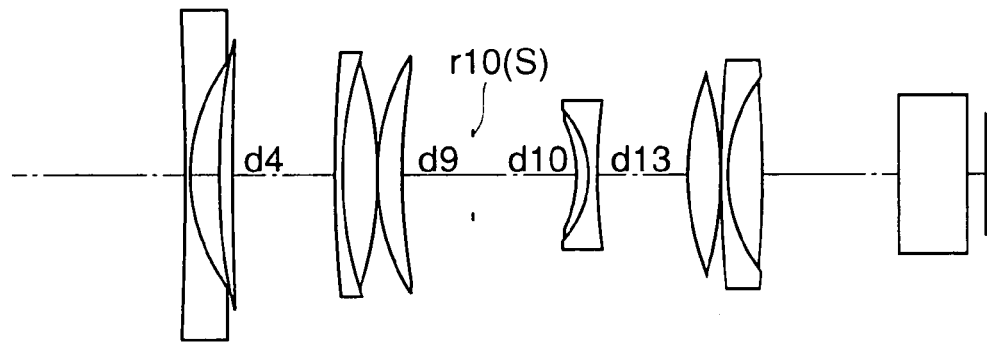
Figure 36C:
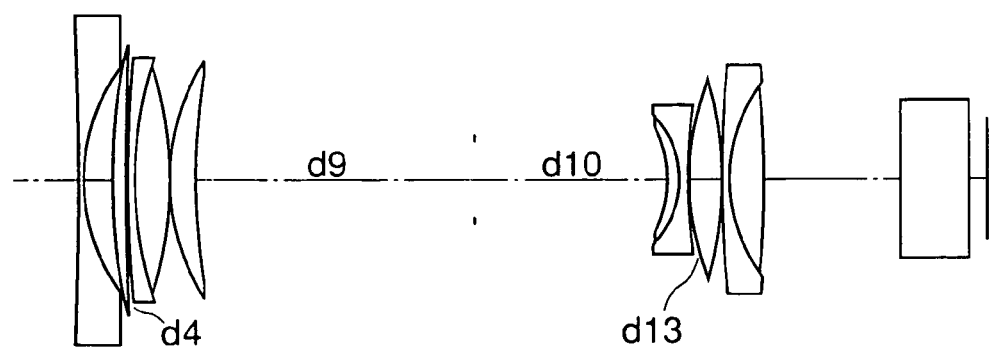
Figure 37A:
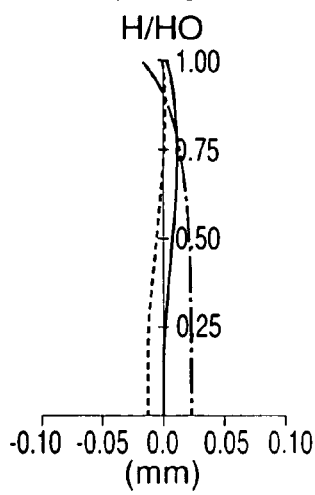
FIGS. 37A to 37I are graphic representations of the aberrations observed in the lens optical system of Example 11.
Figure 37B:
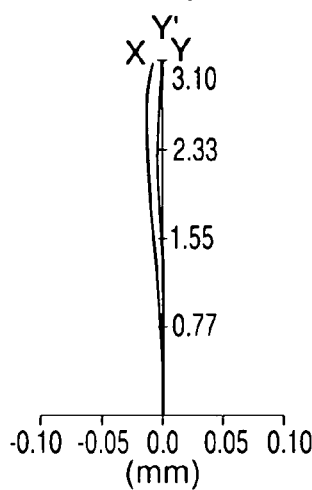
Figure 37C:
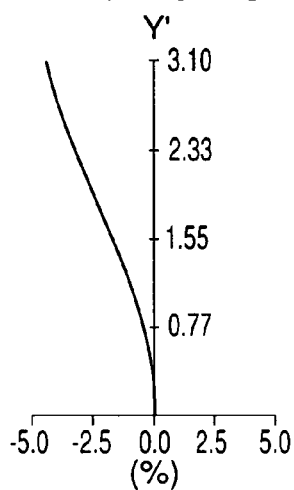
Figure 37D:
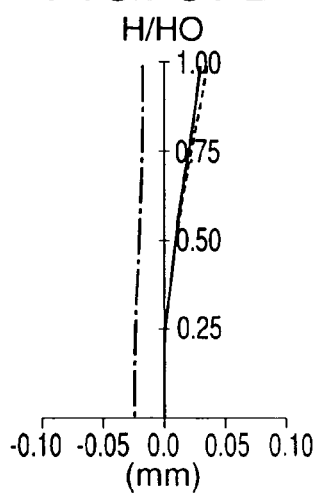
Figure 37E:
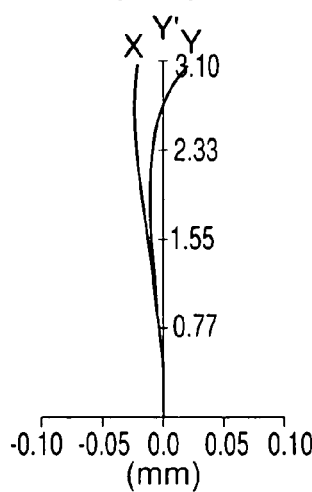
Figure 37F:
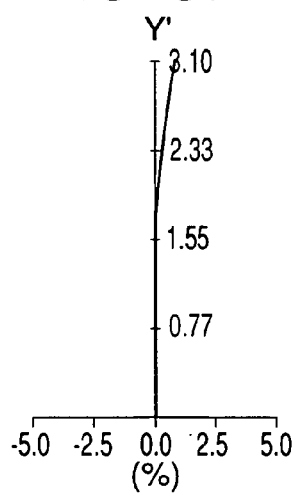
Figure 37G:
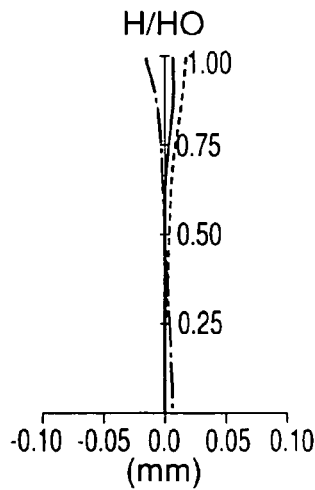
Figure 37H:
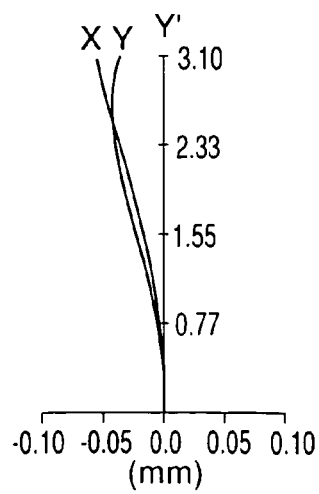
Figure 37I:
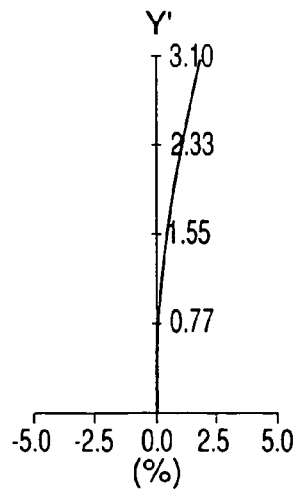

Next, the angle of incidence θ will be described. In a lens optical system, as shown in FIG. 35, the angle of incidence θ varies according to the angle of view (in FIG. 35, AX represents the optical axis of the lens optical system). Thus, when the angle of view is at its maximum, the angle of incidence θ is at its maximum. Strictly speaking, the angle of incidence θ with respect to the lens surface varies with the lens arrangement of the entire lens optical system. However, in Condition (13) noted previously, even if the angle of incidence θ is replaced with the maximum half angle of viewωmax, it is still possible to grasp how the diffraction efficiency varies with the angle of incidence θ. Thus, by substituting Condition (16) in Condition (13) and then revising the value of the constant on the right side accordingly, the following condition (17) is obtained:

$$|\{(h \cdot \phi doe \cdot Ddoe)/(2 \cdot \lambda 0)\} \cdot \tan(\omega \max)| \leq 0.06 \quad (17)$$

EXAMPLE 7 TO 10

Figure 30A:
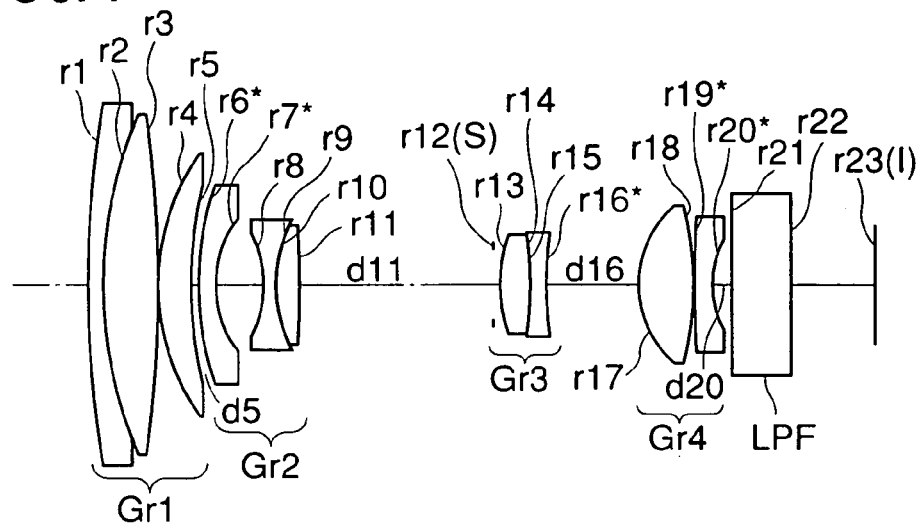
FIGS. 30A to 30C are lens arrangement diagrams of a lens optical system taken up as an example for comparison (Comparison Example 4)
Figure 30B:
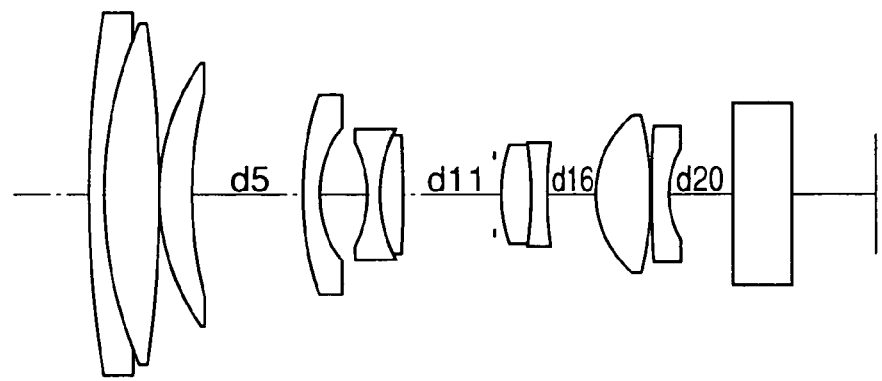
Figure 30C:
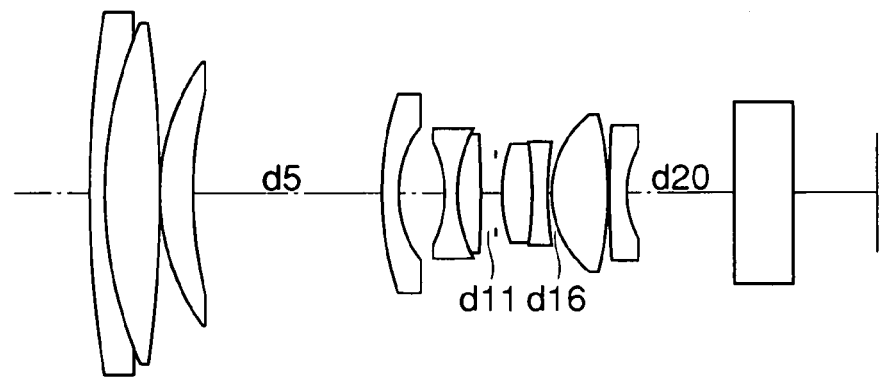
Figure 31A:
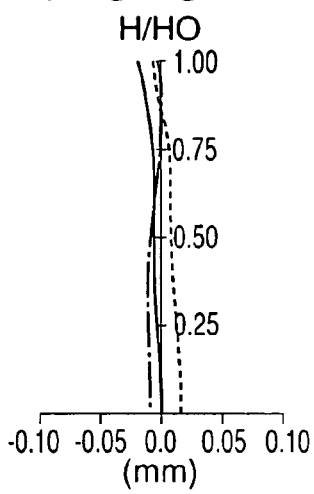
FIGS. 31A to 31I are graphic representations of the aberrations observed in the lens optical system of Comparison Example 4.
Figure 31B:
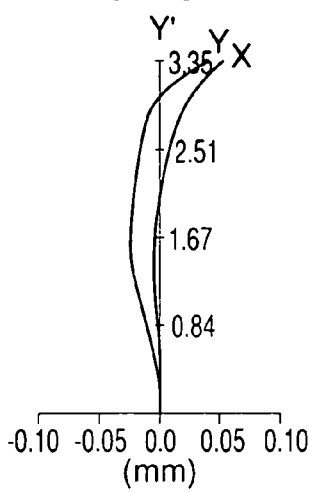
Figure 31C:
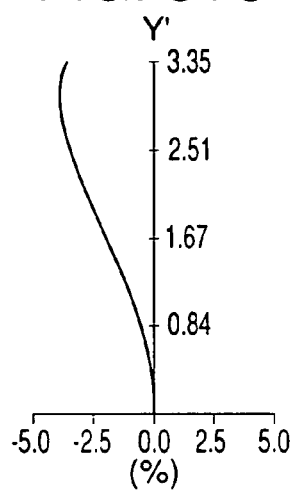
Figure 31D:
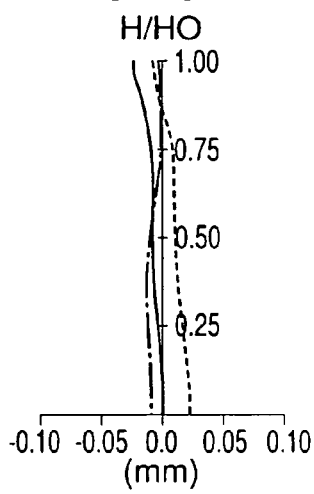
Figure 31E:
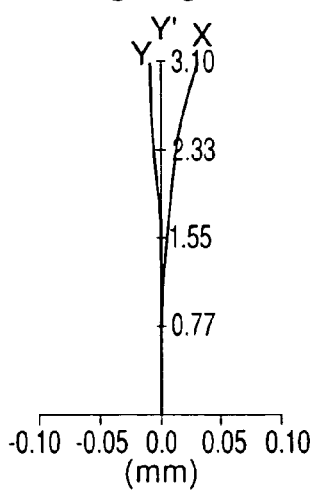
Figure 31F:
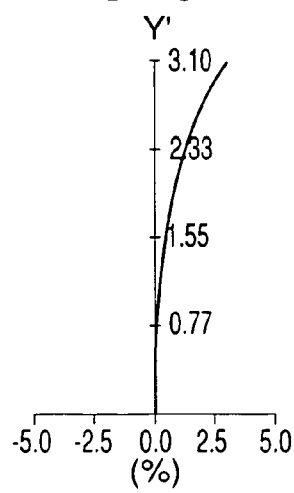
Figure 31G:
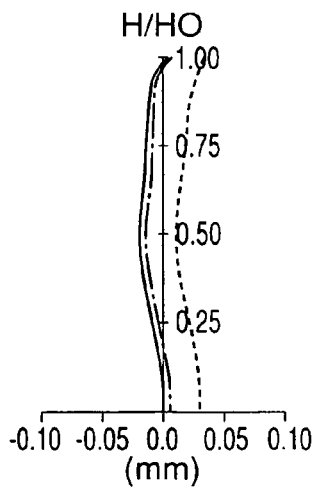
Figure 31H:
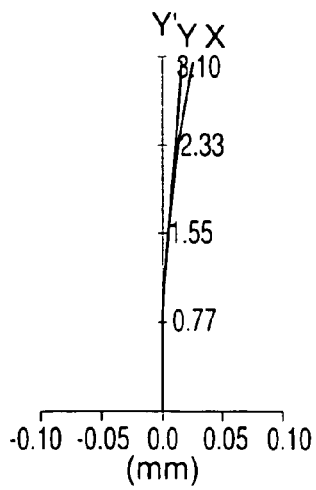
Figure 31I:
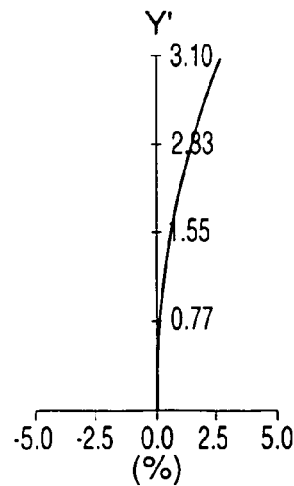

Hereinafter, examples of lens optical systems embodying the present invention will be presented with reference to their construction data, graphic representations of aberrations, and other data. Tables 23, 24, 25, and 26 list the construction data of Examples 7, 8, 9, and 10, which respectively correspond to the seventh, eighth, ninth, and tenth embodiments described above and have lens arrangements as shown in FIGS. 22A to 22C; 24A to 24C; 26A to 26C; and 28A to 28C. Table 27 lists the construction data of Comparison Example 4, which corresponds to Example 7 but has a lens arrangement as shown in FIGS. 30A to 30C (i.e. having no diffraction grating).

In the construction data of each example, ri (i=1, 2, 3, . . . ) represents the radius of curvature of the ith surface counted from the object side, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith optical element counted from the object side. Moreover, in the construction data, for each of the axial distances that vary with zooming (i.e. the variable axial distances), three values are given that are, from left, the axial aerial distance between the lens units at the wide-angle end [W] (i.e. in the shortest-focal-length condition), the same distance at the middle focal length [M], and the same distance at the telephoto end [T] (i.e. in the longest-focal-length condition). Also listed are the focal length f, the half angle of view ω (°), and the F-number FNO of the entire lens optical system in the three focal-length conditions [W], [M], and [T] mentioned just above, and the values corresponding to Conditions (10), (11), and (12) noted above. Moreover, Table 28 lists the values corresponding to Condition (13), and Table 29 lists the values corresponding to Conditions (14) and (15). Note that, in Table 28, the reason that the value of Condition (13) is given as a particular range is that the value of the grating pitch d varies according to the height H with respect to the optical axis.

A surface whose radius of curvature ri is marked with an asterisk (*) is an aspherical surface, whose surface shape is defined by Formula (as) noted earlier. A surface whose radius of curvature ri is marked with # is a diffractive lens surface, i.e. a lens surface having a diffraction grating formed thereon, of which the phase shape of the pitch is defined by Formula (ds) noted earlier. Also listed together are the aspherical surface data of each aspherical surface, the diffractive surface data of each diffractive lens surface, and other data.

The lens optical system of Comparison Example 4 is built as a four-unit zoom lens system of a positive-negative-positive-positive configuration. In this lens optical system, the lens units are each composed as follows. The first lens unit (Gr1) is composed of three lens elements that are a negative lens element, a positive lens element, and a positive lens element. The second lens unit (Gr2) is composed of three lens elements that are a negative lens element, a negative lens element, and a positive lens element. The third lens unit (Gr3) is composed of two lens elements that are a positive lens element and a negative lens element. The fourth lens unit (Gr4) is composed of two lens elements that are a positive lens element and a negative lens element. Table 30 lists the chromatic aberration coefficients of the entire lens optical system, as well as of the individual lens units (Gr1, Gr2, Gr3, and Gr4) thereof, of Comparison Example 4, as observed at the wide angle end [W] and the telephoto end [T] (note that LC represents the longitudinal chromatic aberration coefficient and TC represents the lateral chromatic aberration coefficient).

In Comparison Example 4, as will be understood from the chromatic aberration coefficients of the entire lens optical system listed in Table 30, at the wide angle end [W], the longitudinal chromatic aberration coefficient LC and the lateral chromatic aberration coefficient TC take great positive values, and, at the telephoto end [T], the lateral chromatic aberration coefficient TC takes a great negative value. Moreover, the degree to which the longitudinal chromatic aberration observed at the wide angle end [W] affects adversely on the entire lens optical system is great relative to the degree to which the lateral chromatic aberration observed at the wide angle end [W] (and at the telephoto end [T]) affects adversely on the entire lens optical system. Accordingly, correcting the longitudinal chromatic aberration observed at the wide angle end [W] is effective in correcting overall aberrations.

On the other hand, the longitudinal chromatic aberration coefficient LC originates mostly in the vicinity of the aperture stop (S), i.e., in the position corresponding to the third lens unit (Gr3) at the wide-angle end [W]. Accordingly, by providing a diffractive lens element in the third lens unit (Gr3), it will be possible to correct chromatic aberration effectively. The lens arrangement of the lens optical system of Comparison Example 4, if a diffractive lens element is provided in its third lens unit (Gr3), corresponds to the lens arrangement of the lens optical system of Example 7. Table 31 lists, as Table 30 does, the chromatic aberration coefficients of the entire lens optical system, as well as of the individual lens units (Gr1, Gr2, Gr3, and Gr4) thereof, of Example 7, as observed at the wide angle end [W] and the telephoto end [T]. Note that, here, for the third lens unit (Gr3), two sets of values are given, with the chromatic aberration coefficients of the entire third lens unit (Gr3) listed in the left-hand column and the chromatic aberration coefficients produced by the diffractive lens element included therein listed in the right-hand column. As will be understood from Table 31, the negative longitudinal chromatic aberration coefficient LC produced by the diffractive lens element included in the third lens unit (Gr3) acts to improve the longitudinal chromatic aberration coefficient LC of the entire lens optical system as observed at the wide-angle end [W].

Figure 32A:
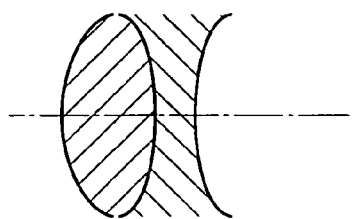
FIGS. 32A to 32C are diagrams illustrating the astigmatism and the Petzval effect obtained when a diffractive lens element is used.
Figure 32B:
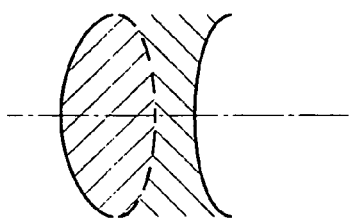
Figure 32C:
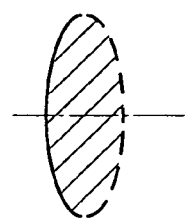

Next, the astigmatism and the Petzval effect observed when a diffractive lens element is used will be described. Here, the following three models (a), (b), and (c) of a diffractive lens element, i.e. an optical system composed of a thin lens element, as shown in FIGS. 32A, 32B, and 32C, respectively, will be considered.

(a) a cemented lens element formed by cementing together a positive and a negative lens element;

(b) a cemented lens element formed by cementing together a positive and a negative lens element, with a diffractive lens surface (indicated by a broken line) formed on its cementing surface; and (c) a single positive lens element having a diffractive lens surface (indicated by a broken line) formed thereon.

In the model (a), chromatic aberration is corrected by the combination of the positive and negative lens elements. In the model (b), chromatic aberration is corrected by the combination of the positive and negative lens elements and also by the diffractive lens surface. In the model (c), chromatic aberration is corrected solely by the diffractive lens surface. The relationship among these models (a), (b), and (c) in terms of the degree to which they, acting as diffractive lens elements, correct chromatic aberration given as: (a)<(b)<(c). Thus, the relationship among those models (a), (b), and (c) in terms of the power they exert as diffractive lens elements is also given as: (a)<(b)<(c). Accordingly, the diffractive lens element of the model (c), which corrects chromatic aberration to the highest degree, exerts the strongest optical power.

In Comparison Example 4, the third lens unit (Gr3) is composed of a positive and a negative lens element. The positive lens element is made of a glass material that has a relatively low refractive index and a relatively low dispersion. The negative lens element is made of a glass material that has a relatively high refractive index and a relatively high dispersion. Correspondingly, it is assumed that the cemented lens element constituting the models (a) and (b) employs a positive lens element made of a glass material that has a relatively low refractive index and a relatively low dispersion, and a negative lens element made of a glass material that has a relatively high refractive index and a relatively high dispersion. In the third lens unit (Gr3) of the lens optical system of Example 7, the positive lens element is made of a glass material that has a relatively high refractive index and a relatively low dispersion, and the negative lens element is made of a glass material that has a relatively low refractive index and a relatively high dispersion. Accordingly, here, as a cemented lens element of the model (b), two types will be considered, i.e. a positive lens element made of a glass material that has a relatively high refractive index and a relatively low dispersion and a negative lens element made of a glass material that has a relatively low refractive index and a relatively high dispersion. Table 32 lists the data of the glass materials employed here (note that nd represents the refractive index for the d line and vd represents the Abbe number).

Table 33 lists the aberration coefficients of the optical system as a whole of the models (a), (b), and (c) (note that PT represents a Petzval coefficient and AS represents an astigmatism coefficient). In Comparison Example 4, the third lens unit (Gr3) is disposed behind the aperture stop (S). Correspondingly, the aberration coefficients are calculated on the assumption that the models (a), (b), or (c) is disposed behind the aperture stop (S). Moreover, the aberration coefficients of the models (a), (b), and (c) are calculated on the assumption that the lens surfaces are given curvatures (bending) such that the spherical aberration coefficients of the entire optical system is minimized. As will be understood From Table 33, the stronger the optical power of the diffractive lens element, the smaller the Petzval coefficient PT and the greater the astigmatism coefficient AS.

Table 34 lists the Petzval coefficients PT and the astigmatism coefficients AS as observed in Comparison Example 4 and Example 7 (an optical system having a diffractive lens element disposed in its third lens unit (Gr3)). These two optical systems are designed to have such sizes as to offer equivalent lens performance. As will be understood from Table 34, in Comparison Example 4, at the wide-angle end [W], the astigmatism coefficient AS takes a fairly great positive value. The diffractive lens element serves to reduce the Petzval coefficient PT of the third lens unit (Gr3). This makes correction of aberrations easier, and thereby helps achieve a compact zoom-type lens optical system.

As will be understood from the foregoing, with a lens optical system employing a diffractive lens element, how compact it can be made depends on the balance between the effect of chromatic aberration correction and the effects of the Petzval sum and astigmatism. Moreover, by providing a diffractive lens element in the third lens unit (Gr3) of a zoom-type lens optical system having four lens units that are a positive, a negative, a positive, and a positive (or negative) lens unit, like those of Examples 7 to 10, it is possible to achieve a satisfactorily compact lens optical system, thanks to the effect of chromatic aberration correction.

FIGS. 23A to 23I, 25A to 25I, 27A to 27I, and 29A to 29I are graphic representations of the aberrations observed in the lens optical systems of Examples 7, 8, 9, and 10, respectively. FIGS. 31A to 31I are graphic representations of the aberrations observed in the lens optical system of Comparison Example 4. Of these diagrams, FIGS. 23A, 23B, 23C, 25A, 25B, 25C, 27A, 27B, 27C, 29A, 29B, 29C, 31A, 31B, and 31C show the aberrations observed at the wide-angle end [W]; FIGS. 23D, 23E, 23F, 25D, 25E, 25F, 27D, 27E, 27F, 29D, 29E, 29F, 31D, 31E, and 31F show the aberrations observed at the middle focal length [M]; and FIGS. 23G, 23H, 23I, 25G, 25H, 25I, 27G, 27H, 27I, 29G, 29H, 29I, 31G, 31H, and 31I show the aberrations observed at the telephoto end [T]. Furthermore, of these diagrams, FIGS. 23A, 23D, 23G, 25A, 25D, 25G, 27A, 27D, 27G, 29A, 29D, 29G, 31A, 31D, and 31G show spherical aberration; FIGS. 23B, 23E, 23H, 25B, 25E, 25H, 27B, 27E, 27H, 29B, 29E, 29H, 31B, 31E, and 31H show astigmatism; and FIGS. 23C, 23F, 23I, 25C, 25F, 25I, 27C, 27F, 27I, 29C, 29F, 29I, 31C, 31F, and 31I show distortion. In the spherical aberration diagrams, the value H/H0 obtained by normalizing the height H at which a light ray enters the entrance pupil with respect to the maximum height H0 (=1) (i.e. the relative height at which the light ray crosses the entrance-pupil plane) is taken along the vertical axis, and the deviation (mm) from the paraxial imaging position along the optical axis is taken along the horizontal axis. In addition, the broken line represents the spherical aberration for the C line (wavelength λC: 656. 3 nm), the solid line represents the spherical aberration for the d line (wavelength λd: 587. 6 nm), and the dash-and-dot line represents the spherical aberration for the g line (wavelength kg: 435. 8 nm). In the astigmatism diagrams, the image height Y' (mm) is taken along the vertical axis, and the deviation (mm) from the paraxial imaging position along the optical axis is taken along the horizontal axis. In addition, the solid line X represents the astigmatism on the sagittal plane, and the solid line Y represents the astigmatism on the meridional plane. In the distortion diagrams, the image height Y' (mm) is taken along the vertical axis, and the amount of distortion (%) is taken along the horizontal axis.

Embodiment 11

The lens optical system of the eleventh embodiment is built as a four-unit zoom lens system that is composed of, from the object side, a first lens unit (Gr1) having a negative optical power, a second lens unit (Gr2) having a positive optical power, a third lens unit (Gr3) having a negative optical power, and a fourth lens unit (Gr4) having a positive optical power, wherein zooming is performed by varying the distance between the first and second lens units (Gr1 and Gr2), the distance between the third and fourth lens units (Gr3 and Gr4), and so forth. In this lens optical system, between the second and third lens units (Gr2 and Gr3), an aperture stop (S) is disposed that is substantially kept in a fixed position during zooming. Moreover, a low-pass filter (LPF) is disposed at the image-plane (I) side end of the lens optical system.

In the lens optical system of the eleventh embodiment (FIGS. 36A to 36C), the lens units are each composed, from the object side, as follows. The first lens unit (Gr1) is composed of a negative biconcave lens element and a positive meniscus lens element convex to the object side. The second lens unit (Gr2) is composed of a cemented lens element formed by cementing together a negative meniscus lens element concave to the image side and a positive biconvex lens element, and a positive meniscus lens element convex to the object side. The third lens unit (Gr3) is composed of a cemented lens element formed by cementing together a positive meniscus lens element convex to the image side and a negative biconcave lens element. The fourth lens unit (Gr4) is composed of a positive biconvex lens element and a cemented lens element formed by cementing together a negative meniscus lens element concave to the image side and a positive biconvex lens element, with a diffraction grating formed on its fourteenth surface (r14). In order to make this zoom-type lens optical system satisfactorily compact, it is preferable to provide a diffraction grating in the fourth lens unit (Gr4) from the viewpoint of aberration correction. This will be described in detail later.

Next, the conditions will be described that are preferably fulfilled by a lens optical system as exemplified by the eleventh embodiment, i.e. a zoom-type lens optical system having four lens units that are a negative, a positive, a negative, and a positive lens unit, wherein a diffraction grating is disposed in the fourth lens unit (Gr4). Note that it is not necessary that all of the conditions given below be fulfilled simultaneously; if any of those conditions is fulfilled, it is possible to achieve the corresponding advantages. It is needless to say, however, that more than one condition should preferably be fulfilled to obtain satisfactory results in terms of optical performance, miniaturization, and so forth.

It is preferable that the diffraction grating fulfill Condition (18) below.

$$0.001 < \phi doe/\phi gr4 < 0.01 \quad (18)$$

wherein
 φdoe represents the optical power of the diffraction grating; and
 φgr4 represents the optical power of the fourth lens unit (Gr4).

Condition (18) defines the preferable ratio of the optical power φdoe of the diffraction grating to the optical power φgr4 of the fourth lens unit (Gr4) (which includes the optical power φdoe). Fulfillment of Condition (18) makes it possible to achieve a satisfactorily compact lens optical system. If the value of Condition (18) is less than its lower limit, the diffractive lens element does not serve to correct chromatic aberration, and thus the lens optical system as a whole becomes unduly large. In contrast, if the value of Condition (18) is greater than its upper limit, the diffractive lens element causes unduly large astigmatism. In this case, correction of astigmatism cannot be achieved without making the lens optical system as a whole unduly large.

It is preferable that the diffraction grating fulfill at least one of Conditions (19) and (20) below.

$$1.0 < tW/fW < 4.0 \quad (19)$$

$$tT/fT < 1.0 \quad (20)$$

wherein
 tW represents the axial distance, as converted into an aerial distance, between the diffraction grating and the aperture stop (S) at the wide-angle end [W];
 tT represents the axial distance, as converted into an aerial distance, between the diffraction grating and the aperture stop (S) at the telephoto end [T];
 fW represents the focal length of the entire zoom lens system at the wide-angle end [W]; and
 fT represents the focal length of the entire zoom lens system at the telephoto end [T].

Fulfillment of Conditions (19) or (20) or both makes it possible to achieve a lens optical system that corrects chromatic aberration properly. If the value of Condition (19) is less than its lower limit, lateral chromatic aberration is undercorrected at the wide-angle end [W]. In contrast, if the value of Condition (19) is greater than its upper limit, the lens optical system as a whole becomes unduly large. On the other hand, if the value of Condition (20) is greater than its upper limit, lateral chromatic aberration becomes unduly large at the telephoto end [T].

It is preferable that Condition (21) below be fulfilled. Fulfillment of Condition (21) makes it possible to keep within an acceptable range the loss of brightness as occurs at the edge of image frame when an image sensor is used.

$$|Y'max/PZ| < 0.4 \quad (21)$$

wherein
 Y'max represents the maximum image height; and
 PZ represents the distance from the image plane (I) to the exit pupil.

EXAMPLE 11

Figure 38A:
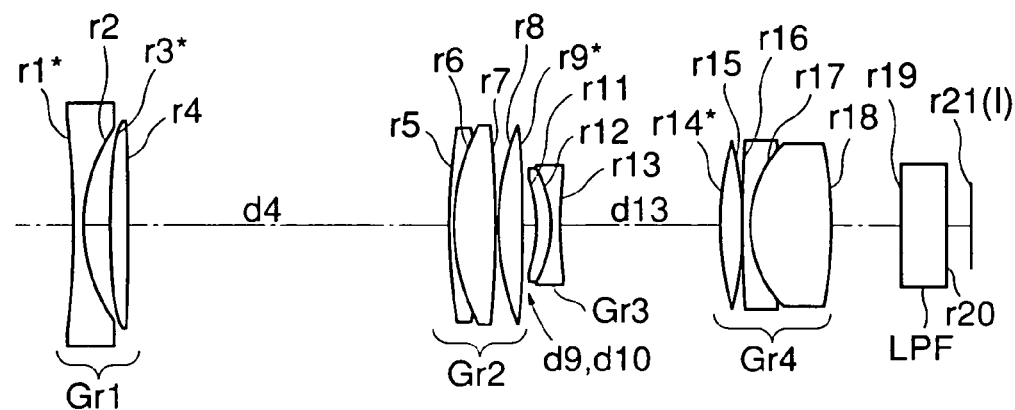
FIGS. 38A to 38C are lens arrangement diagrams of a lens optical system taken up as an example for comparison (Comparison Example 5)
Figure 38B:
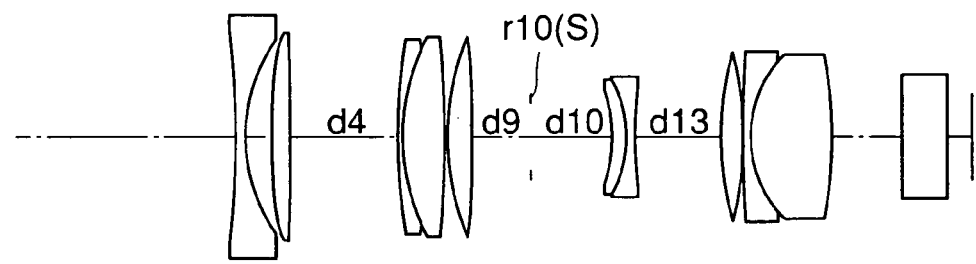
Figure 38C:
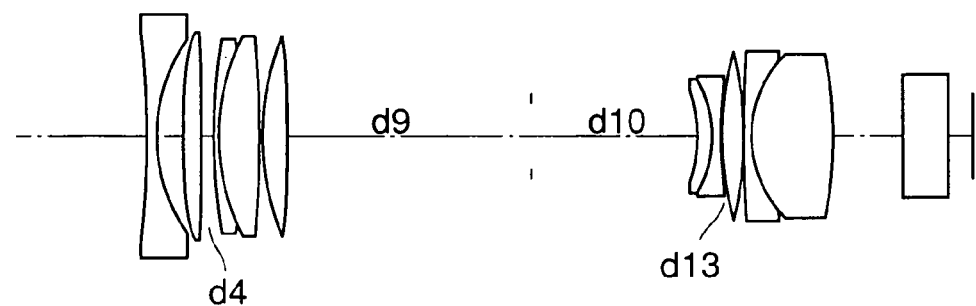
Figure 39A:
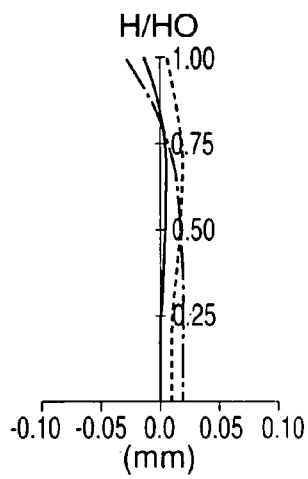
FIGS. 39A to 39I are graphic representations of the aberrations observed in the lens optical system of Comparison Example 5.
Figure 39B:
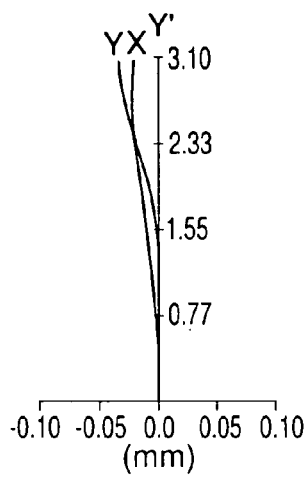
Figure 39C:
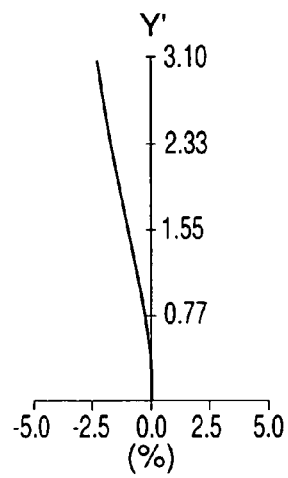
Figure 39D:
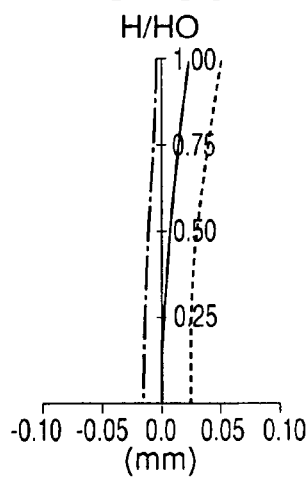
Figure 39E:
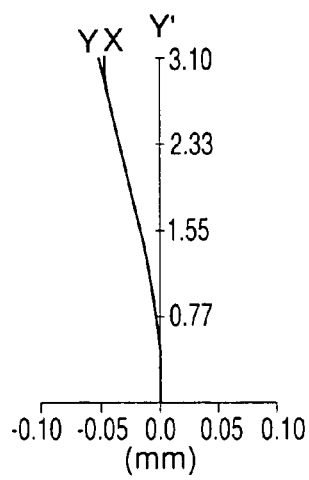
Figure 39F:
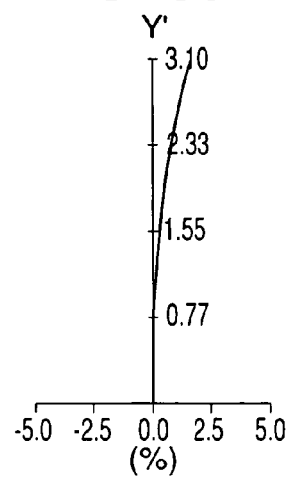
Figure 39G:
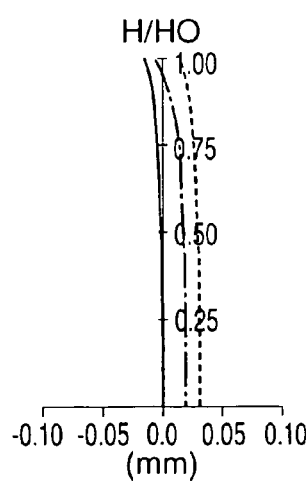
Figure 39H:
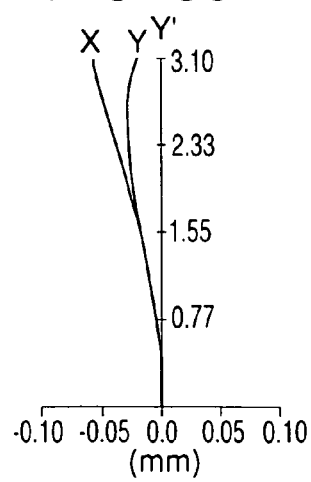
Figure 39I:
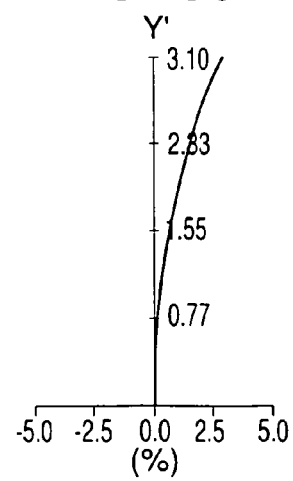

Hereinafter, an example of a lens optical system embodying the present invention will be presented with reference to its construction data, graphic representations of aberrations, and other data. Table 35 lists the construction data of Example 11, which corresponds to the eleventh embodiment described above and has a lens arrangement as shown in FIGS. 36A, 36B, and 36C. Table 36 lists the construction data of Comparison Example 5, which corresponds to Example 11 but has a lens arrangement as shown in FIGS. 38A, 38B, and 38C (i.e. having no diffraction grating).

In the construction data of each example, ri (i=1, 2, 3, . . . ) represents the radius of curvature of the ith surface counted from the object side, di (i=1, 2, 3, . . . ) represents the ith axial distance counted from the object side, and Ni (i=1, 2, 3, . . . ) and vi (i=1, 2, 3, . . . ) respectively represent the refractive index for the d line and the Abbe number of the ith optical element counted from the object side. Moreover, in the construction data, for each of the axial distances that vary with zooming (i.e. the variable axial distances), three values are given that are, from left, the axial aerial distance between the lens units at the wide-angle end [W] (i.e. in the shortest-focal-length condition), the same distance at the middle focal length [M], and the same distance at the telephoto end [T] (i.e. in the longest-focal-length condition). Also listed are the focal length f, the half angle of view ω(°), and the F-number FNO of the entire lens optical system in the three focal-length conditions [W], [M], and [T] mentioned just above, and the values corresponding to Conditions noted above.

A surface whose radius of curvature ri is marked with an asterisk (*) is an aspherical surface, whose surface shape is defined by Formula (as) noted earlier. A surface whose radius of curvature ri is marked with # is a diffractive lens surface, i.e. a lens surface having a diffraction grating formed thereon, of which the phase shape of the pitch is defined by Formula (ds) noted earlier. Also listed together are the aspherical surface data of each aspherical surface, the diffractive surface data of each diffractive lens surface, and other data.

The lens optical system of Comparison Example 5 is built as a four-unit zoom lens system of a negative-positive-negative-positive configuration. In this lens optical system, the lens units are each composed as follows. The first lens unit (Gr1) is composed of two lens elements that are a negative lens element and a positive lens element. The second lens unit (Gr2) is composed of three lens elements that are a negative lens element, a positive lens element, and a positive lens element. The third lens unit (Gr3) is composed of two lens elements that are a positive lens element and a negative lens element. The fourth lens unit (Gr4) is composed of three lens elements that are a positive lens element, a negative lens element, and a positive lens element. Table 37 lists the chromatic aberration coefficients of the entire lens optical system, as well as of the individual lens units (Gr1, Gr2, Gr3, and Gr4) thereof, of Comparison Example 5, as observed at the wide angle end [W] and the telephoto end [T] (note that LC represents the longitudinal chromatic aberration coefficient and TC represents the lateral chromatic aberration coefficient). In Comparison Example 5, as will be understood from the chromatic aberration coefficients of the entire optical system listed in Table 37, at the wide angle end [W], the lateral chromatic aberration coefficient TC takes a great positive value. Now, how chromatic aberration is corrected in the lens optical system of Comparison Example 5 if a diffractive lens element is provided in the first, second, third, or fourth lens unit (Gr1, Gr2, Gr3, and Gr4) will be described.

Assume that a diffractive lens element is provided in the first lens unit (Gr1) of the lens optical system of Comparison Example 5. In this lens optical system, since the first lens unit (Gr1) is disposed away from the aperture stop (S) on the front side thereof, the lateral chromatic aberration coefficient TC takes a great value. If, to correct this, a diffractive lens element which produces a negative lateral chromatic aberration coefficient TC is provided in the first lens unit (Gr1), the diffractive lens element will cause a positive longitudinal chromatic aberration coefficient LC. Even though this positive longitudinal chromatic aberration coefficient LC is small, it increases the longitudinal chromatic aberration coefficients LC of the entire lens optical system in the positive direction. Accordingly, it is not preferable to provide a diffractive lens element in the first lens unit (Gr1).

Assume that a diffractive lens element is provided in the second lens unit (Gr2) of the lens optical system of Comparison Example 5. In this lens optical system, the second lens unit (Gr2) is disposed immediately in front of the aperture stop (S) at the wide-angle end [W], and is disposed away from the aperture stop (S) on the front side thereof at the telephoto end [T]. Thus, at the wide-angle end [W], the longitudinal chromatic aberration coefficient LC takes a great value, and, at the telephoto end [T], the lateral chromatic aberration coefficients TC takes a great value. This is inconsistent with the fact that, in Comparison Example 5, it is necessary to improve the lateral chromatic aberration coefficient TC observed at the wide-angle end [W]. Accordingly, it is expected that providing a diffractive lens element in the second lens unit (Gr2) will be ineffective.

Assume that a diffractive lens element is provided in the third lens unit (Gr3) of the lens optical system of Comparison Example 5. In this lens optical system, the third lens unit (Gr3) is disposed immediately behind the aperture stop (S) at the wide-angle end [W], and is disposed away from the aperture stop (S) on the back side thereof at the telephoto end [T]. Thus, at the wide-angle end [W], the longitudinal chromatic aberration coefficient LC takes a great value, and, at the telephoto end [T], the lateral chromatic aberration coefficients TC takes a great value. This is inconsistent with the fact that, in Comparison Example 5, it is necessary to improve the lateral chromatic aberration coefficient TC observed at the wide-angle end [W]. Accordingly, it is expected that providing a diffractive lens element in the third lens unit (Gr3) will be ineffective.

Assume that a diffractive lens element is provided in the fourth lens unit (Gr4) of the lens optical system of Comparison Example 5. In this case, the lens arrangement of Comparison Example 5 corresponds to the lens arrangement of Example 11. Table 38 lists, as Table 37 does, the chromatic aberration coefficients of the entire lens optical system, as well as of the individual lens units (Gr1, Gr2, Gr3, and Gr4) thereof, of Example 11, as observed at the wide angle end [W] and the telephoto end [T]. Note that, here, for the fourth lens unit (Gr4), two sets of values are given, with the chromatic aberration coefficients of the entire fourth lens unit (Gr4) listed in the left-hand column and the chromatic aberration coefficients produced by the diffractive lens element included therein listed in the right-hand column.

Since the fourth lens unit (Gr4) is disposed away from the aperture stop (S) on the back side of the lens optical system, the lateral chromatic aberration coefficient TC takes a great value. If, to correct this, a diffractive lens element which produces a negative lateral chromatic aberration coefficient TC is provided in the fourth lens unit (Gr4), the diffractive lens element will cause a negative longitudinal chromatic aberration coefficient LC. In Comparison Example 5, the longitudinal chromatic aberration coefficient LC takes a positive value, and is thus canceled by the longitudinal chromatic aberration coefficient LC produced by the diffractive lens element. This helps enhance the effect of chromatic aberration correction exerted by the diffractive lens element. Moreover, in Example 11, the lateral chromatic aberration coefficient TC takes a small value at the wide angle end [W]. Accordingly, it will be understood that it is preferable to provide a diffractive lens element in the fourth lens unit (Gr4) and that the diffractive lens element exhibits the greatest chromatic aberration correction effect when provided in the fourth lens unit (Gr4).

Figure 40A:
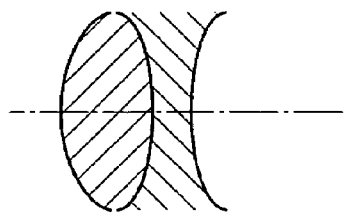
FIGS. 40A to 40C are diagrams illustrating the astigmatism and the Petzval effect obtained when a diffractive lens element is used.
Figure 40B:
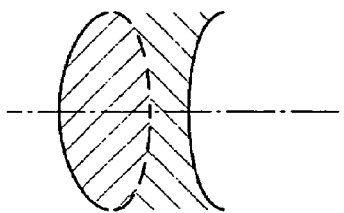
Figure 40C:
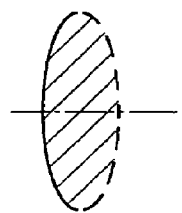

Next, the astigmatism and the Petzval effect observed when a diffractive lens element is used will be described. Here, the following three models (a), (b), and (c) of a diffractive lens element, i.e. an optical system composed of a thin lens element, as shown in FIGS. 40A, 40B, and 40C, respectively, will be considered.

(a) a cemented lens element formed by cementing together a positive and a negative lens element;

(b) a cemented lens element formed by cementing together a positive and a negative lens element, with a diffractive lens surface (indicated by a broken line) formed on its cementing surface; and (c) a single positive lens element having a diffractive lens surface (indicated by a broken line) formed thereon.

In the model (a), chromatic aberration is corrected by the combination of the positive and negative lens elements. In the model (b), chromatic aberration is corrected by the combination of the positive and negative lens elements and also by the diffractive lens surface. In the model (c), chromatic aberration is corrected solely by the diffractive lens surface. The relationship among these models (a), (b), and (c) in terms of the degree to which they, acting as diffractive lens elements, correct chromatic aberration is given as: (a)<(b)<(c). Thus, the relationship among those models (a), (b), and (c) in terms of the power they exert as diffractive lens elements is also given as: (a)<(b)<(c). Accordingly, the diffractive lens element of the model (c), which corrects chromatic aberration to the highest degree, exerts the strongest optical power.

In Comparison Example 5, the fourth lens unit (Gr4) is composed of a positive and a negative lens element. The positive lens element is made of a glass material that has a relatively low refractive index and a relatively low dispersion. The negative lens element is made of a glass material that has a relatively high refractive index and a relatively high dispersion. Correspondingly, it is assumed that the cemented lens element constituting the models (a) and (b) employs a positive lens element made of a glass material that has a relatively low refractive index and a relatively low dispersion, and a negative lens element made of a glass material that has a relatively high refractive index and a relatively high dispersion. Table 39 lists the data of the glass materials employed here (note that nd represents the refractive index for the d line and vd represents the Abbe number).

Table 40 lists the aberration coefficients of the optical system as a whole of the models (a), (b), and (c) (note that PT represents a Petzval coefficient and AS represents an astigmatism coefficient). In Comparison Example 5, the fourth lens unit (Gr4) is disposed behind the aperture stop (S). Correspondingly, the aberration coefficients are calculated on the assumption that the models (a), (b), or (c) is disposed behind the aperture stop (S). Moreover, the aberration coefficients of the models (a), (b), and (c) are calculated on the assumption that the lens surfaces are given curvatures (bending) such that the spherical aberration coefficients of the entire optical system is minimized. As will be understood from Table 40, the stronger the optical power of the diffractive lens element, the smaller the Petzval coefficient PT and the greater the astigmatism coefficient AS.

Table 41 lists the Petzval coefficients PT and the astigmatism coefficients AS as observed in Comparison Example 5 and Example 11 (an optical system having a diffractive lens element disposed in its fourth lens unit (Gr4)). These two optical systems are designed to have such sizes as to offer equivalent lens performance. As will be understood from Table 41, in Comparison Example 5, the Petzval coefficient PT of the entire lens optical system takes a great positive value. The diffractive lens element serves to reduce the Petzval coefficient PT of the fourth lens unit (Gr4). This makes correction of aberrations easier, and thereby helps achieve a compact zoom-type lens optical system.

As will be understood from the foregoing, with a lens optical system employing a diffractive lens element, how compact it can be made depends on the balance between the effect of chromatic aberration correction and the effects of the Petzval sum and astigmatism. Moreover, by providing a diffractive lens element in the fourth lens unit (Gr4) of a zoom-type lens optical system having four lens units that are a negative, a positive, a negative, and a positive lens unit, like that of Example 11, it is possible to achieve a satisfactorily compact lens optical system, thanks to the effect of chromatic aberration correction.

FIGS. 37A to 37I are graphic representations of the aberrations observed in the lens optical system of Example 11, and FIGS. 39A to 39I are graphic representations of the aberrations observed in the lens optical system of Comparison Example 5. Of these diagrams, FIGS. 37A, 37B, 37C, 39A, 39B, and 39C show the aberrations observed at the wide-angle end [W]; FIGS. 37D, 37E, 37F, 39D, 39E, and 39F show the aberrations observed at the middle focal length [M]; and FIGS. 37G, 37H, 37I, 39G, 39H, and 39I show the aberrations observed at the telephoto end [T]. Furthermore, of these diagrams, FIGS. 37A, 37D, 37G, 39A, 39D, and 39G show spherical aberration; FIGS. 37B, 37E, 37H, 39B, 39E, and 39H show astigmatism; and FIGS. 37C, 37F, 37I, 39C, 39F, and 39I show distortion. In the spherical aberration diagrams, the value H/H0 obtained by normalizing the height H at which a light ray enters the entrance pupil with respect to the maximum height H0 (=1) (i.e. the relative height at which the light ray crosses the entrance-pupil plane) is taken along the vertical axis, and the deviation (mm) from the paraxial imaging position along the optical axis is taken along the horizontal axis. In addition, the broken line represents the spherical aberration for the C line (wavelength λC: 656. 3 nm), the solid line represents the spherical aberration for the d line (wavelength λd: 587. 6 nm), and the dash-and-dot line represents the spherical aberration for the g line (wavelength λg: 435. 8 nm). In the astigmatism diagrams, the image height Y' (mm) is taken along the vertical axis, and the deviation (mm) from the paraxial imaging position along the optical axis is taken along the horizontal axis. In addition, the solid line X represents the astigmatism on the sagittal plane, and the solid line Y represents the astigmatism on the meridional plane. In the distortion diagrams, the image height Y' (mm) is taken along the vertical axis, and the amount of distortion (%) is taken along the horizontal axis.

TABLE 1

Construction Data of Example 1
f = 5.1~16.0~48.8
ω = 31.3~11.0~3.63(°)
FNO = 2.75~3.5~4.1

| Radius of Curvature | Axial Distance | Refractive Index | Abbe Number |
|---|---|---|---|
| r1* = 15.99 | | | |
| | d1 = 0.40 | N1 = 1.84666 | ν1 = 23.82 |
| r2 = 13.05 | | | |
| | d2 = 0.06 | | |
| r3* = 12.93 | | | |
| | d3 = 2.99 | N2 = 1.60311 | ν2 = 60.74 |
| r4*# = −611.98 | | | |
| | d4 = 0.34 | N3 = 1.5644 | ν3 = 35.1 |
| r5* = 1275.53 | | | |
| | d5 = 0.1~7.78~11.83 | | |
| r6* = 10.52 | | | |
| | d6 = 0.50 | N4 = 1.51728 | ν4 = 69.43 |
| r7* = 3.78 | | | |
| | d7 = 3.78 | | |
| r8* = −9.54 | | | |
| | d8 = 0.69 | N5 = 1.62017 | ν5 = 24.01 |
| r9*# = −7.17 | | | |
| | d9 = 0.50 | N6 = 1.713 | ν6 = 53.92 |
| r10* = −28.56 | | | |
| | d10 = 18.01~8.03~0.5 | | |
| r11 = ∞{Aperture Stop (S)} | | | |
| | d11 = 0.10 | | |
| r12* = 5.48 | | | |
| | d12 = 2.99 | N7 = 1.60311 | ν7 = 60.74 |
| r13*# = −7.73 | | | |
| | d13 = 0.53 | N8 = 1.5644 | ν8 = 35.1 |
| r14* = −11.46 | | | |
| | d14 = 0.11 | | |
| r15* = −13.96 | | | |
| | d15 = 3.22 | N9 = 1.7495 | ν9 = 35.17 |
| r16* = 36.98 | | | |
| | d16 = 6.70~10.46~17.44 | | |
| r17 = ∞ | | | |
| | d17 = 3.40 | N10 = 1.5168 | ν10 = 64.12 |
| r18 = ∞ | | | |
| | d18 = 1.02 | | |
| r19 = ∞{Image Plane(I)} | | | |

Aspherical Surface Data of First Surface (r1)

$A4 = 2.93 \times 10^{-6}$
$A6 = 1.3532 \times 10^{-7}$
$A8 = -3.1 \times 10^{-9}$ Aspherical Surface Data of Third Surface (r3)

$A4 = -1.3 \times 10^{-5}$
$A6 = -5.051 \times 10^{-7}$
$A8 = 5.5 \times 10^{-9}$
$A10 = 9.26 \times 10^{-13}$ Aspherical Surface Data of Fourth Surface (r4)

$A4 = -2.4 \times 10^{-5}$
$A6 = 1.3231 \times 10^{-7}$
$A8 = 6.85 \times 10^{-9}$
$A10 = -2.4 \times 10^{-11}$ Aspherical Surface Data of Fifth Surface (r5)

$A4 = 6.22 \times 10^{-6}$
$A6 = -3.554 \times 10^{-7}$
$A8 = 2.02 \times 10^{-9}$
$A10 = -6.2 \times 10^{-12}$ Aspherical Surface Data of Sixth Surface (r6)

$A4 = 0.000941$
$A6 = -0.0001001$
$A8 = 3.49 \times 10^{-6}$
$A10 = -4.5 \times 10^{-8}$ Aspherical Surface Data of Seventh Surface (r7)

$A4 = 0.001073$
$A6 = -0.0001082$

TABLE 1-continued

Construction Data of Example 1
f = 5.1~16.0~48.8
ω = 31.3~11.0~3.63(°)
FNO = 2.75~3.5~4.1

$A8 = 9.64 \times 10^{-7}$
$A10 = -9.9 \times 10^{-8}$

Aspherical Surface Data of Eighth Surface (r8)

$A4 = -0.00046$
$A6 = 5.1001 \times 10^{-5}$
$A8 = -3.9 \times 10^{-6}$
$A10 = -1.4 \times 10^{-8}$ Aspherical Surface Data of Ninth Surface (r9)

$A4 = -0.00147$
$A6 = 1.3879 \times 10^{-5}$
$A8 = 1.99 \times 10^{-6}$
$A10 = -7.5 \times 10^{-9}$ Aspherical Surface Data of Tenth Surface (r10)

$A4 = -0.00094$
$A6 = 3.4959 \times 10^{-5}$
$A8 = -3 \times 10^{-6}$

Aspherical Surface Data of Twelfth Surface (r12)

$A4 = -0.00018$
$A6 = -6.511 \times 10^{-5}$
$A8 = 1.16 \times 10^{-7}$
$A10 = 1.25 \times 10^{-8}$ Aspherical Surface Data of Thirteenth Surface (r13)

$A4 = 0.000544$
$A6 = 1.7189 \times 10^{-5}$
$A8 = -9.4 \times 10^{-7}$
$A10 = -1.3 \times 10^{-8}$ Aspherical Surface Data of Fourteenth Surface (r14)

$A4 = 0.000763$
$A6 = -4.062 \times 10^{-5}$
$A8 = -9.6 \times 10^{-7}$
$A10 = 3.36 \times 10^{-8}$ Aspherical Surface Data of Fifteenth Surface (r15)

$A4 = 0.000348$
$A6 = -7.975 \times 10^{-6}$
$A8 = -3.3 \times 10^{-6}$

Aspherical Surface Data of Sixteenth Surface (r16)

$A4 = 0.001374$
$A6 = 6.2198 \times 10^{-5}$
$A8 = 1.73 \times 10^{-6}$

Diffractive Surface Data of Fourth Surface (r4)

$C1 = 0.00046$
$C2 = 8.4405 \times 10^{-7}$

Diffractive Surface Data of Ninth Surface (r9)

$C1 = 0.002731$
$C2 = -8.219 \times 10^{-7}$

Diffractive Surface Data of Thirteenth Surface (r13)

$C1 = -0.00169$
$C2 = 5.6339 \times 10^{-5}$

TABLE 2

Construction Data of Example 2
f = 5.1~16.0~48.8
ω = 31.2~11.0~3.64(°)
FNO = 2.75~3.5~4.1

| Radius of Curvature | Axial Distance | Refractive Index | Abbe Number |
|---|---|---|---|
| r1* = 15.41 | | | |
| | d1 = 0.30 | N1 = 1.5644 | ν1 = 35.1 |
| r2*# = 8.03 | | | |
| | d2 = 5.08 | N2 = 1.600 | ν2 = 64.38 |
| r3* = −318.30 | | | |
| | d3 = 0.1~5.476~9.457 | | |
| r4* = −117.62 | | | |
| | d4 = 0.50 | N3 = 1.58913 | ν3 = 61.11 |
| r5* = 4.31 | | | |
| | d5 = 2.19 | | |
| r6* = 9.61 | | | |
| | d6 = 2.14 | N4 = 1.62017 | ν4 = 24.01 |
| r7*# = −5.77 | | | |
| | d7 = 0.50 | N5 = 1.65446 | ν5 = 33.86 |
| r8* = 7.63 | | | |
| | d8 = 16.19~7.114~0.496 | | |
| r9 = ∞{Aperture Stop(S)} | | | |
| | d9 = 0.10 | | |
| r10* = 5.31 | | | |
| | d10 = 2.64 | N6 = 1.58913 | ν6 = 61.11 |
| r11* = −8.79 | | | |
| | d11 = 0.01 | | |
| r12* = −21.90 | | | |
| | d12 = 4.01 | N7 = 1.84666 | ν7 = 23.82 |
| r13* = 22.30 | | | |
| | d13 = 1.55~5.74~10.58 | | |
| r14 = ∞ | | | |
| | d14 = 3.40 | N8 = 1.5168 | ν8 = 64.12 |
| r15 = ∞ | | | |
| | d15 = 5.66 | | |
| r16 = ∞{Image Plane(I)} | | | |

Aspherical Surface Data of First Surface (r1)

A4 = −1 × 10⁻⁵
A6 = 8.7235 × 10⁻⁷
A8 = −1.5 × 10⁻⁸
A10 = 1.67 × 10⁻¹⁰

Aspherical Surface Data of Second Surface (r2)

A4 = 6.28 × 10⁻⁵
A6 = −1.108 × 10⁻⁵
A8 = 2.48 × 10⁻⁷
A10 = −2.4 × 10⁻⁹

Aspherical Surface Data of Third Surface (r3)

A4 = 3.15 × 10⁻⁵
A6 = 9.6774 × 10⁻⁷
A8 = −1.9 × 10⁻⁸
A10 = 2.77 × 10⁻¹⁰

Aspherical Surface Data of Fourth Surface (r4)

A4 = 0.000384
A6 = 3.3912 × 10⁻⁵
A8 = −1.5 × 10⁻⁶
A10 = 1.75 × 10⁻⁸

Aspherical Surface Data of Fifth Surface (r5)

A4 = −0.002
A6 = 2.0385 × 10⁻⁵
A8 = 6.47 × 10⁻⁶
A10 = −2.2 × 10⁻⁷

Aspherical Surface Data of Sixth Surface (r6)

A4 = −0.00436
A6 = 1.3465 × 10⁻⁶
A8 = 7.78 × 10⁻⁶
A10 = −3.2 × 10⁻⁷

TABLE 2-continued

Construction Data of Example 2
f = 5.1~16.0~48.8
ω = 31.2~11.0~3.64(°)
FNO = 2.75~3.5~4.1

Aspherical Surface Data of Seventh Surface (r7)

A4 = −0.00806
A6 = 0.00028396
A8 = 2.44 × 10⁻⁵
A10 = −1.1 × 10⁻⁶

Aspherical Surface Data of Eighth Surface (r8)

A4 = −0.00495
A6 = 0.00018033
A8 = −4.5 × 10⁻⁶

Aspherical Surface Data of Ninth Surface (r9)

A4 = −0.00088
A6 = −2.088 × 10⁻⁵
A8 = −6.1 × 10⁻⁶
A10 = 1.06 × 10⁻⁸

Aspherical Surface Data of Eleventh Surface (r11)

A4 = 0.000763
A6 = −4.062 × 10⁻⁵
A8 = −9.6 × 10⁻⁷
A10 = 3.36 × 10⁻⁸

Aspherical Surface Data of Twelfth Surface (r12)

A4 = 0.000675
A6 = 9.9201 × 10⁻⁶
A8 = 2.94 × 10⁻⁶

Aspherical Surface Data of Thirteenth Surface (r13)

A4 = 0.001621
A6 = 9.5672 × 10⁻⁵
A8 = 2.95 × 10⁻⁶

Diffractive Surface Data of Second Surface (r2)

C1 = −0.00019
C2 = −7.154 × 10⁻⁷

Diffractive Surface Data of Seventh Surface (r7)

C1 = 0.000379
C2 = 5.4451 × 10⁻⁵

TABLE 3

Construction Data of Example 3
f = 3.34~5.50~9.65
ω = 29.1~18.7~10.9(°)
FNO = 3~3.5~5.3

| Radius of Curvature | Axial Distance | Refractive Index | Abbe Number |
|---|---|---|---|
| r1* = 13.55 | | | |
| | d1 = 1.09 | N1 = 1.7725 | ν1 = 49.77 |
| r2* = 4.17 | | | |
| | d2 = 1.11 | | |
| r3* = 6.82 | | | |
| | d3 = 2.19 | N2 = 1.65446 | ν2 = 33.86 |
| r4*# = 2.30 | | | |
| | d4 = 0.65 | N3 = 1.62017 | ν3 = 24.01 |
| r5* = 4.67 | | | |
| | d5 = 6.11~2.68~0.4 | | |
| r6 = ∞{Aperture Stop (S)} | | | |
| | d6 = 0.00 | | |
| r7* = 43.18 | | | |
| | d7 = 3.26 | N4 = 1.6 | ν4 = 64.38 |
| r8*# = −2.02 | | | |
| | d8 = 0.41 | N5 = 1.5644 | ν5 = 35.1 |
| r9* = −3.70 | | | |
| | d9 = 0.61~2.87~7.22 | | |

TABLE 3-continued

Construction Data of Example 3
f = 3.34~5.50~9.65
ω = 29.1~18.7~10.9(°)
FNO = 3~3.5~5.3

| | | | |
|---|---|---|---|
| r10 = ∞ | | | |
| | d10 = 3.60 | N6 = 1.5168 | ν6 = 64.12 |
| r11 = ∞ | | | |
| | d11 = 5.88 | | |
| r12 = ∞{Image Plane (I)} | | | |

Aspherical Surface Data of First Surface (r1)

A4 = 0.009071
A6 = −0.0001235
A8 = −4.4 × $10^{-6}$

Aspherical Surface Data of Second Surface (r2)

A4 = 0.012871
A6 = 0.00211106
A8 = 9.85 × $10^{-5}$

Aspherical Surface Data of Third Surface (r3)

A4 = −0.00584
A6 = 0.00141341
A8 = −0.00014

Aspherical Surface Data of Fourth Surface (r4)

A4 = 0.036276
A6 = −0.015181
A8 = 0.002011

Aspherical Surface Data of Fifth Surface (r5)

A4 = −0.01326
A6 = 0.0018055
A8 = −0.00037

Aspherical Surface Data of Seventh Surface (r7)

A4 = −0.00695
A6 = −0.0008778
A8 = 0.000301
A10 = −0.00013

Aspherical Surface Data of Eighth Surface (r8)

A4 = −0.01369
A6 = 0.0051316
A8 = −0.00021

Aspherical Surface Data of Ninth Surface (r9)

A4 = 0.000919
A6 = −0.0003216
A8 = 3.39 × $10^{-5}$

Diffractive Surface Data of Fourth Surface (r4)

C1 = 0.003039
C2 = −0.0007736

Diffractive Surface Data of Eighth Surface (r8)

C1 = −0.00146
C2 = 0.00030703

TABLE 4

Construction Data of Example 4
f = 6.68
ω = 24.6(°)
FNO = 4.1

| Radius of Curvature | Axial Distance | Refractive Index | Abbe Number |
|---|---|---|---|
| r1 = ∞{Aperture Stop (S)} | | | |
| | d1 = 0.38 | | |
| r2 = −2.64 | | | |
| | d2 = 1.50 | N1 = 1.744 | ν1 = 44.8 |
| r3* = −2.46 | | | |
| | d3 = 2.77 | | |
| r4* = −5.13 | | | |
| | d4 = 2.00 | N2 = 1.62017 | ν2 = 24.01 |
| r5# = 17.33 | | | |
| | d5 = 2.00 | N3 = 1.6935 | ν3 = 53.2 |
| r6* = −4.29 | | | |
| | d6 = 0.10 | | |
| r7 = ∞ | | | |
| | d7 = 4.21 | N4 = 1.5168 | ν4 = 64.12 |
| r8 = ∞ | | | |
| | d8 = 4.00 | | |
| r9 = ∞{Image Plane(I)} | | | |

Aspherical Surface Data of Third Surface (r3)

A4 = 0.006759
A6 = 0.00076404
A8 = 7.49 × $10^{-5}$

Aspherical Surface Data of Fourth Surface (r4)

A4 = 0.005799
A6 = −0.0001718
A8 = −1.8 × $10^{-5}$

Aspherical Surface Data of Sixth Surface (r6)

A4 = 0.002042
A6 = 1.6469 × $10^{-6}$
A8 = 2.4 × $10^{-6}$

Diffractive Surface Data of Fifth Surface (r5)

C1 = −0.00151
C2 = 6.3854 × $10^{-5}$

TABLE 5

Construction Data of Comparison Example 1
f = 5.1~16.0~48.8
ω = 31.3~11.0~3.64(°)
FNO = 2.75~3.5~4.1

| Radius of Curvature | Axial Distance | Refractive Index | Abbe Number |
|---|---|---|---|
| r1* = 16.06 | | | |
| | d1 = 0.68 | N1 = 1.80518 | ν1 = 25.43 |
| r2 = 13.71 | | | |
| | d2 = 0.10 | | |
| r3* = 13.31 | | | |
| | d3 = 3.47 | N2 = 1.600 | ν2 = 64.38 |
| r4*# = 404.00 | | | |
| | d4 = 0.05 | N3 = 1.5644 | ν3 = 35.1 |
| r5* = 404.00 | | | |
| | d5 = 0.2997~7.6707~11.50614 | | |
| r6* = 12.89 | | | |
| | d6 = 0.66 | N4 = 1.58913 | ν4 = 61.11 |
| r7* = 3.78 | | | |
| | d1 = 2.90 | | |
| r8* = −28.23 | | | |
| | d8 = 0.05 | N5 = 1.62017 | ν5 = 24.01 |
| r9*# = −28.23 | | | |
| | d9 = 2.24 | N6 = 1.65446 | ν6 = 33.86 |
| r10* = 65.12 | | | |
| | d10 = 17.61083~7.973~0.5 | | |
| r11 = ∞{Aperture Stop (S)} | | | |
| | d11 = 0.10 | | |
| r12* = 5.48 | | | |
| | d12 = 2.50 | N7 = 1.600 | ν7 = 64.38 |
| r13*# = 31.40 | | | |
| | d13 = 0.05 | N8 = 1.5644 | ν8 = 35.1 |

TABLE 5-continued

Construction Data of Comparison Example 1
f = 5.1~16.0~48.8
ω = 31.3~11.0~3.64(°)
FNO = 2.75~3.5~4.1 r14* = −31.40
            d14 = 0.28
r15* = −39.72
            d15 = 3.73     N9 = 1.7495    ν9 = 35.17
r16* = 36.21
            d16 = 6.340415~10.06~16.875505
r17 = ∞
            d17 = 3.40     N10 = 1.5168   ν10 = 64.12
r18 = ∞
            d18 = 1.70
r19 = ∞{Image Plane (I)}

Aspherical Surface Data of First Surface (r1)

$A4 = -5.5 \times 10^{-6}$
$A6 = 2.1002 \times 10^{-7}$
$A8 = 2.7 \times 10^{-9}$ Aspherical Surface Data of Third Surface (r3)

$A4 = -1.4 \times 10^{-6}$
$A6 = -6.535 \times 10^{-7}$
$A8 = 5.81 \times 10^{-9}$
$A10 = -1.2 \times 10^{-11}$ Aspherical Surface Data of Fourth Surface (r4)

$A4 = -2.9 \times 10^{-6}$
$A6 = -3.052 \times 10^{-7}$
$A8 = 2.75 \times 10^{-9}$
$A10 = -1.3 \times 10^{-11}$ Aspherical Surface Data of Fifth Surface (r5)

$A4 = -2.9 \times 10^{-6}$
$A6 = -3.052 \times 10^{-7}$
$A8 = 2.75 \times 10^{-9}$
$A10 = -1.3 \times 10^{-11}$ Aspherical Surface Data of Sixth Surface (r6)

$A4 = 0.001166$
$A6 = -0.0001044$
$A8 = 3.19 \times 10^{-6}$
$A10 = -3.6 \times 10^{-8}$ Aspherical Surface Data of Seventh Surface (r7)

$A4 = 0.00122$
$A6 = -0.0001005$
$A8 = 1.02 \times 10^{-6}$
$A10 = -1.5 \times 10^{-7}$ Aspherical Surface Data of Eighth Surface (r8)

$A4 = -0.00184$
$A6 = 9.1967 \times 10^{-5}$
$A8 = -2.4 \times 10^{-6}$
$A10 = -7.5 \times 10^{-8}$ Aspherical Surface Data of Ninth Surface (r9)

$A4 = -0.00184$
$A6 = 9.1967 \times 10^{-5}$
$A8 = -2.4 \times 10^{-6}$
$A10 = -7.5 \times 10^{-8}$ Aspherical Surface Data of Tenth Surface (r10)

$A4 = -0.00193$
$A6 = 7.4375 \times 10^{-5}$
$A8 = -3.6 \times 10^{-6}$

Aspherical Surface Data of Twelfth Surface (r12)

$A4 = -6 \times 10^{-5}$
$A6 = -8.051 \times 10^{-6}$
$A8 = 1.92 \times 10^{-7}$
$A10 = 1.27 \times 10^{-8}$ Aspherical Surface Data of Thirteenth Surface (r13)

$A4 = 0.000484$
$A6 = -4.434 \times 10^{-5}$

TABLE 5-continued

Construction Data of Comparison Example 1
f = 5.1~16.0~48.8
ω = 31.3~11.0~3.64(°)
FNO = 2.75~3.5~4.1

$A8 = -1.8 \times 10^{-6}$
$A10 = 6.09 \times 10^{-8}$

Aspherical Surface Data of Fourteenth Surface (r14)

$A4 = 0.000484$
$A6 = 0 -4.434 \times 10^{-5}$
$A8 = -1.8 \times 10^{-6}$
$A10 = 6.09 \times 10^{-8}$ Aspherical Surface Data of Fifteenth Surface (r15)

$A4 = 0.000242$
$A6 = -2.076 \times 10^{-5}$
$A8 = -3.3 \times 10^{-6}$

Aspherical Surface Data of Sixteenth Surface (r16)

$A4 = 0.001559$
$A6 = 5.5353 \times 10^{-5}$
$A8 = 2.83 \times 10^{-6}$

Diffractive Surface Data of Fourth Surface (r4)

$C1 = -0.0009$
$C2 = 1.8993 \times 10^{-6}$

Diffractive Surface Data of Ninth Surface (r9)

$C1 = 0.005716$
$C2 = 2.475 \times 10^{-5}$

Diffractive Surface Data of Thirteenth Surface (r13)

$C1 = -0.00269$
$C2 = 5.7229 \times 10^{-5}$

TABLE 6

| Example | Unit | Diffractive Lens | h0 (μm) | dmin (μm) | Blaze Vertex Angle Θ(°) at dmin |
|---|---|---|---|---|---|
| 1 | Gr1 | L2DOE | 15.2 | 108 | 82 |
|   | Gr2 | L4DOE | 6.3 | 69 | 85 |
|   | Gr3 | L5DOE | 15.2 | 117 | 83 |
| 2 | Gr1 | L1DOE | 16.5 | 147 | 84 |
|   | Gr2 | L3DOE | 17.1 | 83 | 78 |
| 3 | Gr1 | L2DOE | 17.1 | 177 | 84 |
|   | Gr2 | L3DOE | 16.5 | 917 | 89 |
| 4 | Gr1 | L2DOE | 7.9 | 243 | 88 |
| Comparison Example 1 | Gr1 | L2DOE | 16.5 | 36 | 65 |
|   | Gr2 | L4DOE | 17.1 | 10 | 30 |
|   | Gr3 | L5DOE | 16.5 | 32 | 63 |

TABLE 7

| Example | Unit | Lens | φp or φDOE | φp/νd or φDOE/νDOE | Value of Condition (1): (φp/νd)/(φDOE/νDOE) |
|---|---|---|---|---|---|
| 1 | Gr1 | L2DOE | 0.00091116 | −0.0002641 | 0.15 |
|  |  | L2p | −0.0013648 | −3.888 × 10⁻⁵ |  |
|  | Gr2 | L4p | 0.02388635 | 0.00099485 | 0.63 |
|  |  | L4DOE | −0.005462 | 0.00158319 |  |
|  | Gr3 | L5DOE | 0.0033754 | −0.0009784 | 0.66 |
|  |  | L5p | −0.022576 | −0.0006432 |  |
| 2 | Gr1 | L1p | −0.0333112 | −0.000949 | 8.70 |
|  |  | L1DOE | 0.00037642 | −0.0001091 |  |
|  | Gr2 | L3p | 0.16285393 | 0.00678275 | 30.84 |
|  |  | L3DOE | −0.0007588 | 0.00021994 |  |
| 3 | Gr1 | L2DOE | −0.0060784 | 0.00176186 | 3.57 |
|  |  | L2p | 0.15097448 | 0.00628798 |  |
|  | Gr2 | L3DOE | 0.0029188 | −0.000846 | 3.89 |
|  |  | L3p | −0.0007588 | −0.0032921 |  |
| 4 | Gr1 | L2p | −0.1619081 | −0.0067434 | 7.70 |
|  |  | L2DOE | 0.0030216 | −0.0008758 |  |
| Comparison Example1 | Gr1 | L2DOE | 0.00180948 | −0.0005245 | 0 |
|  |  | L2p | 0 | 0 |  |
|  | Gr2 | L4p | 0 | 0 | 0 |
|  |  | L4DOE | −0.011432 | 0.00331362 |  |
|  | Gr3 | L5DOE | 0.0053898 | −0.0015623 | 0 |
|  |  | L5p | 0 | 0 |  |

TABLE 8

| Example | Unit | Lens | Axial Distance | Value of Condition (2): tp/tg |
|---|---|---|---|---|
| 1 | Gr1 | L2g | 2.99 | 0.11 |
|  |  | L2p | 0.34 |  |
|  | Gr2 | L4p | 0.69 | 1.38 |
|  |  | L4g | 0.5 |  |
|  | Gr3 | L5g | 2.99 | 0.18 |
|  |  | L5p | 0.53 |  |
| 2 | Gr1 | L1p | 0.3 | 0.06 |
|  |  | L1g | 5.08 |  |
|  | Gr2 | L3p | 2.14 | 4.28 |
|  |  | L3g | 0.5 |  |
| 3 | Gr1 | L2g | 2.19 | 0.30 |
|  |  | L2p | 0.65 |  |
|  | Gr2 | L3g | 3.26 | 0.13 |
|  |  | L3p | 0.41 |  |
| 4 | Gr1 | L2p | 2.00 | 1.00 |
|  |  | L2g | 2.00 |  |
| Comparison Example 1 | Gr1 | L2g | 3.47 | 0.01 |
|  |  | L2p | 0.05 |  |
|  | Gr2 | L4p | 0.05 | 0.02 |
|  |  | L4g | 2.24 |  |
|  | Gr3 | L5g | 2.5 | 0.02 |
|  |  | L5p | 0.05 |  |

TABLE 9

Construction Data of Example 5
f = 4.1~6.9~11.75
ω = 39.1~24.2~14.8(°)
FNO = 4.1~4.1~4.1

| Radius of Curvature | Axial Distance | Refractive Index | Abbe Number |
|---|---|---|---|
| r1* = −199.087 |  |  |  |
|  | d1 = 0.20 | N1 = 1.62 | ν1 = 60.3 |
| r2 = 6.18 |  |  |  |
|  | d2 = 0.82 |  |  |
| r3 = 6.66 |  |  |  |
|  | d3 = 1.37 | N2 = 1.755 | ν2 = 27.6 |
| r4 = 8.70 |  |  |  |
|  | d4 = 15.0~5.9~0.3 |  |  |

TABLE 9-continued

Construction Data of Example 5
f = 4.1~6.9~11.75
ω = 39.1~24.2~14.8(°)
FNO = 4.1~4.1~4.1

| Radius of Curvature | Axial Distance | Refractive Index | Abbe Number |
|---|---|---|---|
| r5* = 10.46 |  |  |  |
|  | d5 = 3.72 | N3 = 1.5 | ν3 = 69 |
| r6# = −4.01 |  |  |  |
|  | d6 = 1.27 | N4 = 1.741 | ν4 = 28.6 |
| r7* = −5.96 |  |  |  |
|  | d7 = 0.1~2.7~7.3 |  |  |
| r8 = ∞(S) |  |  |  |
|  | d8 = 0.10 |  |  |
| r9 = 1.94 |  |  |  |
|  | d9 = 0.30 | N5 = 1.746 | ν5 = 39.4 |
| r10 = 2.09 |  |  |  |
|  | d10 = 2.37 |  |  |
| r11* = −1.85 |  |  |  |
|  | d11 = 1.01 | N6 = 1.755 | ν6 = 27.6 |
| r12* = −3.83 |  |  |  |
|  | d12 = 0.17 |  |  |
| r13* = 4.89 |  |  |  |
|  | d13 = 1.79 | N7 = 1.487 | ν7 = 70.4 |
| r14* = −10.78 |  |  |  |
|  | d14 = 0.10 |  |  |
| r15 = ∞ |  |  |  |
|  | d15 = 3.40 | N8 = 1.517 | ν8 = 64.1 |
| r16 = ∞ |  |  |  |
|  | d16 = 2.40 |  |  |
| r17 = ∞(I) |  |  |  |

Aspherical Surface Data of First Surface (r1)

$A = 2.33 \times 10^{-4}$, $B = -1.80 \times 10^{-6}$, $C = 1.66 \times 10^{-8}$ Aspherical Surface Data of Fifth Surface (r5)

$A = -7.21 \times 10^{-4}$, $B = 1.77 \times 10^{-5}$, $C = -5.35 \times 10^{-7}$ Aspherical Surface Data of Seventh Surface (r7)

$A = 6.72 \times 10^{-5}$, $B = -7.66 \times 10^{-6}$, $C = -7.23 \times 10^{-9}$ Aspherical Surface Data of Eleventh Surface (r11)

$A = 5.01 \times 10^{-2}$, $B = 1.22 \times 10^{-3}$, $C = -2.03 \times 10^{-3}$ Aspherical Surface Data of Twelfth Surface (r12)

$A = 2.24 \times 10^{-2}$, $B = 2.35 \times 10^{-3}$, $C = -5.63 \times 10^{-4}$

TABLE 9-continued

Construction Data of Example 5
f = 4.1~6.9~11.75
ω = 39.1~24.2~14.8(°)
FNO = 4.1~4.1~4.1

Aspherical Surface Data of Thirteenth Surface (r13)

$A = -1.24 \times 10^{-2}$, $B = 1.51 \times 10^{-3}$, $C = -8.17 \times 10^{-5}$
Aspherical Surface Data of Fourteenth Surface (r14)

$A = -8.52 \times 10^{-3}$, $B = -1.82 \times 10^{-4}$, $C = 3.67 \times 10^{-5}$
Diffractive Surface Data of Sixth Surface (r6)

$C1 = -6.82 \times 10^{-4}$, $C2 = 3.33 \times 10^{-5}$
Values corresponding to Conditions Condition(3): φdoe/φgr2 = 0.013
Condition(4): tW/fW = 0.20
Condition(5): tT/fT = 0.68
Condition(6) (At Wide-angle End [W] and Telephoto
End [T]):|Y'max/PZ| = 0.27

TABLE 10

Construction Data of Comparison Example 2
f = 4.1~6.9~11.75
ω =39.3~24.2~14.8(°)
FNO = 4.1~4.1~4.1

| Radius of Curvature | Axial Distance | Refractive Index | Abbe Number |
|---|---|---|---|
| r1* = 1227.278 | | | |
| | d1 = 1.40 | N1 = 1.773 | ν1 = 49.8 |
| r2 = 6.46 | | | |
| | d2 = 0.81 | | |
| r3 = 7.13 | | | |
| | d3 = 2.51 | N2 = 1.799 | ν2 = 22.6 |
| r4 = 9.68 | | | |
| | d4 = 13.4~5.6~0.9 | | |
| r5* = 9.38 | | | |
| | d5 = 4.13 | N3 = 1.511 | ν3 = 69.4 |
| r6 = −4.30 | | | |
| | d6 = 1.60 | N4 = 1.843 | ν4 = 23.7 |
| r7* = −6.28 | | | |
| | d7 = 0.5~3.6~9.1 | | |
| r8 = ∞(S) | | | |
| | d8 = 0.10 | | |
| r9 = 2.33 | | | |
| | d9 = 0.98 | N5 = 1.646 | ν5 = 31.9 |
| r10 = 1.92 | | | |
| | d10 = 1.79 | | |
| r11* = −2.33 | | | |
| | d11 = 0.65 | N6 = 1.799 | ν6 = 22.6 |
| r12* = −3.97 | | | |
| | d12 = 0.10 | | |
| r13* = 7.65 | | | |
| | d13 = 2.39 | N7 = 1.530 | ν7 = 67.6 |
| r14* = −5.94 | | | |
| | d14 = 0.30 | | |
| r15 = ∞ | | | |
| | d15 = 3.40 | N8 = 1.517 | ν8 = 64.1 |
| r16 = ∞ | | | |
| | d16 = 2.40 | | |
| r17 = ∞(I) | | | |

Aspherical Surface Data of First Surface (r1)

$A = 1.87 \times 10^{-4}$, $B = -1.25 \times 10^{-6}$, $C = 9.52 \times 10^{-9}$
Aspherical Surface Data of Fifth Surface (r5)

$A = 6.17 \times 10^{-4}$, $B = -1.66 \times 10^{-5}$, $C = -1.47 \times 10^{-7}$
Aspherical Surface Data of Seventh Surface (r7)

$A = 1.11 \times 10^{-4}$, $B = -5.37 \times 10^{-6}$, $C = 9.83 \times 10^{-8}$

TABLE 10-continued

Construction Data of Comparison Example 2
f = 4.1~6.9~11.75
ω =39.3~24.2~14.8(°)
FNO = 4.1~4.1~4.1

Aspherical Surface Data of Eleventh Surface (r11)

$A = 3.86 \times 10^{-2}$, $B = 1.82 \times 10^{-3}$, $C = -1.78 \times 10^{-3}$
Aspherical Surface Data of Twelfth Surface (r12)

$A = 2.31 \times 10^{-2}$, $B = 2.86 \times 10^{-3}$, $C = -8.77 \times 10^{-4}$
Aspherical Surface Data of Thirteenth Surface (r13)

$A = -7.05 \times 10^{-3}$, $B = 1.65 \times 10^{-3}$, $C = -1.35 \times 10^{-4}$
Aspherical Surface Data of Fourteenth Surface (r14)

$A = -4.00 \times 10^{-3}$, $B = -3.30 \times 10^{-4}$, $C = 3.88 \times 10^{-5}$

TABLE 11

Chromatic Aberration Coefficients in Comparison Example 2
(having no diffractive lens element)

| | | | Whole | First unit | Second unit | Third unit |
|---|---|---|---|---|---|---|
| Chromatic | W | LC | 13 | −8 | 25 | −4 |
| Aberration | | TC | 32 | 28 | 15 | −10 |
| Coefficients | T | LC | 1 | −8 | 10 | 0 |
| | | TC | −15 | 75 | −80 | −10 |

TABLE 12

Chromatic Aberration Coefficients in Example 5
(having diffractive lens element in Second Lens Unit)

| | | | Whole | Second unit | | Third unit |
|---|---|---|---|---|---|---|
| | | | | First unit Whole | Diffractive Lens Element | |
| Chromatic | W | LC | 9 | −5 | 14 | −17 | 0 |
| Aberration | | TC | 32 | 29 | 9 | 3 | −6 |
| Coefficients | T | LC | 0 | −5 | 5 | −5 | 0 |
| | | TC | 3 | 47 | −37 | 44 | −6 |

TABLE 13

Data on Glass Material

| Glass Material | nd | νd |
|---|---|---|
| Low Refractive Index/Low Dispersion | 1.5 | 60 |
| High Refractive Index/High Dispersion | 1.8 | 30 |
| Diffractive Lens Surface | ∞ | −3.45 |

TABLE 14

Aberration Coefficients of Models (a) to (c)

| Lens Position | Aberration Coefficients | (a) | (b) | (c) Low Refractive Index/ Low Dispersion | (c) High Refractive Index/ High Dispersion |
|---|---|---|---|---|---|
| Without Regard to Position | PT | 0.778 | 0.759 | 0.63 | 0.498 |
| Front side of Aperture Stop | AS | 1.964 | 1.027 | 1.601 | 1.333 |
| Aperture Position | AS | 1 | 1 | 1 | 1 |

TABLE 15

Aberration Coefficients in Comparison Example 2 and Example 5

| | | | Whole | First Unit | Second Unit | Third Unit |
|---|---|---|---|---|---|---|
| Comparison Example 2 | W | AS | 39 | 629 | 258 | −848 |
| | T | AS | 401 | 433 | 815 | −848 |
| | | PT | 201 | −514 | 821 | −107 |
| Example 5 | W | AS | −80 | 624 | 435 | −1139 |
| | T | AS | 282 | 834 | 586 | −1131 |
| | | PT | 245 | −487 | 803 | −71 |

TABLE 16

Construction Data of Example 6
f = 5.2~12.2~29.4
ω = 30.9~14.2~6.0 (°)
FNO = 2.75~3.5~4.1

| Radius of Curvature | Axial Distance | Refractive Index | Abbe Number |
|---|---|---|---|
| r1* = 9.99 | | | |
| | d1 = 0.28 | N1 = 1.755 | ν1 = 27.6 |
| r2* = 6.17 | | | |
| | d2 = 2.41 | N2 = 1.667 | ν2 = 52.6 |
| r3* = 59.98 | | | |
| | d3 = 0.3~2.8~5.9 | | |
| r4* = 23.81 | | | |
| | d4 = 0.28 | N3 = 1.72 | ν3 = 50.3 |
| r5* = 3.63 | | | |
| | d5 = 2.15 | | |
| r6* = 19.99 | | | |
| | d6 = 1.56 | N4 = 1.805 | ν4 = 25.4 |
| r7 = −4.72 | | | |
| | d7 = 0.28 | N5 = 1.75 | ν5 = 35.2 |
| r8* = 12.50 | | | |
| | d8 = 12.8~5.1~0.1 | | |
| r9 = ∞ (S) | | | |
| | d9 = 0.10 | | |
| r10* = 5.63 | | | |
| | d10 = 2.97 | N6 = 1.713 | ν6 = 53.9 |
| r11*# = −8.33 | | | |
| | d11 = 0.10 | | |
| r12* = −6.42 | | | |
| | d12 = 1.34 | N7 = 1.805 | ν7 = 25.4 |
| r13* = −27.54 | | | |
| | d13 = 6.53~10.3~14.6 | | |
| r14 = ∞ | | | |
| | d14 = 3.40 | N8 = 1.517 | ν8 = 64.1 |
| r15 = ∞ | | | |
| | d15 = 1.42 | | |
| r16 = ∞ (I) | | | |

Aspherical Surface Data of First Surface (r1)
A = −1.14 × 10$^{-4}$, B = 3.31 × 10$^{-6}$,
C = −1.21 × 10$^{-7}$, D = 2.55 × 10$^{-9}$

TABLE 16-continued

Construction Data of Example 6
f = 5.2~12.2~29.4
ω = 30.9~14.2~6.0 (°)
FNO = 2.75~3.5~4.1

Aspherical Surface Data of Second Surface (r2)
A = −8.21 × 10$^{-4}$, B = 3.13 × 10$^{-5}$,
C = −1.58 × 10$^{-6}$, D = 2.13 × 10$^{-8}$
Aspherical Surface Data of Third Surface (r3)
A = −5.33 × 10$^{-6}$, B = −1.34 × 10$^{-7}$,
C = 6.52 × 10$^{-8}$, D = −2.45 × 10$^{-10}$
Aspherical Surface Data of Fourth Surface (r4)
A = −1.90 × 10$^{-4}$, B = 2.79 × 10$^{-6}$,
C = 1.01 × 10$^{-6}$, D = −2.38 × 10$^{-8}$
Aspherical Surface Data of Fifth Surface (r5)
A = −1.93 × 10$^{-3}$, B = −2.31 × 10$^{-5}$,
C = −3.04 × 10$^{-6}$, D = −1.01 × 10$^{-7}$
Aspherical Surface Data of Sixth Surface (r6)
A = −3.98 × 10$^{-3}$, B = 7.53 × 10$^{-5}$,
C = −2.21 × 10$^{-6}$, D = −2.84 × 10$^{-8}$
Aspherical Surface Data of Eighth Surface (r8)
A = −4.40 × 10$^{-3}$, B = 1.48 × 10$^{-4}$,
C = −5.67 × 10$^{-6}$
Aspherical Surface Data of Tenth Surface (r10)
A = −7.81 × 10$^{-4}$, B = −5.46 × 10$^{-5}$,
C = −7.39 × 10$^{-6}$, D = −4.74 × 10$^{-7}$
Aspherical Surface Data of Eleventh Surface (r11)
A = −1.99 × 10$^{-3}$, B = −1.56 × 10$^{-4}$,
C = −1.40 × 10$^{-5}$, D = 7.32 × 10$^{-7}$
Aspherical Surface Data of Twelfth Surface (r12)
A = 8.10 × 10$^{-3}$, B = −2.30 × 10$^{-4}$,
C = 4.00 × 10$^{-6}$
Aspherical Surface Data of Thirteenth Surface (r13)
A = 6.58 × 10$^{-3}$, B = 6.09 × 10$^{-5}$,
C = 1.33 × 10$^{-5}$
Diffractive Surface Data of Eleventh Surface (r11)
C1 = −1.28 × 10$^{-3}$, C2 = 3.05 × 10$^{-5}$
Values corresponding to Conditions
Condition (7): φdoe/φgr3 = 0.021
Condition (8): tW/fW = 0.35
Condition (9) (At Wide-angle End [W]): |Y'max/PZ| = 0.24
Condition (9) (At Telephoto End [T]): |Y'max/PZ| = 0.15

TABLE 17

Construction Data of Comparison Example 3
f = 5.2~12.2~29.4
ω = 31.0~14.2~6.0 (°)
FNO = 2.75~3.5~4.1

| Radius of Curvature | Axial Distance | Refractive Index | Abbe Number |
|---|---|---|---|
| r1* = 12.39 | | | |
| | d1 = 0.28 | N1 = 1.697 | ν1 = 30.4 |
| r2* = 5.94 | | | |
| | d2 = 2.91 | N2 = 1.675 | ν2 = 51.5 |
| r3* = 109.43 | | | |
| | d3 = 0.3~3.2~6.7 | | |
| r4* = 158.75 | | | |
| | d4 = 0.28 | N3 = 1.72 | ν3 = 50.3 |
| r5* = 4.24 | | | |
| | d5 = 1.98 | | |
| r6* = 21.94 | | | |
| | d6 = 1.58 | N4 = 1.805 | ν4 = 25.4 |
| r7 = −4.79 | | | |
| | d7 = 0.28 | N5 = 1.75 | ν5 = 35.2 |
| r8* = 15.57 | | | |
| | d8 = 13.9~5.4~0.1 | | |
| r9 = ∞ (S) | | | |
| | d9 = 0.10 | | |
| r10* = 5.92 | | | |
| | d10 = 3.39 | N6 = 1.713 | ν6 = 53.9 |
| r11* = −5.99 | | | |
| | d11 = 0.10 | | |

TABLE 17-continued

Construction Data of Comparison Example 3
f = 5.2~12.2~29.4
ω = 31.0~14.2~6.0 (°)
FNO = 2.75~3.5~4.1 r12* = −5.70
  d12 = 1.65    N7 = 1.805    ν7 = 25.4
r13* = −50.19
  d13 = 6.58~10.2~14.3
r14 = ∞
  d14 = 3.40    N8 = 1.517    ν8 = 64.1
r15 = ∞
  d15 = 1.00
r16 = ∞ (I)

Aspherical Surface Data of First Surface (r1)
A = −5.36 × $10^{-6}$, B = 1.43 × $10^{-6}$,
C = −2.28 × $10^{-8}$, D = 7.88 × $10^{-10}$
Aspherical Surface Data of Second Surface (r2)
A = −1.26 × $10^{-3}$, B = 6.23 × $10^{-5}$,
C = −2.44 × $10^{-6}$, D = 2.46 × $10^{-8}$
Aspherical Surface Data of Third Surface (r3)
A = 8.05 × $10^{-5}$, B = −1.51 × $10^{-6}$,
C = 1.16 × $10^{-7}$, D = −1.19 × $10^{-9}$
Aspherical Surface Data of Fourth Surface (r4)
A = 7.22 × $10^{-4}$, B = 9.51 × $10^{-6}$,
C = −1.11 × $10^{-6}$, D = 1.62 × $10^{-8}$
Aspherical Surface Data of Fifth Surface (r5)
A = −1.01 × $10^{-3}$, B = 1.17 × $10^{-4}$,
C = −3.54 × $10^{-6}$, D = 4.70 × $10^{-7}$
Aspherical Surface Data of Sixth Surface (r6)
A = −4.04 × $10^{-3}$, B = 7.04 × $10^{-5}$,
C = 4.41 × $10^{-6}$, D = −3.40 × $10^{-7}$
Aspherical Surface Data of Eighth Surface (r8)
A = −4.01 × $10^{-3}$, B = 1.34 × $10^{-4}$,
C = −5.00 × $10^{-6}$
Aspherical Surface Data of Tenth Surface (r10)
A = −8.75 × $10^{-4}$, B = −5.15 × $10^{-5}$,
C = −4.27 × $10^{-6}$, D = −5.78 × $10^{-7}$
Aspherical Surface Data of Eleventh Surface (r11)
A = 2.32 × $10^{-3}$, B = −9.64 × $10^{-5}$,
C = −1.10 × $10^{-5}$, D = 6.38 × $10^{-7}$
Aspherical Surface Data of Twelfth Surface (r12)
A = 6.91 × $10^{-3}$, B = −2.33 × $10^{-4}$,
C = 1.10 × $10^{-5}$
Aspherical Surface Data of Thirteenth Surface (r13)
A = 5.28 × $10^{-3}$, B = −2.64 × $10^{-5}$,
C = 1.67 × $10^{-5}$

TABLE 18

Chromatic Aberration Coefficients in Comparison Example 3
(having no diffractive lens element)

|  |  |  | Whole | First unit | Second unit | Third unit |
|---|---|---|---|---|---|---|
| Chromatic | W | LC | 12 | 1 | 0 | 15 |
| Aberration |  | TC | 32 | −6 | 48 | −19 |
| Coefficients | T | LC | 0 | 1 | −1 | 0 |
|  |  | TC | 16 | −17 | 58 | −31 |

TABLE 19

Chromatic Aberration Coefficients in Example 6
(having diffractive lens element in Third Lens Unit)

|  |  |  | Whole | First unit | Second unit | Third unit Whole | Diffractive Lens Element |
|---|---|---|---|---|---|---|---|
| Chromatic | W | LC | 2 | 2 | −2 | 6 | −33 |
| Aberration |  | TC | 33 | −18 | 61 | −19 | −12 |

TABLE 19-continued

Chromatic Aberration Coefficients in Example 6
(having diffractive lens element in Third Lens Unit)

|  |  |  | Whole | First unit | Second unit | Third unit Whole | Diffractive Lens Element |
|---|---|---|---|---|---|---|---|
| Coefficients | T | LC | 0 | 2 | −2 | 0 | −3 |
|  |  | TC | 0 | −39 | 63 | −30 | −12 |

TABLE 20

Data on Glass Material

| Glass Material | nd | νd |
|---|---|---|
| Low Refractive Index/Low Dispersion | 1.5 | 60 |
| High Refractive Index/High Dispersion | 1.8 | 30 |
| Diffractive Lens Surface | ∞ | −3.45 |

TABLE 21

Aberration Coefficients of Models (a) to (c)

|  |  |  |  | (c) | |
|---|---|---|---|---|---|
| Lens Position | Aberration Coefficients | (a) | (b) | Low Refractive Index/ Low Dispersion | High Refractive Index/ High Dispersion |
| Without Regard to Position | PT | 0.778 | 0.759 | 0.63 | 0.498 |
| Aperture Position | AS | 1 | 1 | 1 | 1 |
| Behind Aperture Stop | AS | 0.036 | 0.973 | 1.366 | 1.138 |

TABLE 22

Aberration Coefficients in Comparison Example 3 and Example 6

|  |  |  | Whole | First Unit | Second Unit | Third Unit |
|---|---|---|---|---|---|---|
| Comparison Example 3 | W | AS | 554 | 512 | −76 | 194 |
|  | T | AS | 79 | 658 | −531 | −18 |
|  |  | PT | −5 | 282 | −991 | 705 |
| Example 6 | W | AS | 537 | 359 | −81 | 335 |
|  | T | AS | 79 | 344 | −405 | 169 |
|  |  | PT | −33 | 315 | −1055 | 707 |

TABLE 23

Construction Data of Example 7
f = 5.1~12.0~29.4
ω = 33.2~14.5~6.0 (°)
FNO = 2.96~3.4~4.1

| Radius of Curvature | Axial Distance | Refractive Index | Abbe Number |
|---|---|---|---|
| r1 = 77.00 |  |  |  |
|  | d1 = 0.24 | N1 = 1.833 | ν1 = 21 |
| r2 = 20.26 |  |  |  |
|  | d2 = 1.60 | N2 = 1.732 | ν2 = 45.7 |
| r3 = −75.04 |  |  |  |
|  | d3 = 0.10 |  |  |

TABLE 23-continued

Construction Data of Example 7
f = 5.1~12.0~29.4
ω = 33.2~14.5~6.0 (°)
FNO = 2.96~3.4~4.1

| | | | |
|---|---|---|---|
| r4 = 13.38 | | | |
| | d4 = 1.07 | N3 = 1.686 | ν3 = 50.2 |
| r5 = 28.58 | | | |
| | d5 = 0.5~5.8~9.9 | | |
| r6* = 44.71 | | | |
| | d6 = 0.24 | N4 = 1.773 | ν4 = 49.8 |
| r7* = 6.12 | | | |
| | d7 = 2.33 | | |
| r8 = −8.83 | | | |
| | d8 = 0.24 | N5 = 1.773 | ν5 = 49.8 |
| r9 = 9.66 | | | |
| | d9 = 0.01 | N6 = 1.514 | ν6 = 57 |
| r10 = 9.66 | | | |
| | d10 = 0.76 | N7 = 1.833 | ν7 = 21 |
| r11 = −41.63 | | | |
| | d11 = 9.9~4.6~0.5 | | |
| r12 = ∞ (S) | | | |
| | d12 = 0.50 | | |
| r13 = 8.33 | | | |
| | d13 = 0.57 | N8 = 1.694 | ν8 = 53.2 |
| r14# = 109.14 | | | |
| | d14 = 0.24 | N9 = 1.62 | ν9 = 24 |
| r15* = 15.20 | | | |
| | d15 = 5.1~2.7~0.1 | | |
| r16 = 5.65 | | | |
| | d16 = 4.16 | N10 = 1.676 | ν10 = 50.6 |
| r17 = −13.61 | | | |
| | d17 = 0.10 | | |
| r18* = −29.14 | | | |
| | d18 = 0.51 | N11 = 1.847 | ν11 = 23.8 |
| r19* = 11.83 | | | |
| | d19 = 1~3.4~6.0 | | |
| r20 = ∞ | | | |
| | d20 = 3.40 | N12 = 1.517 | ν12 = 64.1 |
| r21 = ∞ | | | |
| | d21 = 4.97 | | |
| r22 = ∞ (I) | | | |

Aspherical Surface Data of Sixth Surface (r6)
A = 1.98 × 10$^{-4}$, B = 2.18 × 10$^{-5}$,
C = −5.66 × 10$^{-7}$
Aspherical Surface Data of Seventh Surface (r7)
A = 9.23 × 10$^{-5}$, B = 2.98 × 10$^{-5}$,
C = 1.83 × 10$^{-6}$
Aspherical Surface Data of Fifteenth Surface (r15)
A = 1.59 × 10$^{-4}$, B = 3.82 × 10$^{-5}$,
C = −8.18 × 10$^{-6}$, D = 6.25 × 10$^{-7}$
Aspherical Surface Data of Eighteenth Surface (r18)
A = 1.60 × 10$^{-3}$, B = −1.84 × 10$^{-4}$,
C = 2.09 × 10$^{-6}$
Aspherical Surface Data of Nineteenth Surface (r19)
A = 4.01 × 10$^{-3}$, B = −7.71 × 10$^{-5}$,
C = 4.53 × 10$^{-6}$
Diffractive Surface Data of Fourteenth Surface (r14)
C1 = −9.46 × 10$^{-4}$, C2 = 2.73 × 10$^{-5}$
Values corresponding to Conditions
Condition (10): φdoe/φgr3 = 0.042
Condition (11): tW/fW = 0.16
Condition (12) (At Wide-angle End [W]): |Y'max/PZ| = 0.18
Condition (12) (At Telephoto End [T]): |Y'max/PZ| = 0.19

TABLE 24

Construction Data of Example 8
f = 5.1~12.0~29.4
ω = 33.2~14.5~6.0 (°)
FNO = 2.96~3.4~4.1

| Radius of Curvature | Axial Distance | Refractive Index | Abbe Number |
|---|---|---|---|
| r1 = 15.40 | | | |
| | d1 = 0.25 | N1 = 1.833 | ν1 = 21 |
| r2 = 9.27 | | | |
| | d2 = 0.10 | | |
| r3* = 7.69 | | | |
| | d3 = 1.92 | N2 = 1.668 | ν2 = 52.4 |
| r4 = −66.59 | | | |
| | d4 = 0.5~4.0~6.5 | | |
| r5 = 25.06 | | | |
| | d5 = 0.25 | N3 = 1.773 | ν3 = 49.8 |
| r6* = 4.41 | | | |
| | d6 = 1.66 | | |
| r7* = −17.55 | | | |
| | d7 = 0.25 | N4 = 1.694 | ν4 = 53.2 |
| r8# = 4.56 | | | |
| | d8 = 0.74 | N5 = 1.62 | ν5 = 24 |
| r9 = 27.33 | | | |
| | d9 = 6.5~3.0~0.5 | | |
| r10 = ∞ (S) | | | |
| | d10 = 0.10 | | |
| r11* = 8.36 | | | |
| | d11 = 0.53 | N6 = 1.694 | ν6 = 53.2 |
| r12# = 25.60 | | | |
| | d12 = 0.25 | N7 = 1.62 | ν7 = 24 |
| r13* = 26.12 | | | |
| | d13 = 6.1~3.4~0.1 | | |
| r14* = 4.52 | | | |
| | d14 = 2.20 | N8 = 1.452 | ν8 = 52.2 |
| r15 = −20.82 | | | |
| | d15 = 0.10 | | |
| r16* = 53.02 | | | |
| | d16 = 1.22 | N9 = 1.847 | ν9 = 23.8 |
| r17* = 7.82 | | | |
| | d17 = 1~3.7~7.0 | | |
| r18 = ∞ | | | |
| | d18 = 3.40 | N10 = 1.517 | ν10 = 64.1 |
| r19 = ∞ | | | |
| | d19 = 4.91 | | |
| r20 = ∞ (I) | | | |

Aspherical Surface Data of Third Surface (r3)
A = −1.25 × 10$^{-4}$, B = −1.06 × 10$^{-6}$,
C = −4.87 × 10$^{-8}$
Aspherical Surface Data of Sixth Surface (r6)
A = −3.28 × 10$^{-4}$, B = 6.87 × 10$^{-5}$,
C = −4.27 × 10$^{-6}$
Aspherical Surface Data of Seventh Surface (r7)
A = −4.26 × 10$^{-3}$, B = 2.75 × 10$^{-4}$,
C = −2.03 × 10$^{-5}$
Aspherical Surface Data of Eleventh Surface (r11)
A = 8.72 × 10$^{-4}$, B = −1.08 × 10$^{-4}$,
C = 2.32 × 10$^{-5}$
Aspherical Surface Data of Thirteenth Surface (r13)
A = 1.24 × 10$^{-3}$, B = −7.98 × 10$^{-5}$,
C = 1.54 × 10$^{-5}$, D = 1.02 × 10$^{-6}$
Aspherical Surface Data of Fourteenth Surface (r14)
A = −4.03 × 10$^{-4}$, B = −3.29 × 10$^{-5}$,
C = −3.90 × 10$^{-6}$
Aspherical Surface Data of Sixteenth Surface (r16)
A = 1.96 × 10$^{-3}$, B = 2.36 × 10$^{-5}$,
C = −2.19 × 10$^{-6}$
Aspherical Surface Data of Seventeenth Surface (r17)
A = 5.41 × 10$^{-3}$, B = 2.47 × 10$^{-4}$,
C = 1.09 × 10$^{-5}$
Diffractive Surface Data of Eighth Surface (r8)
C1 = 2.69 × 10$^{-3}$, C2 = −2.58 × 10$^{-4}$,
C3 = −1.52 × 10$^{-5}$
Diffractive Surface Data of Twelfth Surface (r12)
C1 = −2.26 × 10$^{-3}$, C2 = 3.48 × 10$^{-5}$,
C3 = 5.95 × 10$^{-6}$

TABLE 24-continued

Construction Data of Example 8 f = 5.1~12.0~29.4
ω = 33.2~14.5~6.0 (°)
FNO = 2.96~3.4~4.1

Values corresponding to Conditions
Condition (10): φdoe/φgr3 = 0.073
Condition (11): tW/fW = 0.08
Condition (12) (At Wide-angle End [W]): |Y'max/PZ| = 0.17
Condition (12) (At Telephoto End [T]): |Y'max/PZ| = 0.19

TABLE 25

Construction Data of Example 9 f = 5.1~12.0~29.4
ω = 33.3~14.5~6.0 (°)
FNO = 2.96~3.43~4.1

| Radius of Curvature | Axial Distance | Refractive Index | Abbe Number |
|---|---|---|---|
| r1 = 35.68 | | | |
| | d1 = 0.22 | N1 = 1.833 | ν1 = 21 |
| r2 = 16.60 | | | |
| | d2 = 2.32 | N2 = 1.705 | ν2 = 48.1 |
| r3 = −178.64 | | | |
| | d3 = 0.10 | | |
| r4 = 11.59 | | | |
| | d4 = 1.14 | N3 = 1.654 | ν3 = 54.4 |
| r5 = 18.42 | | | |
| | d5 = 0.50~6.0~10.1 | | |
| r6* = 16.67 | | | |
| | d6 = 0.22 | N4 = 1.773 | ν4 = 49.8 |
| r7* = 5.40 | | | |
| | d7 = 1.90 | | |
| r8 = −12.34 | | | |
| | d8 = 0.22 | N5 = 1.773 | ν5 = 49.8 |
| r9 = 6.14 | | | |
| | d9 = 0.01 | N6 = 1.514 | ν6 = 57 |
| r10 = 6.14 | | | |
| | d10 = 0.81 | N7 = 1.833 | ν6 = 21 |
| r11 = 28.95 | | | |
| | d11 = 10.1~4.6~0.5 | | |
| r12 = ∞ (S) | | | |
| | d12 = 0.50 | | |
| r13 = 6.70 | | | |
| | d13 = 0.53 | N8 = 1.694 | ν8 = 53.2 |
| r14# = 23.76 | | | |
| | d14 = 0.22 | N9 = 1.62 | ν9 = 24 |
| r15* = 14.06 | | | |
| | d15 = 4.3~2.4~0.1 | | |
| r16 = 5.90 | | | |
| | d16 = 4.06 | N10 = 1.666 | ν10 = 52.7 |
| r17 = −9.13 | | | |
| | d17 = 0.10 | | |
| r18* = −12.93 | | | |
| | d18 = 0.22 | N11 = 1.847 | ν11 = 23.8 |
| r19* = 25.63 | | | |
| | d19 = 1~3~5.2 | | |
| r20 = −7.70 | | | |
| | d20 = 2.00 | N12 = 1.755 | ν12 = 27.6 |
| r21 = −9.76 | | | |
| | d21 = 0.25 | | |
| r22 = ∞ | | | |
| | d22 = 3.40 | N13 = 1.517 | ν13 = 64.1 |
| r23 = ∞ | | | |
| | d23 = 3.40 | | |
| r24 = ∞ (I) | | | |

Aspherical Surface Data of Sixth Surface (r6)
A = −1.03 × 10⁻³, B = 1.20 × 10⁻⁴,
C = −2.65 × 10⁻⁶
Aspherical Surface Data of Seventh Surface (r7)
A = −1.02 × 10⁻², B = 7.26 × 10⁻⁵,
C = 6.52 × 10⁻⁶

TABLE 25-continued

Construction Data of Example 9 f = 5.1~12.0~29.4
ω = 33.3~14.5~6.0 (°)
FNO = 2.96~3.43~4.1

Aspherical Surface Data of Fifteenth Surface (r15)
A = 2.18 × 10⁻⁴, B = 3.14 × 10⁻⁵,
C = −6.47 × 10⁻⁶, D = 6.70 × 10⁻⁷
Aspherical Surface Data of Eighteenth Surface (r18)
A = 1.97 × 10⁻³, B = −2.51 × 10⁻⁴,
C = 2.20 × 10⁻⁶
Aspherical Surface Data of Nineteenth Surface (r19)
A = 4.27 × 10⁻³, B = −1.41 × 10⁻⁴,
C = 3.02 × 10⁻⁶
Diffractive Surface Data of Fourteenth Surface (r14)
C1 = −1.20 × 10⁻³, C2 = 2.38 × 10⁻⁵
Values corresponding to Conditions
Condition (10): φdoe/φgr3 = 0.039
Condition (11): tW/fW = 0.16
Condition (12) (At Wide-angle End [W]): |Y'max/PZ| = 0.17
Condition (12) (At Telephoto End [T]): |Y'max/PZ| = 0.19

TABLE 26

Construction Data of Example 10 f = 5.1~12.0~29.4
ω = 33.2~14.5~6.0 (°)
FNO = 2.96~3.43~4.1

| Radius of Curvature | Axial Distance | Refractive Index | Abbe Number |
|---|---|---|---|
| r1 = 88.87 | | | |
| | d1 = 0.22 | N1 = 1.833 | ν1 = 21 |
| r2 = 19.88 | | | |
| | d2 = 1.73 | N2 = 1.728 | ν2 = 46 |
| r3 = −58.73 | | | |
| | d3 = 0.10 | | |
| r4 = 13.51 | | | |
| | d4 = 1.05 | N3 = 1.686 | ν3 = 50.2 |
| r5 = 28.21 | | | |
| | d5 = 0.5~5.5~9.8 | | |
| r6* = 23.58 | | | |
| | d6 = 0.22 | N4 = 1.773 | ν4 = 49.8 |
| r7* = 5.96 | | | |
| | d7 = 1.96 | | |
| r8 = −10.50 | | | |
| | d8 = 0.22 | N5 = 1.773 | ν5 = 49.8 |
| r9 = 6.76 | | | |
| | d9 = 0.01 | N6 = 1.514 | ν6 = 57 |
| r10 = 6.76 | | | |
| | d10 = 0.83 | N7 = 1.833 | ν6 = 21 |
| r11 = 114.41 | | | |
| | d11 = 10.8~4.9~0.5 | | |
| r12 = ∞ (S) | | | |
| | d12 = 0.50 | | |
| r13 = 5.95 | | | |
| | d13 = 0.74 | N8 = 1.694 | ν8 = 53.2 |
| r14# = −276.97 | | | |
| | d14 = 0.22 | N9 = 1.62 | ν9 = 24 |
| r15* = 14.65 | | | |
| | d15 = 0.01~0.9~1 | | |
| r16 = 6.40 | | | |
| | d16 = 1.00 | N10 = 1.755 | ν10 = 27.6 |
| r17* = 5.02 | | | |
| | d17 = 6.1~3.4~1 | | |
| r18 = 4.77 | | | |
| | d18 = 2.93 | N11 = 1.66 | ν11 = 43.4 |
| r19 = −18.69 | | | |
| | d19 = 0.27 | | |
| r20* = −19.29 | | | |
| | d20 = 0.22 | N12 = 1.847 | ν12 = 23.8 |
| r21* = 11.94 | | | |
| | d21 = 1~3.6~6.1 | | |
| r22 = ∞ | | | |
| | d22 = 3.40 | N13 = 1.517 | ν13 = 64.1 |

TABLE 26-continued

Construction Data of Example 10
f = 5.1~12.0~29.4
ω = 33.2~14.5~6.0 (°)
FNO = 2.96~3.43~4.1 r23 = ∞
  d23 = 3.49
r24 = ∞ (I)

Aspherical Surface Data of Sixth Surface (r6)
A = −3.69 × $10^{-4}$, B = 4.50 × $10^{-5}$,
C = −9.55 × $10^{-7}$
Aspherical Surface Data of Seventh Surface (r7)
A = −4.32 × $10^{-4}$, B = 3.68 × $10^{-5}$,
C = 1.77 × $10^{-6}$
Aspherical Surface Data of Fifteenth Surface (r15)
A = 6.37 × $10^{-4}$, B = 2.58 × $10^{-5}$,
C = −1.08 × $10^{-5}$, D = 9.99 × $10^{-7}$
Aspherical Surface Data of Seventeenth Surface (r17)
A = −3.92 × $10^{-4}$, B = 3.83 × $10^{-5}$,
C = −1.29 × $10^{-6}$
Aspherical Surface Data of Twentieth Surface (r20)
A = 1.53 × $10^{-3}$, B = −1.49 × $10^{-4}$,
C = 2.09 × $10^{-6}$
Aspherical Surface Data of Twenty-first Surface (r21)
A = 4.22 × $10^{-3}$, B = −4.32 × $10^{-5}$,
C = 7.38 × $10^{-6}$
Diffractive Surface Data of Fourteenth Surface (r14)
C1 = −1.15 × $10^{-3}$, C2 = 4.13 × $10^{-5}$
Values corresponding to Conditions
Condition (10): φdoe/φgr3 = 0.029
Condition (11): tW/fW = 0.18
Condition (12) (At Wide-angle End [W]): |Y'max/PZ| = 0.17
Condition (12) (At Telephoto End [T]): |Y'max/PZ| = 0.19

TABLE 27

Construction Data of Comparison Example 4
f = 5.1~12.0~29.4
ω = 33.3~14.5~6.0 (°)
FNO = 2.96~3.4~4.1

| Radius of Curvature | Axial Distance | Refractive Index | Abbe Number |
|---|---|---|---|
| r1 = 72.91 | | | |
| | d1 = 0.80 | N1 = 1.833 | ν1 = 21 |
| r2 = 24.95 | | | |
| | d2 = 3.01 | N2 = 1.733 | ν2 = 52.3 |
| r3 = −88.40 | | | |
| | d3 = 0.10 | | |
| r4 = 14.50 | | | |
| | d4 = 1.79 | N3 = 1.659 | ν3 = 55.5 |
| r5 = 30.07 | | | |
| | d5 = 0.5~6.1~10.4 | | |
| r6* = 63.22 | | | |
| | d6 = 0.75 | N4 = 1.773 | ν4 = 49.8 |
| r7* = 7.36 | | | |
| | d7 = 2.68 | | |
| r8 = −8.19 | | | |
| | d8 = 0.70 | N5 = 1.773 | ν5 = 49.8 |
| r9 = 8.49 | | | |
| | d9 = 0.01 | N6 = 1.514 | ν6 = 57 |
| r10 = 8.49 | | | |
| | d10 = 1.35 | N7 = 1.833 | ν7 = 21 |
| r11 = −101.05 | | | |
| | d11 = 10.4~4.8~0.5 | | |
| r12 = ∞ (S) | | | |
| | d12 = 0.50 | | |
| r13 = 10.71 | | | |
| | d13 = 1.58 | N8 = 1.722 | ν8 = 51.4 |
| r14 = −18.10 | | | |
| | d14 = 0.01 | N9 = 1.514 | ν9 = 57 |
| r15 = −18.10 | | | |
| | d15 = 1.00 | N10 = 1.847 | ν10 = 23.8 |

TABLE 27-continued

Construction Data of Comparison Example 4
f = 5.1~12.0~29.4
ω = 33.3~14.5~6.0 (°)
FNO = 2.96~3.4~4.1

| | | | |
|---|---|---|---|
| r16* = 95.26 | | | |
| | d16 = 5.1~2.6~0.2 | | |
| r17 = 5.58 | | | |
| | d17 = 3.13 | N11 = 1.7 | ν11 = 49.6 |
| r18 = −23.43 | | | |
| | d18 = 0.10 | | |
| r19* = −95.40 | | | |
| | d19 = 1.00 | N12 = 1.847 | ν12 = 23.8 |
| r20* = 9.41 | | | |
| | d20 = 1~3.4~5.9 | | |
| r21 = ∞ | | | |
| | d21 = 3.40 | N13 = 1.517 | ν13 = 64.1 |
| r22 = ∞ | | | |
| | d22 = 4.61 | | |
| r23 = ∞ (I) | | | |

Aspherical Surface Data of Sixth Surface (r6)
A = 7.67 × $10^{-4}$, B = −1.15 × $10^{-5}$,
C = 8.18 × $10^{-8}$
Aspherical Surface Data of Seventh Surface (r7)
A = 8.54 × $10^{-4}$, B = 1.62 × $10^{-5}$,
C = 5.77 × $10^{-7}$
Aspherical Surface Data of Sixteenth Surface (r16)
A = 9.53 × $10^{-5}$, B = 2.01 × $10^{-5}$,
C = −4.61 × $10^{-6}$, D = 3.69 × $10^{-7}$
Aspherical Surface Data of Nineteenth Surface (r19)
A = 1.66 × $10^{-3}$, B = −1.25 × $10^{-4}$,
C = 1.37 × $10^{-6}$
Aspherical Surface Data of Twentieth Surface (r20)
A = 4.20 × $10^{-3}$, B = −2.46 × $10^{-5}$,
C = 5.03 × $10^{-6}$

TABLE 28

Values corresponding to Condition (13)

| | | |(h/d)tanθ| |
|---|---|---|
| Example 7 | Diffractive Surface in Third Unit | 0.012~0.016 |
| Example 8 | Diffractive Surface in Second Unit | 0.027~0.042 |
| Example 8 | Diffractive Surface in Third Unit | 0.019~0.043 |
| Example 9 | Diffractive Surface in Third Unit | 0.012~0.027 |
| Example 10 | Diffractive Surface in Third Unit | 0.009~0.021 |

TABLE 29

Values corresponding to Conditions (14) and (15)

| Example | Lens Unit with Diffractive Surface | Condition (14) \|{(h · φdoe · Ddoe)/(2 · λ0)} · tan(ωmax)\| | Condition (15) \|(h/dmin) · tan(ωmax)\| |
|---|---|---|---|
| 7 | Third Unit | 0.020 | 0.027 |
| 8 | Second Unit | 0.054 | 0.040 |
| 8 | Third Unit | 0.053 | 0.061 |
| 9 | Third Unit | 0.026 | 0.039 |
| 10 | Third Unit | 0.026 | 0.030 |

TABLE 30

Chromatic Aberration Coefficients in Comparison Example 4
(having no diffractive lens element)

|  |  |  | Whole | First unit | Second unit | Third Unit | Fourth Unit |
|---|---|---|---|---|---|---|---|
| Chromatic | W | LC | 12 | 1 | 0 | −11 | 27 |
| Aberration |  | TC | 38 | −2 | 38 | −14 | 10 |
| Coefficients | T | LC | 1 | 1 | −1 | −1 | 1 |
|  |  | TC | −22 | −36 | 54 | −19 | −28 |

TABLE 31

Chromatic Aberration Coefficients in Example 7
(having diffractive lens element in Third Lens Unit)

|  |  |  | Whole | First Unit | Second Unit | Third unit Whole | Third unit Diffractive Lens Element | Fourth Unit |
|---|---|---|---|---|---|---|---|---|
| Chromatic | W | LC | 5 | 1 | 1 | −27 | −30 | 34 |
| Aberration |  | TC | 35 | −2 | 36 | −10 | −5 | 5 |
| Coefficients | T | LC | 0 | 1 | 0 | −2 | −2 | 2 |
|  |  | TC | −23 | −30 | 50 | −12 | −5 | −39 |

TABLE 32

Data on Glass Material

| Lens | Glass Material | nd | νd |
|---|---|---|---|
| LL | Low Refractive Index/Low Dispersion | 1.5 | 60 |
| LH | Low Refractive Index/High Dispersion | 1.6 | 40 |
| HH | High Refractive Index/High Dispersion | 1.8 | 30 |
| HL | High Refractive Index/Low Dispersion | 1.7 | 50 |
| — | Diffractive Lens Surface | ∞ | −3.45 |

TABLE 33

Aberration Coefficients of Models (a) to (c)

| Lens Position | Aberration Coefficients | (a) Positive Lens: LL Negative Lens: HH | (b) Positive Lens: LL Negative Lens: HH | (b) Positive Lens: HL Negative Lens: LH | (c) Positive Lens: LL | (c) Positive Lens: HL |
|---|---|---|---|---|---|---|
| Without Regard to Position | PT | 0.778 | 0.759 | 0.543 | 0.63 | 0.55 |
| Aperture Position | AS | 1 | 1 | 1 | 1 | 1 |
| Behind Aperture Stop | AS | 0.036 | 0.973 | 1.217 | 1.366 | 1.19 |

TABLE 34

Aberration Coefficients in Comparison Example 4 and Example 7

|  |  |  | Whole | First Unit | Second Unit | Third Unit | Fourth Unit |
|---|---|---|---|---|---|---|---|
| Comparison | W | AS | 130 | 486 | −349 | 587 | −560 |
| Example 4 | T | AS | −4 | 1046 | −1501 | 600 | −103 |
|  |  | PT | −48 | 239 | −988 | 322 | 379 |

TABLE 34-continued

Aberration Coefficients in Comparison Example 4 and Example 7

|  |  |  | Whole | First Unit | Second Unit | Third Unit | Fourth Unit |
|---|---|---|---|---|---|---|---|
| Example 7 | W | AS | 154 | 499 | −258 | 534 | −586 |
|  | T | AS | 18 | 924 | −1357 | 540 | −42 |
|  |  | PT | −16 | 261 | −980 | 237 | 465 |

TABLE 35

Construction Data of Example 11
f = 4.8~10.5~23.0
ω = 32.6~16.4~7.7 (°)
FNO = 2.4~3.25~4.1

| Radius of Curvature | Axial Distance | Refractive Index | Abbe Number |
|---|---|---|---|
| r1* = −108.09 |  |  |  |
|  | d1 = 0.34 | N1 = 1.773 | ν1 = 49.6 |
| r2 = 10.93 |  |  |  |
|  | d2 = 1.50 |  |  |
| r3* = 40.71 |  |  |  |

TABLE 35-continued

Construction Data of Example 11
f = 4.8~10.5~23.0
ω = 32.6~16.4~7.7 (°)
FNO = 2.4~3.25~4.1

|  | | | |
|---|---|---|---|
|  | d3 = 0.76 | N2 = 1.805 | ν2 = 25.4 |
| r4 = 120.55 | | | |
|  | d4 = 14.7~5.3~0.1 | | |
| r5 = 84.26 | | | |
|  | d5 = 0.34 | N3 = 1.847 | ν3 = 23.8 |
| r6 = 19.66 | | | |
|  | d6 = 1.83 | N4 = 1.734 | ν4 = 51.5 |
| r7 = −27.21 | | | |
|  | d7 = 0.10 | | |
| r8 = 11.99 | | | |
|  | d8 = 1.43 | N5 = 1.72 | ν5 = 50.2 |
| r9* = 41.07 | | | |
|  | d9 = 0.1~3.7~14.6 | | |
| r10 = ∞ (S) | | | |
|  | d10 = 0.3~5.3~10.2 | | |
| r11 = −7.70 | | | |
|  | d11 = 0.73 | N6 = 1.805 | ν6 = 25.4 |
| r12 = −5.38 | | | |
|  | d12 = 0.34 | N7 = 1.487 | ν7 = 70.2 |
| r13 = 18.51 | | | |
|  | d13 = 9.9~5.0~0.1 | | |
| r14*# = 16.61 | | | |
|  | d14 = 1.64 | N8 = 1.773 | ν8 = 49.6 |
| r15 = −19.97 | | | |
|  | d15 = 0.10 | | |
| r16 = 62.60 | | | |
|  | d16 = 0.34 | N9 = 1.847 | ν9 = 23.8 |
| r17 = 7.97 | | | |
|  | d17 = 1.95 | N10 = 1.773 | ν10 = 49.6 |
| r18 = −64.01 | | | |
|  | d18 = 7.27 | | |
| r19 = ∞ | | | |
|  | d19 = 3.40 | N11 = 1.517 | ν11 = 64.1 |
| r20 = ∞ | | | |
|  | d20 = 1.00 | | |
| r21 = ∞ (I) | | | |

Aspherical Surface Data of First Surface (r1)
A = 1.30 × 10$^{-4}$, B = −1.51 × 10$^{-6}$,
C = 7.60 × 10$^{-9}$
Aspherical Surface Data of Third Surface (r3)
A = 8.53 × 10$^{-6}$, B = 1.31 × 10$^{-6}$,
C = −1.75 × 10$^{-9}$
Aspherical Surface Data of Ninth Surface (r9)
A = 4.77 × 10$^{-5}$, B = 3.06 × 10$^{-7}$,
C = −1.35 × 10$^{-8}$
Aspherical Surface Data of Fourteenth Surface (r14)
A = −1.63 × 10$^{-4}$, B = 3.97 × 10$^{-7}$,
C = 6.40 × 10$^{-11}$
Diffractive Surface Data of Fourteenth Surface (r14)
C1 = −1.63 × 10$^{-4}$, C2 = 9.32 × 10$^{-6}$
Values corresponding to Conditions
Condition (18): φdoe/φgr4 = 0.0033
Condition (19): tW/fW = 2.3
Condition (20): tT/fT = 0.5
Condition (21) (At Wide-angle End [W]): |Y'max/PZ| = 0.05
Condition (21) (At Telephoto End [T]): |Y'max/PZ| = 0.08

TABLE 36

Construction Data of Comparison Example 5
f = 4.8~10.5~23.0
ω = 32.6~16.4~7.7 (°)
FNO = 2.4~3.25~4.1

| Radius of Curvature | Axial Distance | Refractive Index | Abbe Number |
|---|---|---|---|
| r1* = −48.33 | | | |
|  | d1 = 0.63 | N1 = 1.773 | ν1 = 49.6 |
| r2 = 11.94 | | | |
|  | d2 = 1.90 | | |
| r3* = 42.15 | | | |
|  | d3 = 1.28 | N2 = 1.805 | ν2 = 25.4 |
| r4 = 142.47 | | | |
|  | d4 = 23.5~8.1~0.9 | | |
| r5 = 37.08 | | | |
|  | d5 = 0.42 | N3 = 1.847 | ν3 = 23.8 |
| r6 = 15.49 | | | |
|  | d6 = 3.00 | N4 = 1.734 | ν4 = 51.5 |
| r7 = −93.80 | | | |
|  | d7 = 0.35 | | |
| r8 = 20.15 | | | |
|  | d8 = 1.68 | N5 = 1.72 | ν5 = 50.2 |
| r9* = −71.59 | | | |
|  | d9 = 0.8~4.6~18.0 | | |
| r10 = ∞ (S) | | | |
|  | d10 = 0.3~5.6~12.0 | | |
| r11 = −11.17 | | | |
|  | d11 = 1.19 | N6 = 1.805 | ν6 = 25.4 |
| r12 = −7.44 | | | |
|  | d12 = 0.42 | N7 = 1.487 | ν7 = 70.2 |
| r13 = 22.81 | | | |
|  | d13 = 11.9~6.9~0.1 | | |
| r14* = 21.27 | | | |
|  | d14 = 1.73 | N8 = 1.773 | ν8 = 49.6 |
| r15 = −19.74 | | | |
|  | d15 = 0.10 | | |
| r16 = −625.34 | | | |
|  | d16 = 0.42 | N9 = 1.847 | ν9 = 23.8 |
| r17 = 8.07 | | | |
|  | d17 = 6.00 | N10 = 1.773 | ν10 = 49.6 |
| r18 = −35.23 | | | |
|  | d18 = 5.21 | | |
| r19 = ∞ | | | |
|  | d19 = 3.40 | N11 = 1.517 | ν11 = 64.1 |
| r20 = ∞ | | | |
|  | d20 = 1.77 | | |
| r21 = ∞ (I) | | | |

Aspherical Surface Data of First Surface (r1)
A = 4.46 × 10$^{-5}$, B = −6.68 × 10$^{-7}$,
C = 3.09 × 10$^{-9}$
Aspherical Surface Data of Third Surface (r3)
A = 2.19 × 10$^{-5}$, B = 1.00 × 10$^{-6}$,
C = −7.81 × 10$^{-10}$
Aspherical Surface Data of Ninth Surface (r9)
A = 2.77 × 10$^{-5}$, B = 2.05 × 10$^{-8}$,
C = −1.74 × 10$^{-9}$
Aspherical Surface Data of Fourteenth Surface (r14)
A = −1.32 × 10$^{-4}$, B = 2.26 × 10$^{-7}$,
C = −1.35 × 10$^{-11}$

TABLE 37

Chromatic Aberration Coefficients in Comparison Example 5
(having no diffractive lens element)

|  |  |  | Whole | First unit | Second unit | Third Unit | Fourth Unit |
|---|---|---|---|---|---|---|---|
| Chromatic Aberration Coefficients | W | LC | 4 | −10 | 49 | 18 | −53 |
|  |  | TC | 37 | 101 | −3 | 18 | −79 |
|  | T | LC | 1 | −10 | 12 | 1 | −2 |
|  |  | TC | 2 | 202 | 194 | 38 | −44 |

TABLE 38

Chromatic Aberration Coefficients in Example 11
(having diffractive lens element in Fourth Lens Unit)

|  |  |  | Whole | First Unit | Second Unit | Third Unit | Fourth Unit Whole | Diffractive Lens Element |
|---|---|---|---|---|---|---|---|---|
| Chromatic | W | LC | −9 | −10 | 34 | 11 | −45 | −43 |
| Aberration |  | TC | 8 | 85 | −3 | 14 | −88 | −95 |
| Coefficients | T | LC | 0 | −10 | 11 | 1 | −2 | −2 |
|  |  | TC | −11 | 187 | −183 | 31 | −45 | −54 |

TABLE 39

Data on Glass Material

| Glass Material | nd | vd |
|---|---|---|
| Low Refractive Index/Low Dispersion | 1.5 | 60 |
| High Refractive Index/High Dispersion | 1.8 | 30 |
| Diffractive Lens Surface | ∞ | −3.45 |

TABLE 40

Aberration Coefficients of Models (a) to (c)

| Lens Position | Aberration Coefficients | (a) | (b) | (c) Low Refractive Index/ Low Dispersion | (c) High Refractive Index/ High Dispersion |
|---|---|---|---|---|---|
| Without Regard to Position | PT | 0.778 | 0.759 | 0.63 | 0.498 |
| Aperture Position | AS | 1 | 1 | 1 | 1 |
| Behind Aperture Stop | AS | 0.036 | 0.973 | 1.366 | 1.138 |

TABLE 41

Aberration Coefficients in Comparison Example 5 and Example 11

|  |  |  | Whole | First Unit | Second Unit | Third Unit | Fourth Unit |
|---|---|---|---|---|---|---|---|
| Comparison | W | AS | −71 | 541 | 642 | −531 | −724 |
| Example 5 | T | AS | 13 | 687 | −148 | −80 | −445 |
|  |  | PT | 161 | −381 | 412 | −384 | 514 |
| Example 11 | W | AS | −29 | 482 | 714 | −744 | −481 |
|  | T | AS | 58 | 434 | 6 | −288 | −95 |
|  |  | PT | 129 | −366 | 439 | −537 | 594 |

What is claimed is:

1. An optical system comprising:
a cemented lens element, formed by cementing at least two constituent lens elements made of different optical materials together, and having a diffractive optical surface formed at a cementing interface between the two constituent lens elements, the two constituent lens elements having at their respective interfaces with air a radius of curvature different from a radius of curvature that they have at the cementing interface wherein the cemented lens element fulfills the following condition:

$$0.1 \leq (\phi p/\nu d)/(\phi DOE/\nu DOE) \leq 35$$

where
$\phi p$ represents a refractive optical power of that one of the two constituent lens elements of the cemented lens element which has a refractive optical power of an opposite sign to a diffractive optical power of the cementing interface;
$\nu d$ represents an Abbe number of that one of the two constituent lens elements of the cemented lens element which has a refractive optical power of an opposite sign to the diffractive optical power of the cementing interface;
$\phi DOE$ represents the diffractive optical power of the cementing interface; and
$\nu DOE$ represents an Abbe-number-equivalent value of the cementing interface.

2. An optical system as claimed in claim 1, wherein one of the two constituent lens elements of the cemented lens element has a refractive optical power of an opposite sign to a diffractive optical power of the cementing interface.

3. An optical system as claimed in claim 1, wherein the two constituent lens elements of the cemented lens element have different refractive optical powers.

4. An optical system comprising:
a cemented lens element, formed by cementing at least two constituent lens elements made of different optical materials together, and having a diffractive optical surface formed at a cementing interface between the two constituent lens elements, the two constituent lens elements having at their respective interfaces with air a radius of curvature different from a radius of curvature that they have at the cementing interface,
wherein the cemented lens element fulfills the following condition:

$$0.04 \leq tp/tg \leq 5$$

where
$tp$ represents an axial distance of that one of the two constituent lens elements of the cemented lens element which has a refractive optical power of an opposite sign to a diffractive optical power of the cementing interface; and
$tg$ represents an axial distance of that one of the two constituent lens elements of the cemented lens element which has a refractive optical power of a same sign as the diffractive optical power of the cementing interface.

5. An optical system as claimed in claim 1, wherein the optical system is a zoom lens system.

6. An optical system as claimed in claim 1,
wherein the optical system is a zoom lens system having a plurality of lens units, at least two of the lens units each including a cemented lens element as recited in claim 1.

7. An optical system for use in a taking optical system for projecting an image on a solid-state image sensor, comprising:
a cemented lens element, formed by cementing at least two constituent lens elements made of different optical materials together, and having a diffractive optical surface formed at a cementing interface between the two constituent lens elements, the two constituent lens elements having at their respective interfaces with air a radius of curvature different from a radius of curvature that they have at the cementing interface; and
an optical low-pass filter disposed between the optical system and an image-sensing surface of the solid-state image sensor
wherein the cemented lens element fulfills the following condition:

$$0.1 \leq (\phi p/\nu d)/(\phi DOE/\nu DOE) \leq 35$$

where
$\phi p$ represents a refractive optical power of that one of the two constituent lens elements of the cemented lens element which has a refractive optical power of an opposite sign to a diffractive optical power of the cementing interface;
$\nu d$ represents an Abbe number of that one of the two constituent lens elements of the cemented lens element which has a refractive optical power of an opposite sign to the diffractive optical power of the cementing interface;
$\phi DOE$ represents the diffractive optical Dower of the cementing interface; and
$\nu DOE$ represents an Abbe-number-equivalent value of the cementing interface.

8. An optical system as claimed in claim 7,
wherein one of the two constituent lens elements of the cemented lens element has a refractive optical power of an opposite sign to a diffractive optical power of the cementing interface.

9. An optical system as claimed in claim 7,
wherein the two constituent lens elements of the cemented lens element have different refractive optical powers.

10. An optical system for use in a taking optical system for projecting an image on a solid-state image sensor, comprising:
a cemented lens element, formed by cementing at least two constituent lens elements made of different optical materials together, and having a diffractive optical surface formed at a cementing interface between the two constituent lens elements, the two constituent lens elements having at their respective interfaces with air a radius of curvature different from a radius of curvature that they have at the cementing interface; and
an optical low-pass filter disposed between the optical system and an image-sensing surface of the solid-state image sensor
wherein the cemented lens element fulfills the following condition:

$$0.04 \leq tp/tg \leq 5$$

where
$tp$ represents an axial distance of that one of the two constituent lens elements of the cemented lens element which has a refractive optical power of an opposite sign to a diffractive optical power of the cementing interface; and
$tg$ represents an axial distance of that one of the two constituent lens elements of the cemented lens element which has a refractive optical power of a same sign as the diffractive optical power of the cementing interface.

11. An optical system as claimed in claim 7,
wherein the optical system is a zoom lens system.

12. An optical system as claimed in claim 7,
wherein the optical system is a zoom lens system having a plurality of lens units, at least two of the lens units each including a cemented lens element as recited in claim 7.

13. An optical system as claimed in claim 4,
wherein one of the two constituent lens elements of the cemented lens element has a refractive optical power of an opposite sign to a diffractive optical power of the cementing interface.

14. An optical system as claimed in claim 4,
wherein the two constituent lens elements of the cemented lens element have different refractive optical powers.

15. An optical system as claimed in claim 4,
wherein the optical system is a zoom lens system.

16. An optical system as claimed in claim 4,
wherein the optical system is a zoom lens system having a plurality of lens units, at least two of the lens units each including a cemented lens element as recited in claim 4.

17. An optical system as claimed in claim 10,
wherein one of the two constituent lens elements of the cemented lens element has a refractive optical power of an opposite sign to a diffractive optical power of the cementing interface.

18. An optical system as claimed in claim 10,
wherein the two constituent lens elements of the cemented lens element have different refractive optical powers.

19. An optical system as claimed in claim 10,
wherein the optical system is a zoom lens system.

20. An optical system as claimed in claim 10,
wherein the optical system is a zoom lens system having a plurality of lens units, at least two of the lens units each including a cemented lens elements as recited in claim 10.

* * * * *